US011976556B2

(12) United States Patent
Russell et al.

(10) Patent No.: US 11,976,556 B2
(45) Date of Patent: May 7, 2024

(54) TUNNELING AND MINING METHOD USING PRE-CONDITIONED HOLE PATTERN

(71) Applicant: HYPERSCIENCES, INC., Spokane, WA (US)

(72) Inventors: Mark C. Russell, Spokane, WA (US); Charles T. Russell, Spokane, WA (US)

(73) Assignee: HYPERSCIENCES, INC., Spokane, WA (US)

( * ) Notice: Subject to any disclaimer, the term of this patent is extended or adjusted under 35 U.S.C. 154(b) by 0 days.

(21) Appl. No.: 17/457,007

(22) Filed: Nov. 30, 2021

(65) Prior Publication Data

US 2022/0145759 A1    May 12, 2022

Related U.S. Application Data

(63) Continuation-in-part of application No. 17/445,168, filed on Aug. 16, 2021, now Pat. No. 11,624,235, and
(Continued)

(51) Int. Cl.
*E21C 37/00* (2006.01)
*E21C 39/00* (2006.01)
(Continued)

(52) U.S. Cl.
CPC ............ *E21C 37/005* (2013.01); *E21C 39/00* (2013.01); *E21D 9/003* (2013.01); *E21D 9/128* (2013.01);
(Continued)

(58) Field of Classification Search
CPC ....... E21C 37/005; E21C 39/00; E21D 9/003; E21D 9/006; E21D 9/1053; E21D 9/106;
(Continued)

(56) References Cited

U.S. PATENT DOCUMENTS 1,241,386 A * 9/1917 Hutton .................... F42D 1/18
  299/20
1,585,664 A * 5/1926 Gilman .................. E21C 37/00
  299/20
(Continued)

FOREIGN PATENT DOCUMENTS

CA    2107536 A1 *  3/1994
CN  101017076 A      8/2007
(Continued)

OTHER PUBLICATIONS

Machine translation of Cho KR-20120034545-A, published Apr. 12, 2012, 5 pages (Year: 2012).*
(Continued)

*Primary Examiner* — Janine M Kreck
*Assistant Examiner* — Michael A Goodwin
(74) *Attorney, Agent, or Firm* — Lindauer Law, PLLC

(57) ABSTRACT

Systems for forming or extending a tunnel or shaft within geologic material may include a ram accelerator assembly for accelerating one or more projectiles into geologic material to weaken a region of the geologic material. The projectile(s) pre-condition the geologic material, such as by forming one or more holes in a central region of the material or to define a perimeter of the region to be displaced. A cutting tool or subsequent projectile impacts may then be used to remove the weakened material. The voids formed by the first projectile(s) cause compressive forces from subsequent impacts or cutting operations to be converted to tension forces that more efficiently break geologic material, which may fall into the voids created by the first projectile(s). The voids created by the projectile impacts may also control the material that is removed and the shape of a resulting section of the tunnel or shaft.

20 Claims, 25 Drawing Sheets

Related U.S. Application Data a continuation-in-part of application No. 17/096,435, filed on Nov. 12, 2020.

(60) Provisional application No. 63/120,108, filed on Dec. 1, 2020.

(51) Int. Cl.
  *E21D 9/00*     (2006.01)
  *E21D 9/12*     (2006.01)
  *E21B 4/14*     (2006.01)
  *E21B 7/18*     (2006.01)
  *E21B 49/04*    (2006.01)
  *E21D 9/10*     (2006.01)

(52) U.S. Cl.
  CPC . *E21B 4/14* (2013.01); *E21B 7/18* (2013.01); *E21B 49/04* (2013.01); *E21D 9/006* (2013.01); *E21D 9/108* (2013.01)

(58) Field of Classification Search
  CPC ....... E21D 9/1066; E21D 9/108; E21D 9/112; E21D 9/128; E21B 7/007; E21B 49/04; E21B 4/14; E21B 7/18
  See application file for complete search history.

(56) References Cited

U.S. PATENT DOCUMENTS

| | | |
|---|---|---|
| 2,544,573 A | 3/1951 | Price |
| 2,621,732 A | 12/1952 | Ahlgren |
| 2,913,959 A | 11/1959 | Mohaupt |
| 3,075,463 A | 1/1963 | Eilers et al. |
| 3,185,224 A | 5/1965 | Robinson |
| 3,190,372 A | 6/1965 | Johnson |
| 3,244,232 A | 4/1966 | Myers |
| 3,253,511 A | 5/1966 | Zwicky |
| 3,434,380 A | 3/1969 | Dardick |
| 3,441,095 A | 4/1969 | Youmans |
| 3,516,502 A | 6/1970 | Bennett et al. |
| 3,623,771 A | 11/1971 | Sosnowicz et al. |
| 3,633,686 A | 1/1972 | Bennett |
| 3,695,715 A * | 10/1972 | Godfrey ............... E21C 37/00 89/1.15 |
| 3,721,471 A * | 3/1973 | Bergmann ............ F42D 3/04 299/13 |
| 3,855,931 A | 12/1974 | Dardick |
| 3,863,723 A | 2/1975 | Godfrey |
| 3,867,867 A | 2/1975 | Duff |
| 3,963,275 A * | 6/1976 | Godfrey ............... E21C 37/005 241/27 |
| 3,979,724 A | 9/1976 | Silverman et al. |
| 4,004,642 A | 1/1977 | Dardick |
| 4,030,557 A | 6/1977 | Alvis et al. |
| 4,063,486 A | 12/1977 | Ashley |
| 4,106,574 A | 8/1978 | Dow |
| 4,123,975 A | 11/1978 | Mohaupt |
| 4,158,388 A | 6/1979 | Owen et al. |
| 4,467,878 A | 8/1984 | Ibsen |
| 4,474,250 A * | 10/1984 | Dardick ............... E21B 49/00 175/45 |
| 4,582,147 A | 4/1986 | Dardick |
| 4,638,712 A | 1/1987 | Chawla et al. |
| 4,679,637 A | 7/1987 | Cherrington et al. |
| 4,722,261 A | 2/1988 | Titus |
| 4,791,850 A | 12/1988 | Minovitch |
| 4,907,488 A | 3/1990 | Seberger |
| 4,932,306 A | 6/1990 | Rom |
| 4,982,647 A | 1/1991 | Hertzberg et al. |
| 4,997,047 A | 3/1991 | Schroeder |
| 5,063,826 A | 11/1991 | Bulman |
| 5,097,743 A | 3/1992 | Hertzberg et al. |
| 5,098,163 A | 3/1992 | Young |
| 5,146,992 A | 9/1992 | Baugh |
| 5,233,903 A | 8/1993 | Saphier et al. |
| 5,242,025 A | 9/1993 | Neill et al. |
| 5,421,237 A | 6/1995 | Naumann |
| 5,487,405 A | 1/1996 | Skoglund |
| 5,574,244 A | 11/1996 | Powell et al. |
| 5,578,783 A | 11/1996 | Brandeis |
| 5,768,940 A | 6/1998 | Kawaguchi et al. |
| 5,833,003 A | 11/1998 | Longbottom et al. |
| 5,996,709 A | 12/1999 | Norris |
| 6,000,479 A | 12/1999 | Ambs |
| 6,035,784 A | 3/2000 | Watson |
| 6,457,417 B1 | 10/2002 | Beal |
| 6,467,387 B1 | 10/2002 | Espinosa |
| 6,591,731 B2 | 7/2003 | Goldstein |
| 6,820,697 B1 | 11/2004 | Churchill |
| 7,069,862 B2 | 7/2006 | Bassett |
| 7,681,352 B2 | 3/2010 | Fu et al. |
| 7,775,148 B1 | 8/2010 | McDermott |
| 7,942,481 B2 | 5/2011 | Leppänen |
| 8,104,568 B2 | 1/2012 | Uchini et al. |
| 8,181,561 B2 | 5/2012 | Riggs et al. |
| 8,302,584 B1 | 11/2012 | Lu |
| 8,538,697 B2 | 9/2013 | Russell et al. |
| 8,943,970 B2 | 2/2015 | Greeley |
| 9,103,618 B2 | 8/2015 | Daniel et al. |
| 9,103,624 B1 | 8/2015 | Kung et al. |
| 9,169,695 B1 | 10/2015 | Calvert |
| 9,458,670 B2 | 10/2016 | Russell |
| 9,500,419 B2 | 11/2016 | Russell |
| 9,540,895 B2 | 1/2017 | MacKenzie et al. |
| 9,988,844 B2 | 6/2018 | Russell et al. |
| 10,132,578 B2 | 11/2018 | Knowlen et al. |
| 10,329,842 B2 | 6/2019 | Russell |
| 10,557,308 B2 | 2/2020 | Russell |
| 10,590,707 B2 | 3/2020 | Russell et al. |
| 10,697,242 B2 | 6/2020 | Russell et al. |
| 11,624,235 B2 | 4/2023 | Russell et al. |
| 2001/0045288 A1 | 11/2001 | Allamon et al. |
| 2002/0100361 A1 | 8/2002 | Russell |
| 2005/0034896 A1 | 2/2005 | Youan |
| 2007/0044963 A1 | 3/2007 | MacDougall |
| 2007/0186761 A1 | 8/2007 | Perry |
| 2007/0256826 A1 | 11/2007 | Ceccarelli et al. |
| 2008/0205191 A1 | 8/2008 | Coste et al. |
| 2009/0322185 A1 | 12/2009 | Bamard et al. |
| 2010/0032206 A1 | 2/2010 | Becker et al. |
| 2010/0133006 A1 | 6/2010 | Shakra et al. |
| 2010/0180593 A1 | 7/2010 | Schaller et al. |
| 2010/0284250 A1 | 11/2010 | Cornish et al. |
| 2011/0114388 A1 | 5/2011 | Lee et al. |
| 2011/0186377 A1 | 8/2011 | Kline |
| 2012/0174581 A1 | 7/2012 | Vaughan et al. |
| 2012/0312545 A1 | 12/2012 | Suryanarayana et al. |
| 2013/0032337 A1 | 2/2013 | Rytlewski et al. |
| 2014/0056101 A1 | 2/2014 | Vu et al. |
| 2014/0133519 A1 | 5/2014 | Freitag |
| 2014/0158356 A1 | 6/2014 | Andrzejak et al. |
| 2014/0260930 A1 | 9/2014 | Russell |
| 2014/0367604 A1 | 12/2014 | Alexander |
| 2015/0021023 A1 | 1/2015 | Roberts et al. |
| 2015/0152700 A1 | 6/2015 | Lovorn et al. |
| 2015/0159478 A1 | 6/2015 | Georgi et al. |
| 2015/0300327 A1 | 10/2015 | Sweatman et al. |
| 2015/0330147 A1 | 11/2015 | Russell |
| 2016/0123081 A1* | 5/2016 | Russell ............... E21B 7/16 175/4.57 |
| 2016/0356087 A1 | 12/2016 | Russell et al. |
| 2016/0362936 A1 | 12/2016 | Russell |
| 2017/0130531 A1 | 5/2017 | Russell |
| 2017/0138128 A1 | 5/2017 | Russell |
| 2018/0017691 A1 | 1/2018 | Dirksen et al. |
| 2018/0073301 A1 | 3/2018 | Russell et al. |
| 2018/0187542 A1 | 7/2018 | Sayed et al. |
| 2018/0202288 A1* | 7/2018 | Elbadawy ............ E21B 47/14 |

FOREIGN PATENT DOCUMENTS

| | | |
|---|---|---|
| CN | 101099024 A | 1/2008 |
| CN | 102322216 A | 1/2012 |

(56) References Cited

FOREIGN PATENT DOCUMENTS

| | | | |
|---|---|---|---|
| CN | 102822442 | A | 12/2012 |
| CN | 202596572 | U | 12/2012 |
| CN | 103321572 | A | 9/2013 |
| CN | 102667047 | B | 11/2015 |
| DE | 2420035 | A1 | 3/1976 |
| DE | 2813143 | A1 | 9/1979 |
| EP | 0663582 | A3 | 11/1995 |
| EP | 1764577 | A1 | 3/2007 |
| GB | 1371297 | A | 10/1974 |
| KR | 20120034545 | A * | 4/2012 |
| WO | 9937878 | A1 | 7/1999 |
| WO | 2014149173 | A1 | 9/2014 |
| WO | 2015030730 | A1 | 3/2015 |
| WO | 2016043723 | A1 | 3/2016 |

OTHER PUBLICATIONS

"Drilling and Excavation Technologies for the Future Technologies", Committee on Advanced Drilling, National Research Council, ISBN: 0-309-57320-3. Retrieved from http://www.nap.edu/catalog/2349.html.

Bogdanoff, David W., "New Tube End Closure System For The Ram Accelerator", Journal of Propulsion and Power., vol. 10, No. 4, Jul.-Aug. 1, 1994, pp. 518-521.

Fang, et al., "Hypersonic Wave Drag Reduction Performance Of Cylinders With Repetitive Laser Energy Depositions", 3rd Int'l Photonics & OptoElectronics Meetings (POEM 2010), Journal of Physics: Conference Series 276 (2011) 012021, IOP Publishing [retrieved on Oct. 20, 2015]. Retrieved from http://iopscience.iop.org/article/10.1088/1742-6596/276/1/012021. 8 pages.

Gold, et al., "Concrete Penetration By Eroding Projectiles Experiments and Analysis", Journal of Engineering Mechanics, v122, Feb. 1996, pp. 145-152 [Retrieved from: ascelibrary.org on Feb. 17, 2013.].

Gold, et al., "Constitutive Models For Concrete Penetration Analysis", Journal of Engineering Mechanics, vol. 122, Mar. 1996, pp. 230-238. Retrieved from ascelibrary.org on Feb. 17, 2013,.

Hansen, Viggo, "Ram Accelerator Animation", Published on May 2, 2011.

Lundquist, Robert G., "Underground Tests Of The Ream Method Of Rock Fragmentation For High-Speed Tunneling", Rapid Excavation And Tunneling Conference Proceedings, Ch 56, Retrieved from: http://www.onemine.brg/view/?d=689528D8459E7257609C73381053FBF203FD5CC5A9FC7839952A414670F0591638551, Mar. 13, 2013, Jan. 1974, pp. 825-840.

Goodwin, Michael Alan, "Final Office Action dated Aug. 24, 2023", U.S. Appl. No. 17/096,435, filed Aug. 24, 2023.

Ro, Yong-Suk, "Non-final Office Action dated Sep. 14, 2023", U.S. Appl. No. 18/172,728, filed Sep. 14, 2023.

* cited by examiner

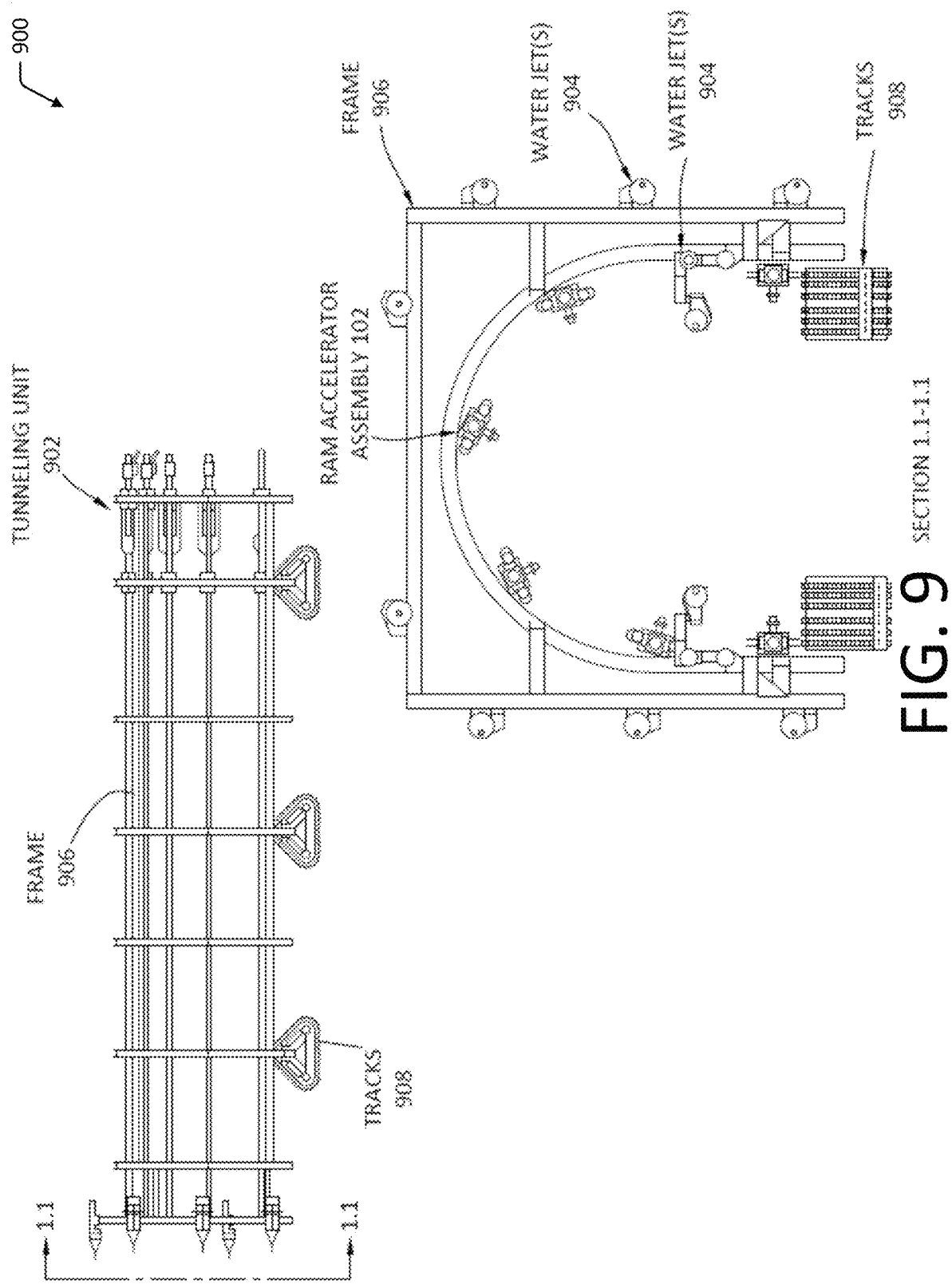

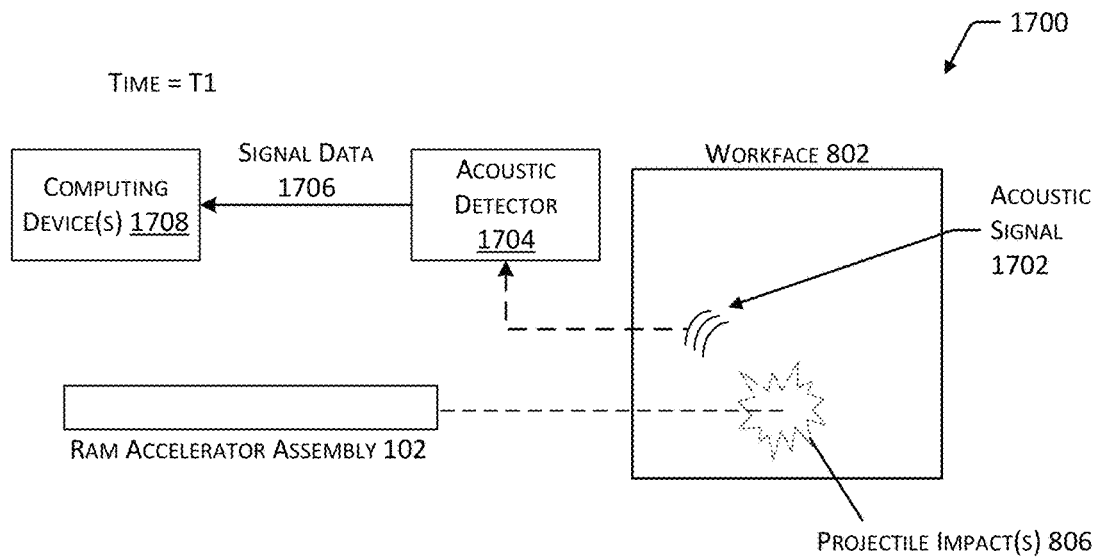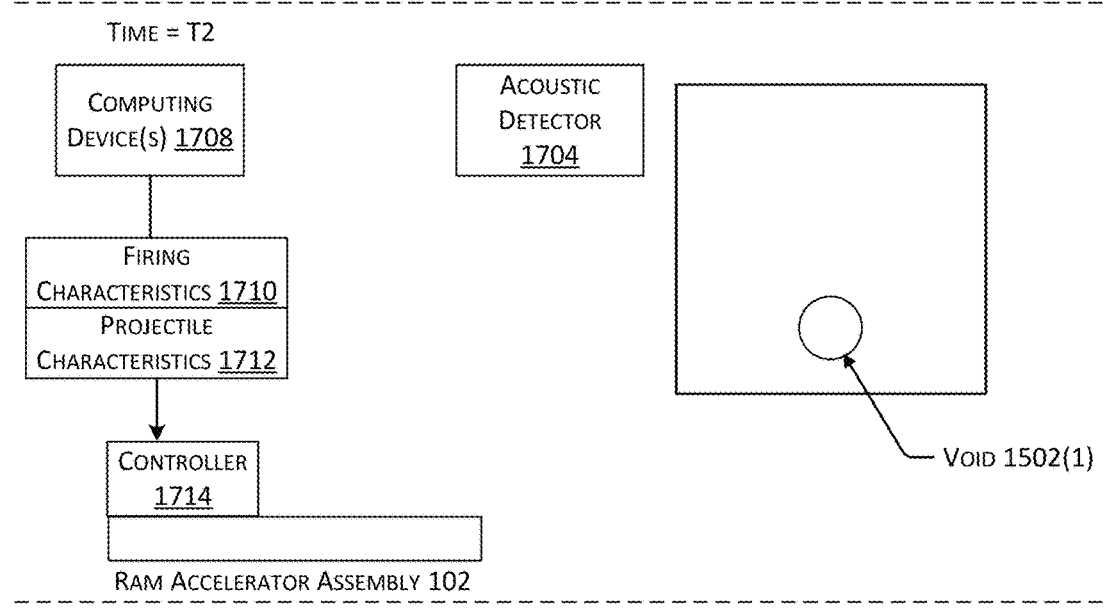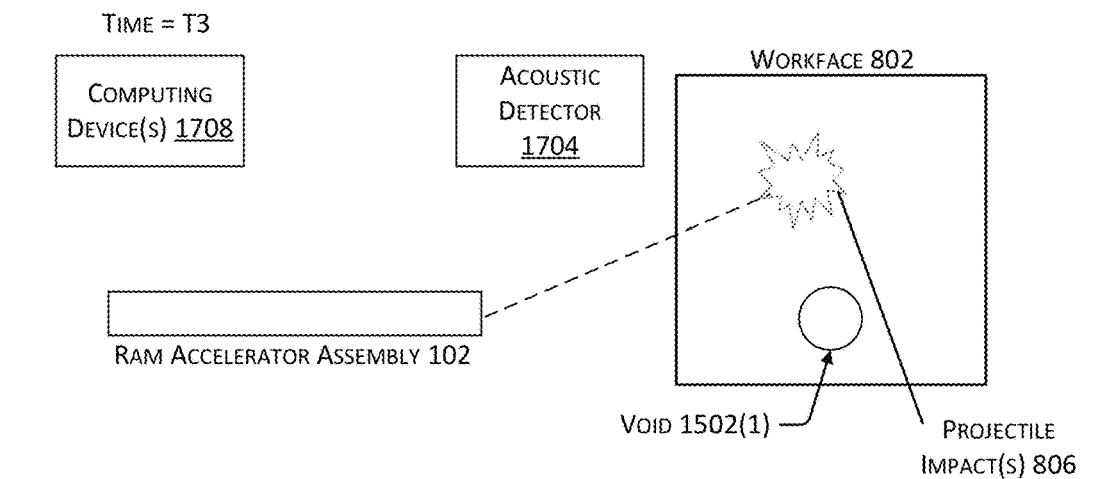
FIG. 17

TIME = T1
REMOVE A FIRST ZONE OF GEOLOGIC MATERIAL USING PROJECTILE IMPACTS AND/OR CUTTING TOOLS
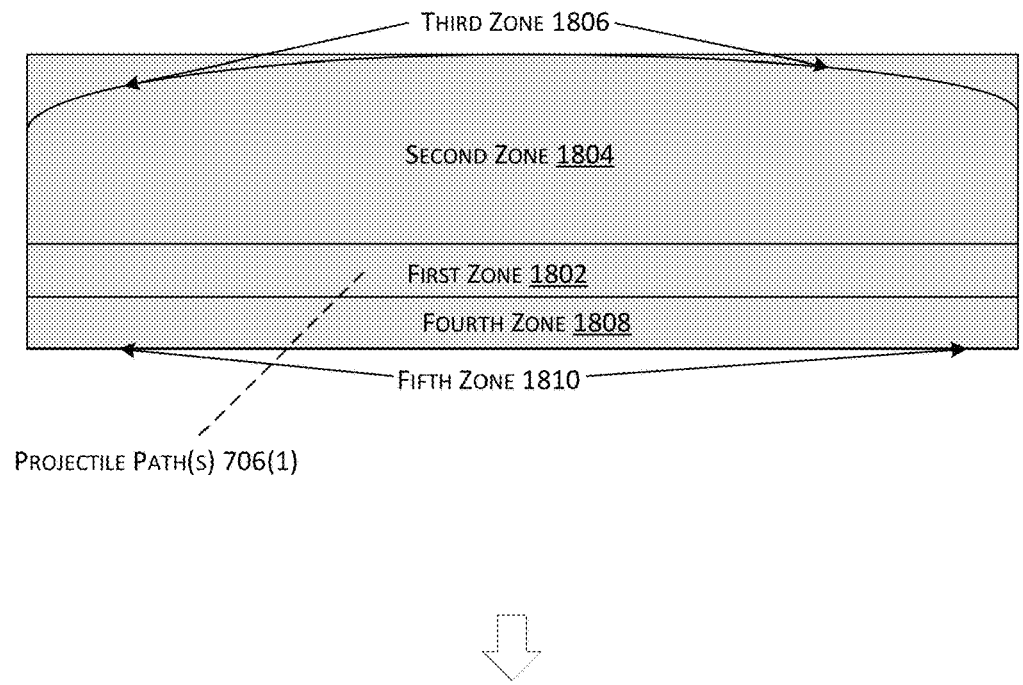
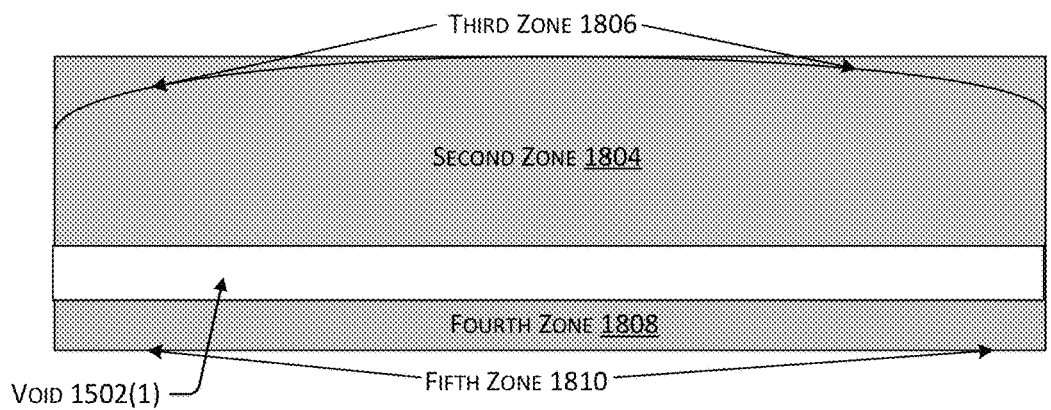
FIG. 18A

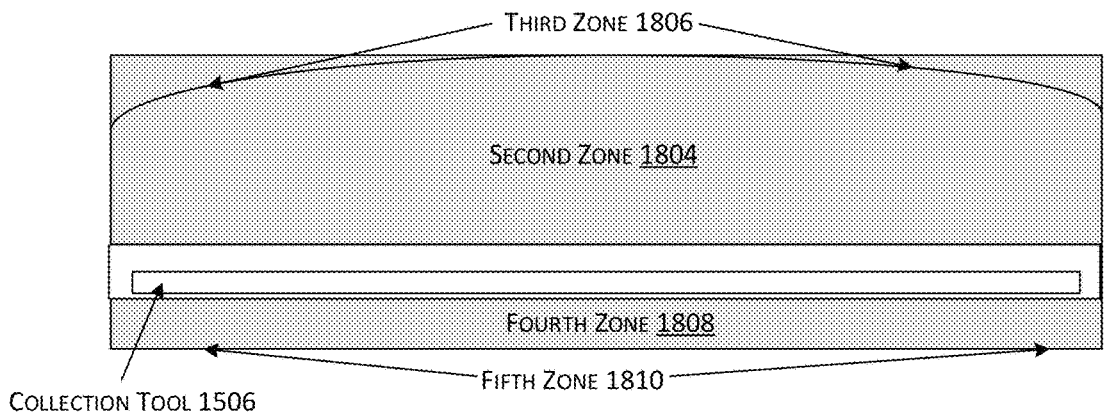
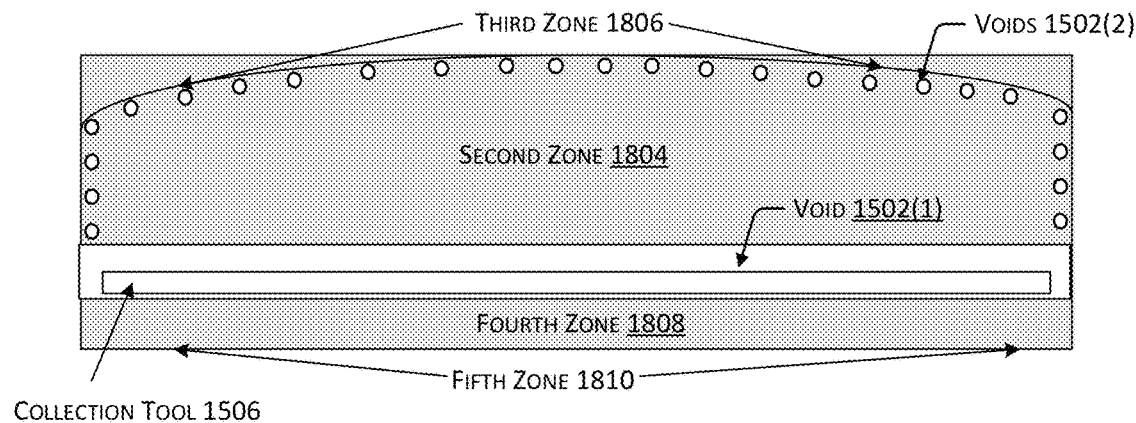
FIG. 18B

TIME = T4
REMOVE THE SECOND ZONE OF GEOLOGIC MATERIAL USING PROJECTILE IMPACTS AND/OR CUTTING TOOLS
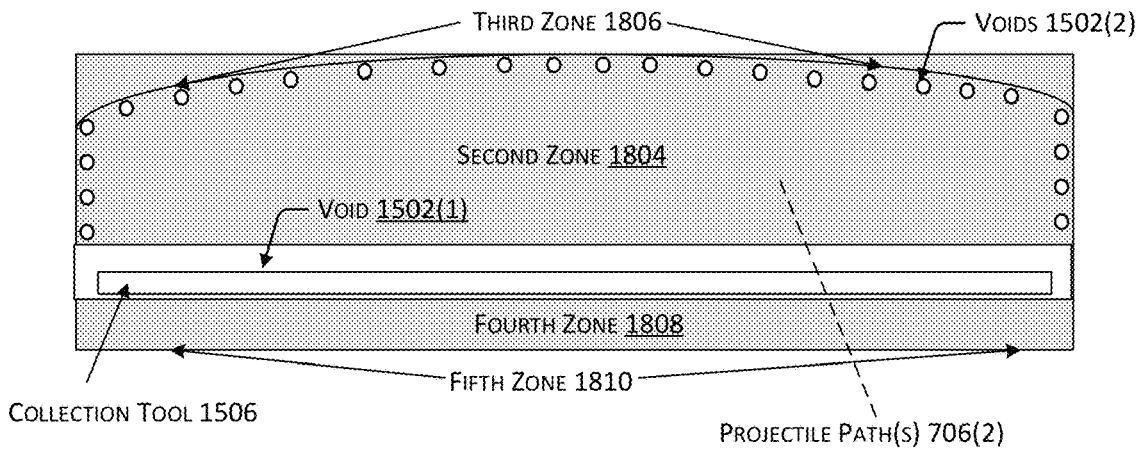
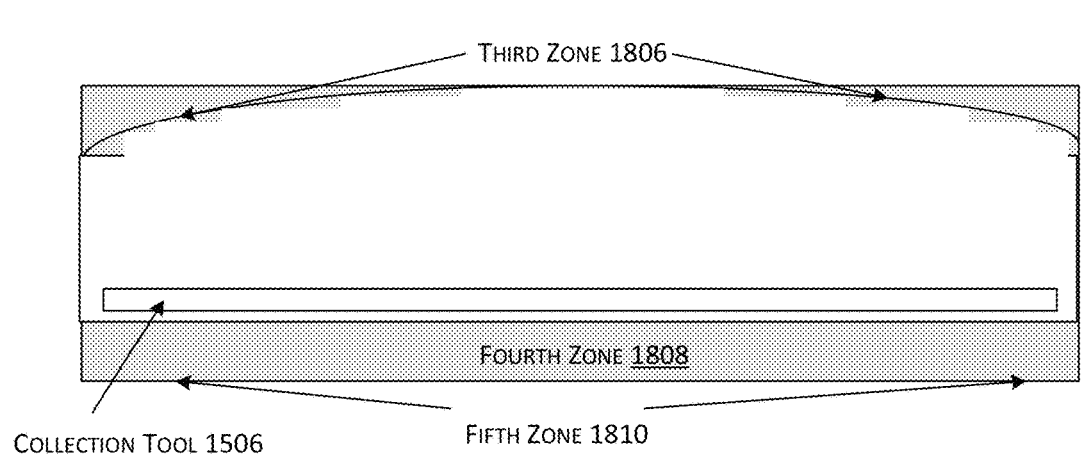
FIG. 18C TIME = T5
REMOVE A THIRD ZONE OF GEOLOGIC MATERIAL BY CONTOURING SECOND ZONE WITH CUTTING TOOLS
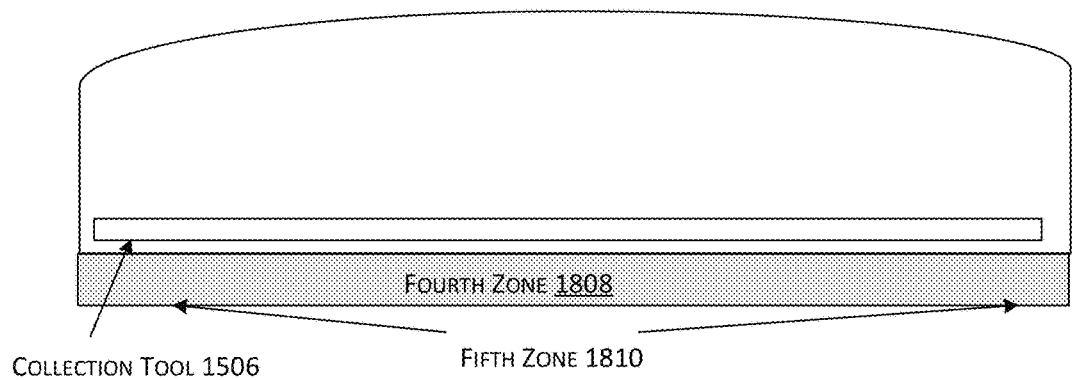
COLLECTION TOOL 1506   FOURTH ZONE 1808   FIFTH ZONE 1810
TIME = T6
REMOVE DEBRIS USING COLLECTION TOOL AND PRECONDITION PERIMETER REGION OF FOURTH ZONE
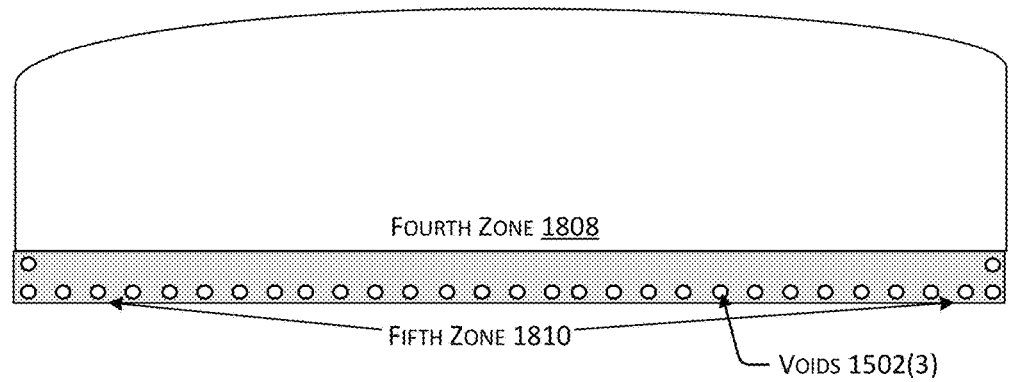
FOURTH ZONE 1808   FIFTH ZONE 1810   VOIDS 1502(3)
FIG. 18D TIME = T7
REMOVE THE FOURTH ZONE OF GEOLOGIC MATERIAL USING PROJECTILE IMPACTS AND/OR CUTTING TOOLS
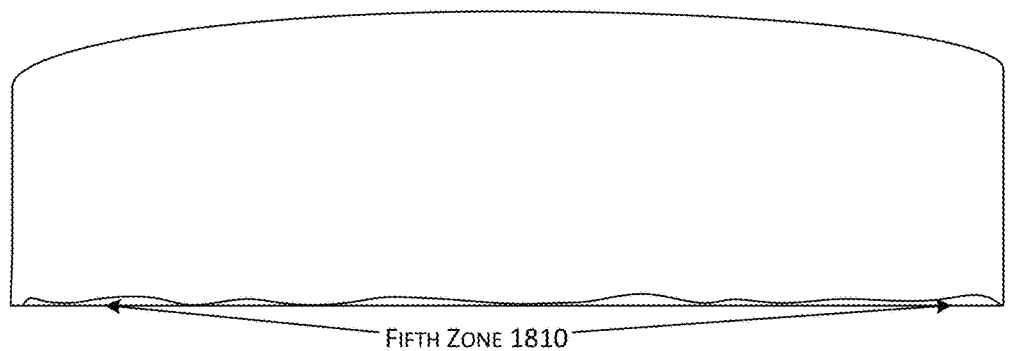
TIME = T8
REMOVE A FIFTH ZONE OF GEOLOGIC MATERIAL BY CONTOURING THE FOURTH ZONE USING CUTTING TOOLS
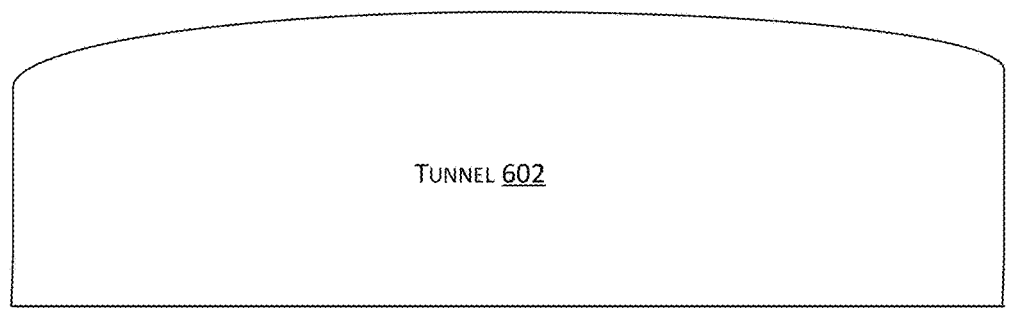
FIG. 18E

TUNNELING AND MINING METHOD USING PRE-CONDITIONED HOLE PATTERN

PRIORITY

The present application is a non-provisional application that claims priority to the United States Provisional Patent Application having Application Ser. No. 63/120,108, filed Dec. 1, 2020. Application 63/120,108 is incorporated by reference herein in its entirety.

The present application is a continuation-in-part of and claims priority to the United States Patent Application having application Ser. No. 17/096,435, filed Nov. 12, 2020. Application Ser. No. 17/096,435 is incorporated by reference herein in its entirety.

The present application is a continuation-in-part of and claims priority to the United States Patent Application having application Ser. No. 17/445,168, filed Aug. 16, 2021. Application Ser. No. 17/445,168 is incorporated by reference herein in its entirety.

INCORPORATION BY REFERENCE

The following United States patents and patent applications are incorporated by reference for all that they contain:

U.S. patent application Ser. No. 13/841,236, filed on Mar. 15, 2013, entitled "Ram Accelerator System", now issued as U.S. Pat. No. 9,500,419.

U.S. patent application Ser. No. 14/708,932, filed on May 11, 2015, entitled "Ram Accelerator System with Endcap", now issued as U.S. Pat. No. 9,458,670.

U.S. patent application Ser. No. 14/919,657, filed on Oct. 21, 2015, entitled "Ram Accelerator System with Rail Tube", now issued as U.S. Pat. No. 9,988,844.

U.S. patent application Ser. No. 15/135,452, filed on Apr. 21, 2016, entitled "Ram Accelerator System with Baffles", now issued as U.S. Pat. No. 10,697,242.

U.S. patent application Ser. No. 15/340,753, filed on Nov. 1, 2016, entitled "Projectile Drilling System", now issued as U.S. Pat. No. 10,557,308.

U.S. patent application Ser. No. 15/698,549, filed on Sep. 7, 2017, entitled "Augmented Drilling System", now issued as U.S. Pat. No. 10,590,707.

U.S. patent application Ser. No. 15/348,796, filed on Nov. 10, 2016, entitled "System for Generating a Hole Using Projectiles", now issued as U.S. Pat. No. 10,329,842.

U.S. patent application Ser. No. 15/871,824, filed on Jan. 15, 2018, entitled "System for Acoustic Navigation of Boreholes", now issued as U.S. Pat. No. 10,914,168.

BACKGROUND

Traditional drilling, excavation, and tunneling methods use drills or other boring tools, or in some cases blasting operations, to penetrate through rock or other types of geologic material. The advancement of a mining shaft, tunnel, or other type of borehole may be hindered by characteristics of the geologic material, such as the presence of hard rock. Additionally, boring through hard rock or other materials may cause breakage in an uncontrolled manner, which may necessitate additional operations to modify or maintain the shape of a shaft or tunnel. Such operations may also cause the formation of significant amounts of broken rock or other debris, which must be transported away from a workface.

BRIEF DESCRIPTION OF FIGURES

The detailed description is set forth with reference to the accompanying figures.

FIG. 9 is a series of diagrams illustrating an implementation of a tunneling unit that may be used to condition a surface and displace material from the surface using a combination of water jets and ram accelerator assemblies.

FIG. 17 is a diagram depicting use of acoustic signals generated by a projectile impact to determine characteristics of geologic material, which may be used to control the firing parameters of a ram accelerator assembly.

FIGS. 18A-18E are a series of diagrams depicting an implementation of a method for sequentially removing regions of geologic material to form a section of a tunnel using a combination of projectile impacts and cutting tools.

Figure 1:
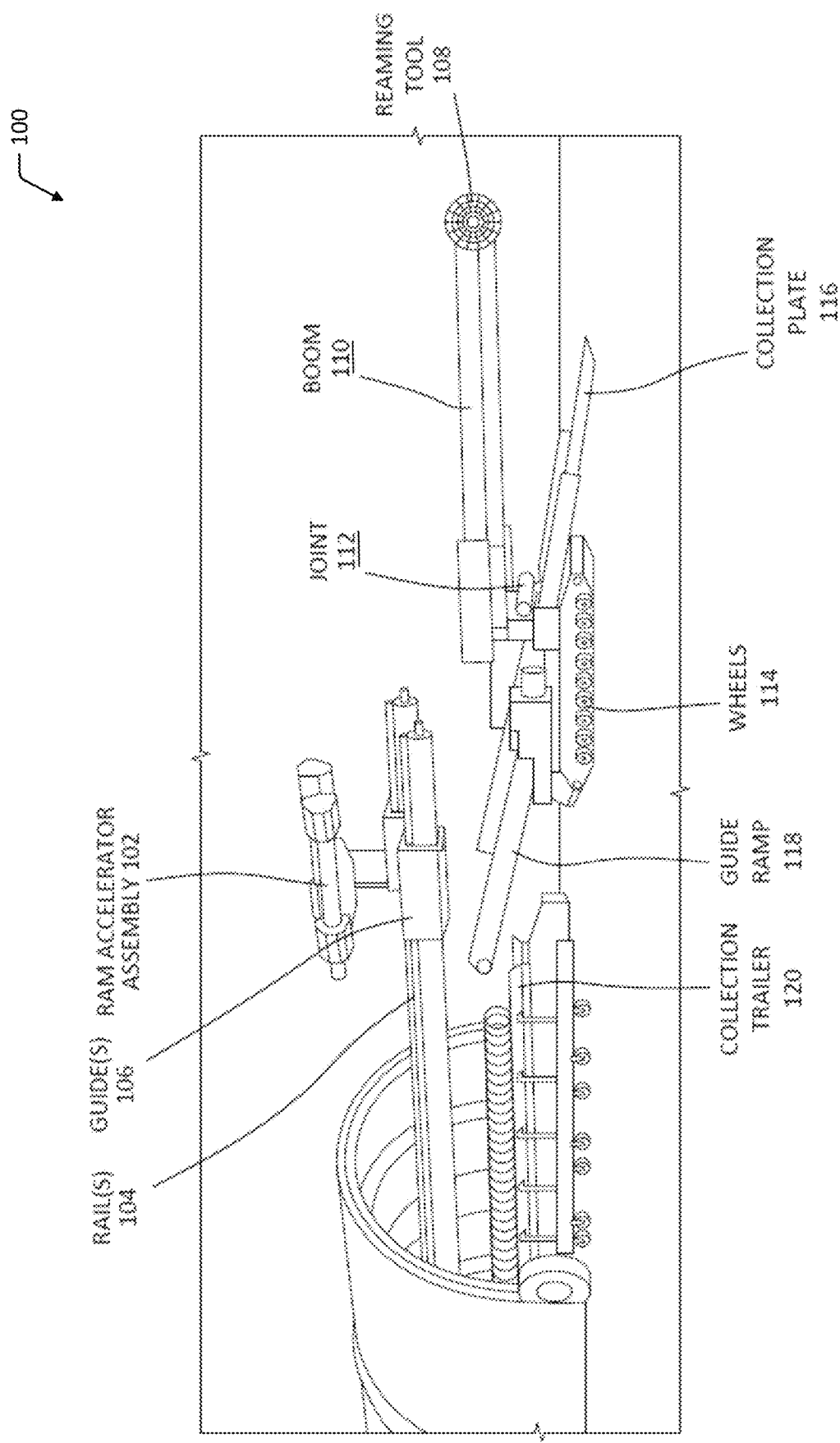
FIG. 1 depicts an implementation of a system that may be used for generally continuous tunneling, boring, or mining operations.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Described in this disclosure are techniques that may enable generally continuous mining, tunneling, and boring operations, which may improve efficiency over conventional techniques. To weaken rock or other material located at a workface, such as at the end of a shaft or tunnel to be extended, projectiles are accelerated into the workface. In some implementations, a ram accelerator assembly may use pressurized gas to accelerate the projectiles using a ram effect caused by interaction between exterior features of the projectile and interior features of a tube or other conduit of the ram accelerator assembly. The accelerated projectiles may achieve a high velocity that may enable the projectiles to break or otherwise degrade the geologic material that is impacted. By orienting the tube or other conduit through which the projectiles are accelerated, the projectiles may be used to selectively contact particular portions of a region of geologic material in a manner that improves the rate of penetration of tools used to displace geologic material, or in some cases the rate of penetration of additional accelerated projectiles, and may control the portions of geologic material that are broken by controlling the forces caused by cutting operations. For example, a cutting tool, reaming tool, impact tool, or other type of tool that may be used to displace geologic material, or an additional projectile, may apply a compressive force (e.g., a shockwave or impact wave) to a region of geologic material. The compressive force may interact with a void created by a previous projectile impact, which may define a free face that allows the shockwave from a subsequent operation to be reflected (e.g., a rarefaction wave). The resulting tension force may more readily break rock or other geologic material, when compared to use of compressive forces alone, improving the rate of penetration of the subsequent projectile impacts or tunneling operations. Additionally, debris from the subsequent projectile impacts or tunneling operations may be displaced into the voids formed by the first projectile impact(s).

In some implementations, one or more projectiles may be accelerated into contact with an interior region of a workface, such as a central region enclosed by a perimeter region. Interaction(s) between the projectile(s) and the geologic material may displace the geologic material to form voids. At a subsequent time, a cutting tool, reaming tool, impact tool, or other type of tool used to displace geologic material, or one or more additional projectiles, may contact the workface, such as to extend a shaft or tunnel. For example, an interaction between a cutting tool or additional projectile(s) and the geologic material would typically apply a compressive force to the geologic material to displace the geologic material at or near the point of contact. However, compressive force(s) from the cutting tool or additional projectile(s) may interact with the void(s) formed using the first projectile(s) to form a tension force. The resulting tension force may more readily break rock or other geologic material, with a greater rate of penetration when compared to compressive forces alone. Debris from the subsequent projectile impacts or tunneling operations may be displaced into the voids formed by the first projectile impact(s). In some implementations, a portion of a conveying system, such as a collection plate or conveyor belt, may be positioned in a void created by an initial projectile impact to enable debris from subsequent projectile impacts or tunneling operations to fall into contact with the conveying system for transport away from the workface.

In some implementations, a perimeter region of the geologic material may be pre-conditioned by forming one or more voids within the region. Pre-conditioning the region may include use of one or more projectile impacts, or in some cases, a preconditioning tool such as a water jet, drill, cutting tool, or other similar tools. For example, the projectile impacts or other tools may form one or more voids that define a perimeter of a region of geologic material. Subsequent projectile impacts or tunneling operations that contact geologic material that is within the perimeter may cause compressive forces, which interact with the voids at the perimeter to form tension forces. As a result, the voids that define the perimeter may limit the breakage of geologic material outside of the perimeter, enabling the tunnel or shaft to be provided with a controlled cross-sectional shape. Additionally, the formation of voids at the perimeter of a region of geologic material may improve the rate of penetration of subsequent projectile impacts or tunneling operations due to the resulting tension forces more readily breaking rock or other material when compared to compressive forces.

In some implementations, an impact between a projectile and the geologic material may cause propagation of an acoustic signal through at least a portion of the geologic material. An acoustic detector or other device may be used to determine data indicative of the acoustic signal, which may be analyzed, such as by using one or more computing devices, to determine characteristics of the geologic material based on transmission of the acoustic signal. For example, the manner in which the acoustic signal propagates through different regions of geologic material may be used to determine a porosity, hardness, or other characteristics of the geologic material. Based on the determined characteristics, one or more projectile characteristics or firing characteristics for a subsequent projectile impact may be determined. For example, to penetrate through hard rock, a projectile having a steel body and tapered shape, or another type of high-density body, may be used. As another example, to penetrate through soft or porous material, a projectile having a concrete body and a broader shape may be used. The projectile may be accelerated using selected types and quantities of propellant materials to provide the projectile with a target velocity. For example, accelerating a projectile to a ram velocity using a pressurized gas may affect the manner in which the projectile interacts with the workface and the shape of a crater that is formed, when compared to an impact by a projectile having a lower velocity. In some cases, based on the determined characteristics of the geologic material, use of a projectile impact may be omitted and one or more other cutting tools, reaming tools, impact tools, or other tools to displace geologic material may be used. For example, in response to determining the presence of a soft or porous material, such as sandstone, a cutting tool may be used to displace the soft or porous material without use of a subsequent projectile impact. In some cases, a cutting tool may be used in conjunction with an acoustic sensor, a time of flight sensor, one or more cameras, vibration sensors associated with the cutting tool, or other types of sensors, to determine characteristics of the geologic material that is contacted using the cutting tool. For example, the amount of debris produced during an interaction between a cutting tool and the geologic material may indicate characteristics of the geologic material, such as hardness or porosity. Based on the characteristics determined using the sensor associated with the cutting tool, the presence of hard rock or other similar material may be determined, and a subsequent projectile impact may be used to weaken the hard material. In cases where material suitable for degradation using a projectile impact is not detected, operation of the cutting tool may continue without use of projectile impacts. In cases where the presence of hard or non-porous material is determined, either using sensors associated with a cutting tool or an acoustic signal generated by a previous projectile impact, the number of projectile impacts used and the locations of the projectile impacts may be determined based on characteristics of geologic material. For example, projectile impacts may be selectively used to target regions of hard rock or veins of ore to be extracted, while regions of softer or more porous material may be contacted with a cutting tool without first impacting those regions with a projectile.

In some implementations, combinations of projectile impacts, pre-conditioning tools, and cutting, reaming, impact, or other material displacement tools may be used to sequentially remove different regions of geologic material from a larger region. For example, at a first time, one or more projectile impacts may be used to weaken a first region of geologic material. Subsequent projectile impacts or cutting tools may then be used to degrade or displace geologic material from the first region, which may be conveyed away from the workface. In some cases, the void created by this operation may be used to position a collection or conveying system to remove debris, to place cutting tools, other types of material displacement tools, or projectile launching systems into the void, for subsequent operations, and so forth. At a subsequent time, additional projectile impacts, cutting or displacement tools, or both projectile impacts and cutting or displacement tools may be used to remove a second region of geologic material adjacent to the void created at the first time. This process may be repeated to sequentially remove regions of geologic material until a space having a desired shape is formed.

FIG. 1 depicts an implementation of a system 100 that may be used for generally continuous tunneling, boring, or mining operations. The system 100 may include a plurality of vehicles or other types of assemblies that may be moved relative to a workface, such as the end of a tunnel or shaft. In some implementations, each assembly may be moved separately from other assemblies. Additionally, in some implementations, each assembly and the operation thereof may be controlled remotely, such as through use of one or more computing devices located remote from a site where a tunneling, boring, or mining operation is performed. Computing devices may communicate with controllers that are associated with various components of the system 100, such as to cause acceleration of projectiles into a workface, actuation of a cutting tool, collection of debris, and so forth.

A first assembly of the system 100 may include a ram accelerator assembly 102. The ram accelerator assembly 102 may be used to accelerate projectiles into a workface, such as the end of a tunnel or shaft to be extended. The ram accelerator assembly 102 may include one or more chambers for containing projectiles and propellant materials. For example, a first chamber may include a combustible material, such as diesel fuel, natural gas, or other types of material that may be ignited to apply a force to a projectile within a second chamber. In other implementations, the propellant material may include one or more gas generating materials. In still other implementations, the propellant material may include one or more explosive materials. In some implementations, a system may include equipment for performing high pressure electrolysis to create hydrogen and oxygen for use accelerating projectiles, reducing or eliminating the need to supply a ram accelerator assembly 102 with a separate source of propellant material. In some cases, multiple types of propellant materials may be used in different portions of the ram accelerator assembly 102, such as a combination of diesel and air in a first portion and a combination of diesel and natural gas in a second portion. Independent of the source(s) or type(s) of propellant material used, the propellant material may apply a force to one or more projectiles to accelerate the projectile(s) toward a workface. In some implementations, interactions between the projectile, force from the propellant material, and features of a tube or other portion of the ram accelerator assembly 102, may impart a ram effect to the projectile. For example, interior baffles or rails within a tube of the ram accelerator assembly 102, in conjunction with the exterior features of a projectile, may enable pressurized gas to accelerate a projectile using a ram effect by accumulating pressure behind the projectile while interactions between the projectile and tube resist movement of the projectile. In some implementations, the projectile may achieve a ram velocity prior to exiting the ram accelerator assembly 102 and contacting a workface. In other implementations, the ram accelerator assembly 102 may not necessarily impart a ram effect to a projectile or cause the projectile to achieve a ram velocity. Additionally, while the ram accelerator assembly 102 is described using the term "ram accelerator", a rail gun, gas gun, or other method of providing force to projectiles may also be used.

The projectiles may have any shape and dimensions and may be formed from any type of material. In some implementations, the projectiles may be formed from concrete, which may conserve cost and enable efficient construction of projectiles compared to other materials. In other implementations, the projectiles may be formed from steel or another high-density material, which may facilitate penetration of the projectile(s) into a workface. In some implementations, the projectiles may have a wedge or tapered shape to facilitate penetration into a workface. In other implementations, the projectiles may have broad shapes, such as a cylindrical shape, which may cause a greater amount of force to be applied to a surface of the workface. Example implementations of ram accelerator assemblies, projectiles, and propellant materials are described with regard to the applications incorporated by reference previously.

In some implementations, the ram accelerator assembly 102 may be moved toward and away from a workface via one or more rails 104, which may be engaged to the ram accelerator assembly 102 using one or more guides 106. In other implementations, the ram accelerator assembly 102 may be moved toward or away from a workface using wheels, tracks, treads, and so forth. For example, a trailer or other type of vehicle may be used to transport the ram accelerator assembly 102 within a tunnel or shaft. In some implementations, the ram accelerator assembly 102 may be articulated, aimed, and so forth to cause projectiles to impact one or more desired locations on a workface. For example, interactions between a projectile and the workface at selected locations may pre-condition the workface to increase the efficiency of subsequent tunneling operations and control the shape of the tunnel created by the subsequent tunneling operations. Continuing the example, use of one or more projectile impacts to form a central hole in a workface at or near a location where a tunnel will be extended may create a free face that allows shockwaves from subsequent projectile impacts or use of tunneling tools to be reflected in a manner that enables more effective penetration through materials and more effective control of the resulting shape of the tunnel. For example, after a central hole is formed in a region of a workface, interactions between a compressive force from subsequent tunneling operations may interact with the central hole to cause a tension force that may break or degrade geologic material more efficiently than compressive forces alone. Additionally, debris from subsequent tunneling operations may fall into the void created by the initial projectile impact(s). In other implementations, other patterns of holes may be formed in the workface to weaken the workface and improve the rate of penetration using a tunneling tool, and to control the resulting shape of a tunnel. For example, a group or cluster of holes within a central region of a workface may be formed rather than a single hole. In other implementations, one or more voids may be formed near the perimeter of a desired region of geologic material to limit breakage of material outside of the perimeter while also improving the rate of penetration by causing tension forces in response to the compressive forces of subsequent operations. Independent of the locations of the holes formed in the workface, the holes may provide free faces that are impacted by shockwaves from subsequent projectile impacts or tunneling operations, which may improve the efficiency at which material is displaced from the workface and control the shape of the resulting tunnel.

Interactions between a workface and projectiles that are accelerated using the ram accelerator assembly 102 may at least partially crack, weaken, break, or pulverize rock or other material at the workface. In some cases, interactions between a workface and one or more projectiles may form one or more voids within the geologic material. As described previously, in some implementations, the ram accelerator assembly 102 may be selectively aimed or otherwise positioned to impact a particular portion of a workface. A reaming tool 108 may then be used to extend a hole created by a projectile, such as by removing material from and around the area of the workface affected by the impact, or by contacting other areas of the workface. While FIG. 1 depicts a reaming tool 108, in other implementations, other types of cutting tools, impact tools, or tools for displacing geologic material may be used. In some implementations, the reaming tool 108 may include a roadheader tool, which may scale and muck rock or other material that has been affected by a projectile impact. The reaming tool 108 may be associated with a boring assembly of the system 100, which in some implementations may include a vehicle that is separate from the ram accelerator assembly 102. In other implementations, the reaming tool 108 may be associated with the same vehicle or other type of assembly as the ram accelerator assembly 102 and positioned relative to the ram accelerator assembly 102 such that the reaming tool 108 may contact a portion of a workface after a projectile impact. For example, the reaming tool 108 may be used to smooth or extend the edges of a crater created by an interaction between a projectile and the workface. A region of geologic material that is weakened by an impact with one or more projectiles may be considerably easier to remove using mechanical energy, such as the rotational movement or other movement of a cutting head on the reaming tool 108, when compared to conventional boring using rotational movement of a drill or other type of reamer. For example, the compressive forces from the cutting tool may interact with one or more voids to form tension forces that may pull or break geologic material more efficiently than compressive forces alone. Therefore, the wear on the cutting head of the reaming tool 108 and the mechanical rotational energy needed to remove material may be lower than the wear and energy associated with conventional boring operations. Additionally, as described previously, the shape of portions of material that are removed from a workface may be controlled based on the location of holes or other weakened areas created using projectile impacts.

In some implementations, the reaming tool 108 may be moved, oriented, aimed, and so forth, to contact a selected portion of a workface. For example, after a projectile from the ram accelerator assembly 102 has impacted a first region of geologic material, the reaming tool 108 may be oriented such that a cutting head thereof contacts either the same portion of the workface that was impacted by the projectile, or a second portion of the geologic material that encloses the first portion. Continuing the example, FIG. 1 depicts the reaming tool 108 associated with a boom 110 that is in turn associated with a pivoting or articulating joint 112. The articulating joint 112 may enable the cutting surface(s) of the reaming tool 108 to be raised, lowered, and in some cases, moved in one or more lateral directions. In some implementations, the boom 110 may be extended and retracted (e.g., telescopically) to position the cutting surface(s) of the reaming tool 108 farther from or closer to the workface. The reaming tool 108 may also be moved toward or away from a workface using motive force. For example, the reaming tool 108 may include wheels 114, treads, tracks, or other structures to facilitate movement thereof. In other implementations, the reaming tool 108 may be engaged with rails, tracks, or other similar structures. While FIG. 1 depicts a single reaming tool 108, in other implementations, multiple reaming tools 108 may be used to extend a shaft or tunnel. The multiple reaming tools 108 may be associated with a single vehicle or boring assembly, or with multiple vehicles or assemblies. For example, multiple reaming tools 108 may be used to simultaneously bore through the same or different portions of a workface, such as to remove a large block of material from a workface.

In some implementations, a combination of projectile impacts and reaming tools 108, or other types of tools, may be used to create a hole having dimensions larger than those of the reaming tool 108 or other equipment used to form a shaft or tunnel. For example, the ram accelerator assembly 102 may accelerate projectiles at an angle that is not parallel to the longitudinal axis of the tunnel or shaft, and the reaming tool 108 may be positioned to displace material from locations impacted by the projectiles. As a result, a hole having larger dimensions than the assemblies used to form the hole can be created without requiring conventional over-reamer mechanical systems.

A third assembly associated with the system 100 may include a collection system for collecting, transporting, displacing, or otherwise removing debris created by projectile impacts and by operations performed using the reaming tool 108 from the workface. In some implementations, a collection plate 116 may be associated with the collection assembly that includes the reaming tool 108. For example, FIG. 1 depicts a collection plate 116 as a ramp, platform, or similar structure positioned below the reaming tool 108 in a position proximate to the ground beneath the reaming tool 108. The collection plate 116 may catch or collect rock debris and other material from the workface created due to interactions between the workface and projectiles or the reaming tool 108. For example, the collection plate 116 may extend at a downward angle from the reaming tool 108 to contact or be positioned close to a floor of a shaft or tunnel, such that as the reaming tool 108 is advanced toward the workface, the collection plate 116 is advanced beneath debris or into debris that has fallen along the floor of the shaft or tunnel. In some implementations, the collection plate 116 may include an extension, arm, or other feature for removing rock or other material from the path of the boring assembly that includes the reaming tool 108, or other vehicles or assemblies, such as by leaving an undercut portion of a tunnel or shaft, which may prevent damage to components of the system 100. In some implementations, the collection plate 116 may be movable in vertical directions, such as to position the collection plate 116 closer to a floor of a shaft or tunnel, or to raise the collection plate to cause movement of collected debris toward a guide ramp 118 located behind the collection plate 116. For example, one or more joints 112 may also enable movement of the collection plate 116. In some implementations, the collection plate 116 may also be movable in one or more lateral directions. Additionally, in some implementations, the collection plate 116 may be movable inward or outward relative to the boring assembly that includes the reaming tool 108, such as through use of a boom 110 or another type of telescoping member. Movement of the boring assembly that includes the reaming tool 108 and collection plate 116 in a forward direction, such as through use of the wheels 114 or a similar member, may also be used to move the collection plate 116 closer to debris associated with a workface. In some implementations, the collection plate 116 or other portion of the collection system may be movable into a void created within geologic material by a projectile impact. Subsequently, when the reaming tool 108 or a subsequent projectile impact is used to extend a shaft or tunnel, debris from the resulting interaction may fall toward the collection plate 116 for transport away from the workface.

Movement of the collection plate 116 may move debris collected by the collection plate 116 toward the guide ramp 118. In some implementations, at least a portion of the collection plate 116 or guide ramp 118 may include a conveyor belt or other mechanism for imparting motive force to debris. In other implementations, one or more of the collection plate 116 or guide ramp 118 may be pivotable to shift debris away from the collection plate 116 and toward the guide ramp 118. In still other implementations, forward movement of the reaming tool 108 may function to move debris toward the guide ramp 118. In yet other implementations, the reaming tool 108, itself, or one or more arms associated with the collection plate 116 may be used to sweep debris and other materials into the connection plate 116, and in some cases toward the guide ramp 118. For example, the collection plate 116 may be associated with a wheeled or tracked system that is movable toward and away from a workface.

To facilitate removal of debris away from a workface, a collection trailer 120 or other type of movable receptacle may be positioned proximate to a rear end of the guide ramp 118. The collection trailer 120 may include a chute, trough, guide, or other similar structure that may be used to collect debris from the guide ramp 118. In some implementations, the chute, trough, or guide of the collection trailer 120 may impart motive force to debris, such as through use of a conveyor belt or similar device. For example, motive force associated with the collection trailer 120 may be used to move debris away from a workface and toward an entrance of a tunnel or shaft. In other implementations, the collection trailer 120 may be pivotable or angled to urge debris away from a workface using gravity. In still other implementations, the collection trailer 120 may be removed from a worksite using wheels, tracks, rails, or other mechanisms for enabling movement of the collection trailer 120, to enable the collection trailer 120 to be emptied and returned, or replaced with an additional collection trailer 120. In some implementations, the collection trailer 120 may be positioned behind the boring assembly that includes the reaming tool 108, and one or more protruding or overhanging portions extending from the collection trailer 120 may be positioned above the reaming tool 108, collection plate 116, or guide ramp 118, which may protect components thereof.

While FIG. 1 depicts the collection plate 116 and guide ramp 118 associated with the same assembly that includes the reaming tool 108, in other implementations, the collection plate 116 and guide ramp 118 may be associated with a separate assembly. Additionally, while FIG. 1 depicts the collection trailer 120 as a separate assembly from the collection plate 116 and guide ramp 118, in other implementations, the collection trailer 120, or another type of movable receptacle, may be part of the same assembly as the collection plate 116 and guide ramp 118. Any combination of the components described with regard to FIG. 1 may be combined in any number of assemblies. For example, the ram accelerator assembly 102 may be engaged with the collection trailer 120, the boring assembly that includes the reaming tool 108, or may be part of a separate assembly that is disconnected from the boring assembly and the collection trailer 102. As such, while FIG. 1 depicts the ram accelerator assembly 102, reaming tool 108, and collection trailer 120 as discrete components, in various implementations, one or more of the components may be engaged with one another. For example, the reaming tool 108 may include a motor or other source of motive force and may be used to pull one or more of the collection trailer 120 or the ram accelerator assembly 102. In other cases, the ram accelerator assembly 102 and collection trailer 120 may be separate from the reaming tool 108 and may be associated with a vehicle, a motor, or another source of motive force.

The system 100 shown in FIG. 1 may enable efficient and generally continuous boring operations by using accelerated projectiles from one or more ram accelerator assemblies 102 to at least partially weaken a working face. Then, a reaming tool 108 or subsequent projectile impacts may be used to remove debris from an area of the workface. For example, compressive forces associated with use of the reaming tool 108 or a subsequent projectile impact may interact with one or more voids created by one or more first projectile impacts to create tension forces, which may more efficiently displace geologic material when compared to use of compressive forces alone. A collection assembly and collection trailer 120 may be used to remove debris from proximate to the workface while operation of the ram accelerator assembly 102 and reaming tool 108 is performed. For example, a portion of the collection assembly may be positioned within a void created by a projectile impact to enable debris from use of a reaming tool 108 or subsequent projectile impact to fall toward the collection assembly.

While FIG. 1 depicts a single ram accelerator assembly 102, reaming tool 108, and collection trailer 120, in other implementations, an autonomous fleet that includes multiple vehicles may be used to more efficiently bore through a single workface. Additionally, multiple fleets of vehicles at multiple worksites may be coordinated remotely. For example, one or more of the ram accelerator assembly 102, reaming tool 108, or collection trailer 120 may be operated remotely or autonomously, without requiring personnel at a worksite.

In some implementations, the ram accelerator assembly 102 may be selectively used to bore through hard rock and similar materials, while the reaming tool 108 or other type of material displacement tool may be used independent of the ram accelerator assembly 102 to displace softer materials, such as sand or lower strength rock. For example, an acoustic signal caused by a projectile impact may be detected using an acoustic detector, and data representing the acoustic signal may be analyzed to determine characteristics of the geologic material based on the manner in which the acoustic signal propagates through the geologic material. Continuing the example, data based on the acoustic signal may be used to determine a hardness or porosity of particular regions of geologic material, such as locations that include hard rock, locations that include softer material such as porous sandstone, locations that include veins of ore, water, or other materials, and so forth. Based on the determined characteristics of the geologic material, projectiles from the ram accelerator assembly 102 may selectively be used to impact particular locations within the geologic material, and in some cases, use of the ram accelerator assembly 102 may be omitted and the reaming tool 108 may be used without use of projectile impacts, such as when geologic material having a hardness or porosity less than a threshold is determined.

In some implementations, use of the ram accelerator assembly 102 and reaming tool 108 selectively, to maximize one or more of stability (e.g., integrity of the walls or ceiling of a tunnel or shaft), speed, or cost may be controlled remotely or autonomously. Additionally, in some implementations, unintentional acceleration of projectiles by the ram accelerator assembly 102 or acceleration of projectiles by the ram accelerator assembly 102 that may not be beneficial may be prevented through use of one or more computing devices or other autonomous controls. For example, a controller associated with ram accelerator assembly 102 may be configured to only cause the ram accelerator assembly 102 to accelerate projectiles when a "heart-beat" signal has been received from a computing device. In some implementations, a computing device or controller associated with the ram accelerator assembly 102 may be provided with one or more criteria, such as pressure, temperature, inclination, magnetic characteristics, characteristics of geologic material determined based on an acoustic signal, or other types of digital or mechanical measurements. The ram accelerator assembly 102 may be prevented from actuation (e.g., acceleration of projectiles to impact a workface) if selected criteria are not met, or prevented from actuation if certain criteria are present, which may prevent acceleration of projectiles if the ram accelerator assembly 102 is not in a proper location or if use of projectile impacts may not provide a significant benefit. For example, a safety interlock or other type of mechanism may be used to prevent acceleration of a projectile if one or more cameras or other types of sensors detects a human, animal, other equipment such as debris-removal equipment, and so forth within a threshold distance of the ram accelerator assembly 102. In some implementations, the ram accelerator assembly 102 may be associated with accelerometers, laser ring gyros, a GPS, radio guidance systems, imaging systems (e.g., optical systems, cameras, etc.), and so forth, to enable a remote user or autonomous system to determine an optimal time to accelerate a projectile, and to aim the accelerated projectile at a particular portion of a workface. Use of computer-controlled components may improve accuracy when the ram accelerator assembly 102 is used, such as enabling a projectile to accurately impact a workface even while portions of the system 100 are moving.

In some implementations, an acoustic signal generated by an impact between a projectile and a workface may be used control the direction and rate in which a tunnel or shaft is extended. For example, a tunnel or shaft may be preferentially extended toward rock having greater porosity or a lower density or hardness to facilitate faster boring operations, toward or away from subterranean water, and so forth. Example systems and methods for determining acoustic signals generated by projectile impacts and controlling extension of shafts based on this information are described in U.S. patent application Ser. No. 15/871,824, incorporated by reference previously.

Figure 2:
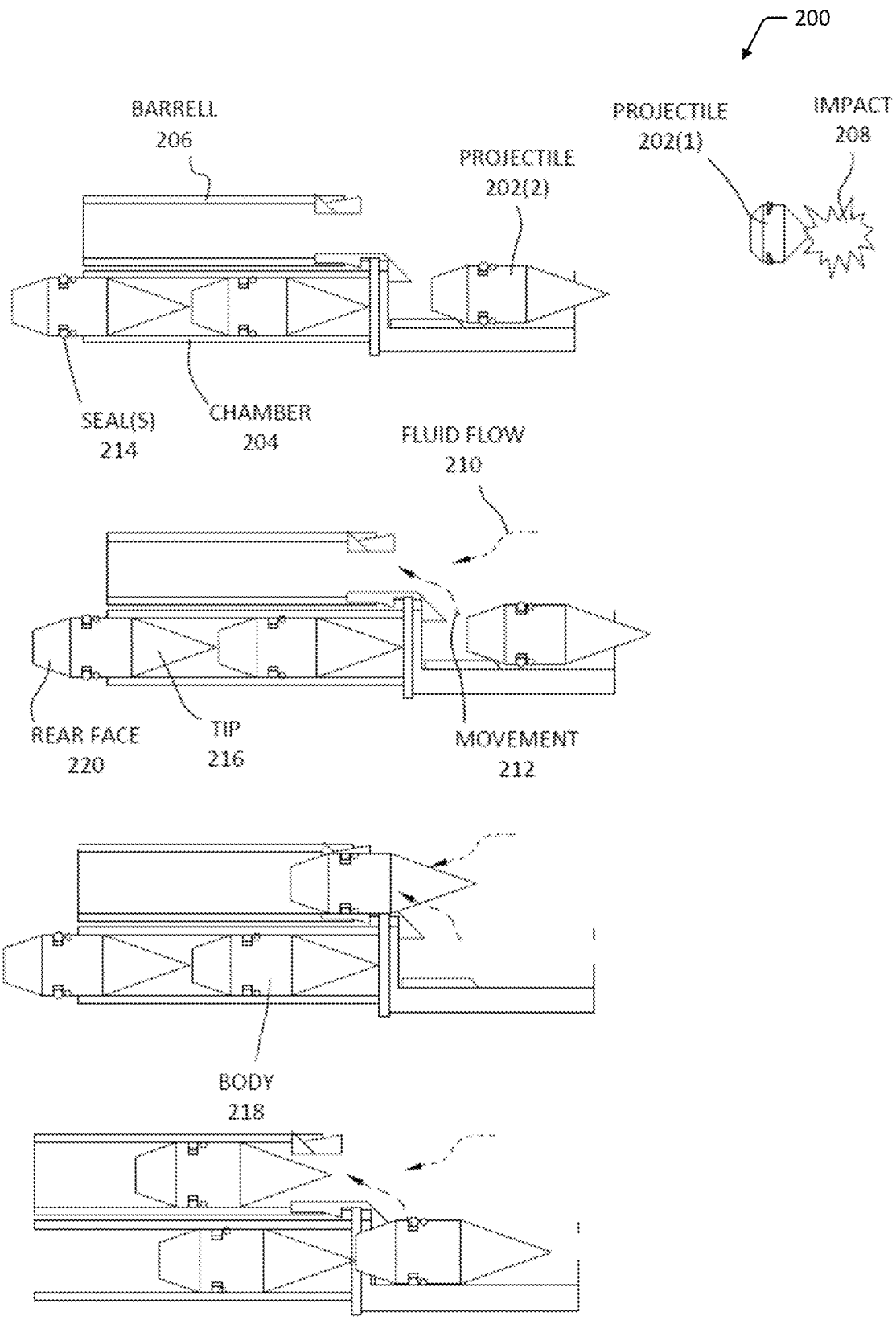
FIG. 2 depicts an implementation of a method by which projectiles may be moved from a chamber used to house the projectiles into a barrel from which the projectiles may be accelerated toward a workface.

FIG. 2 depicts an implementation of a method 200 by which projectiles 202 may be moved from a chamber 204 used to house the projectiles 202 into a launch tube or other type of barrel 206 from which the projectiles 202 may be accelerated toward a workface. Impacts 208 between a projectile 202 and a workface may create a fluid flow 210 that causes movement of other projectiles 202 from the chamber 204 toward the barrel 206. Impacts 208 between the projectile 202 and the workface may also create a void that may affect compressive forces associated with subsequent tunneling operations or projectile impacts 208, such as by controlling the portions of the workface that are affected and increasing the rate of penetration of subsequent operations. Additionally, as described previously, in some implementations, impacts 208 between the projectile 202 and the workface may create an acoustic signal which may propagate through the geologic material, and data representing the acoustic signal may be acquired and used to determine characteristics of the geologic material. Characteristics of subsequent tunneling operations may be selected based on the determined characteristics of the geologic material.

Specifically, FIG. 2 depicts an impact 208 between a first projectile 202(1) and a workface, which may create a fluid flow 210, in which fluid is directed toward an opening in the barrel 206 from which the projectile 202(1) exited. The fluid flow 210 may move a second projectile 202(2) from a position in front of the chamber 204 toward the front of the barrel 206, as indicated by an arrow representing the movement 212 of the second projectile 202(2). The movement 212 of the fluid and second projectile 202(2) may seat the second projectile 202(2) within the barrel 206, such that one or more seals 214 associated with the projectile 202(2) engage the inner diameter of the barrel 206. In some implementations, a locking mechanism, such as a snap ring or other type of movable or expandable portion of the projectile 202 may engage a portion of the inner diameter of the barrel 206 in addition to or in place of the seals 214. For example, the interior of the barrel 206 may include interior features, such as baffles, rails, and so forth, and one or more of the seals 214 or a locking mechanism may interact with the interior features of the barrel 206 to retain the projectile 202 in a particular position within the barrel 206. In some implementations, the seals 214 or a locking mechanism of the projectile(s) 202 may also engage the inner diameter of the chamber 204 when the projectile(s) 202 are positioned therein. After the second projectile 202(2) is seated in the barrel 206, actuation of a propellant material within the barrel 206 may accelerate the second projectile 202(2) toward the workface to generate an impact 208, which may in turn cause fluid flow 210 to facilitate movement of an additional projectile 202 into the barrel 206. In some implementations, the fluid flow 210 may cause a flapper valve or other type of closure mechanism associated with the chamber 204 or barrel 206 to close to prevent excess fluid, debris, or air from entering the chamber 204 or barrel 206. In other implementations, the pressure and movement of fluid within the barrel 206 may prevent debris from entering the chamber 204 independent of the use of a closure mechanism.

While FIG. 2 depicts an implementation in which fluid flow 210 moves projectiles 202 toward a front of the barrel 206, in other implementations, projectiles 202 may be moved toward a back end of the barrel 206, or a side opening of the barrel 206 (e.g., breech loading). Additionally, while FIG. 2 depicts movement of projectiles 202 from a chamber 204 to a barrel 206, in other implementations, a slurry of projectiles 202 may be pumped through tubes toward the barrel 206 of the ram accelerator assembly 102. In still other implementations, one or more projectiles 102 may be generated on-site. For example, the ram accelerator assembly 102 or another assembly associated with the system 100 may fill a plastic container or other type of container with concrete, another curable material, or a dense liquid, and the filled container may be used as a projectile 202. Additionally, in some implementations, to facilitate movement of a projectile 202 into the barrel 206, a vacuum or other type of pressure differential may be created within the barrel 206, such that pressure outside of the barrel 206 that is greater than the pressure inside the barrel 206 causes projectiles 202 to move toward and into the interior of the barrel 206. A pressure differential within the barrel 206 may be used to move subsequent projectiles 202 toward the barrel 206 in place of or in addition to fluid flow 210 from projectile impacts or other external forces that move a projectile 202 into the barrel 206. In other implementations, one or more projectiles 202 may be loaded into the barrel 206 through a side opening (e.g., breech-loaded) in addition to or in place of entry of projectiles 202 through an end opening of the barrel 206. Additionally, in some implementations, mechanical elements, such as rods, cables, coils, and so forth may be used to move projectiles 202 into the barrel in addition to or in place of use of a pressure differential due to fluid movement.

In some implementations, one or more of the projectiles 202 may include a tapered tip 216 to facilitate penetration into a workface. Projectiles 202 may also include a generally cylindrical body 218, and a rear face 220 that facilitates acceleration of the projectile 202 and reduces drag. In some implementations, characteristics of the projectiles 202, such as exterior features of the body 218 of a projectile 202, may interact with characteristics of the barrel 206 to produce a ram effect as the projectile(s) 202 are accelerated through the barrel 206. In some implementations, the projectile 202 may be at least partially consumed or degraded by passage through the ram accelerator assembly 102. For example, at least a portion of the projectile 202 may include aluminum or another material that interacts with air or high temperatures within the ram accelerator assembly 102 which may consume or degrade one or more portions of the projectile 202. Additionally, in some implementations, the projectile 202 may include explosive or impact-sensitive materials that generate a force in response to impact between the projectile 202 and a workface, which may increase the amount of material displaced by the impact of the projectile 202.

In some implementations, one or more of the ram accelerator assembly 102, reaming tool 108, or collection trailer 120 may be operated under a gas or liquid pressure, such as under water, within drilling mud, or in pressurized air, which may increase the buoyancy of debris and conveyance of the debris away from the workface. Increased pressure may also facilitate the stability of a tunnel or shaft, reducing or eliminating a need for rock bolting or other types of ground support. For example, rock and other materials may be more buoyant when submerged in water, drilling mud, or pressurized air, which may enable components of an assembly for conveying debris away from a workface to be lighter and to operate using less force and energy. Additionally, operation of portions of the system 100 within a fluid may reduce or eliminate the need to empty a tunnel of water. Reducing or eliminating the need for water discharge operations may increase efficiency and lower costs related to the extension of a tunnel or shaft. Further, the system 100 may be used in a sloped area (e.g., an incline or a decline), to extend a horizontal tunnel or shaft, or to extend a curved tunnel or shaft. Use of projectiles 202 accelerated using the ram accelerator assembly 102 may enable projectiles 202 to accurately impact a targeted location even when used under pressure, within a fluid, and so forth. For example, while a projectile 202 may lose velocity when traveling through certain media, a projectile 202 accelerated using a ram accelerator assembly 102 may maintain sufficient velocity to accurately impact a target.

In some implementations, tunnel stabilization mechanisms, such as a rock bolting tool for placing rocks bolts, nails, or other stabilizing structures into a wall of a tunnel, a shotcreting tool for providing concrete, mortar, or other materials to a tunnel wall, or other types of tools may be incorporated into one or more of the ram accelerator assembly 102, reaming tool 108, or collection trailer 120. Use of bolting and shotcreting tools, or other types of tunnel stabilization mechanisms, may allow a continuous mining, tunneling, or boring operation to be performed by enabling stabilization and ground support processes to be performed at least partially simultaneously with the acceleration of projectiles, boring of a tunnel or shaft using a reaming tool 108, and removal of debris using the collection plate 116 and other portions of the collection assembly.

Figure 3:
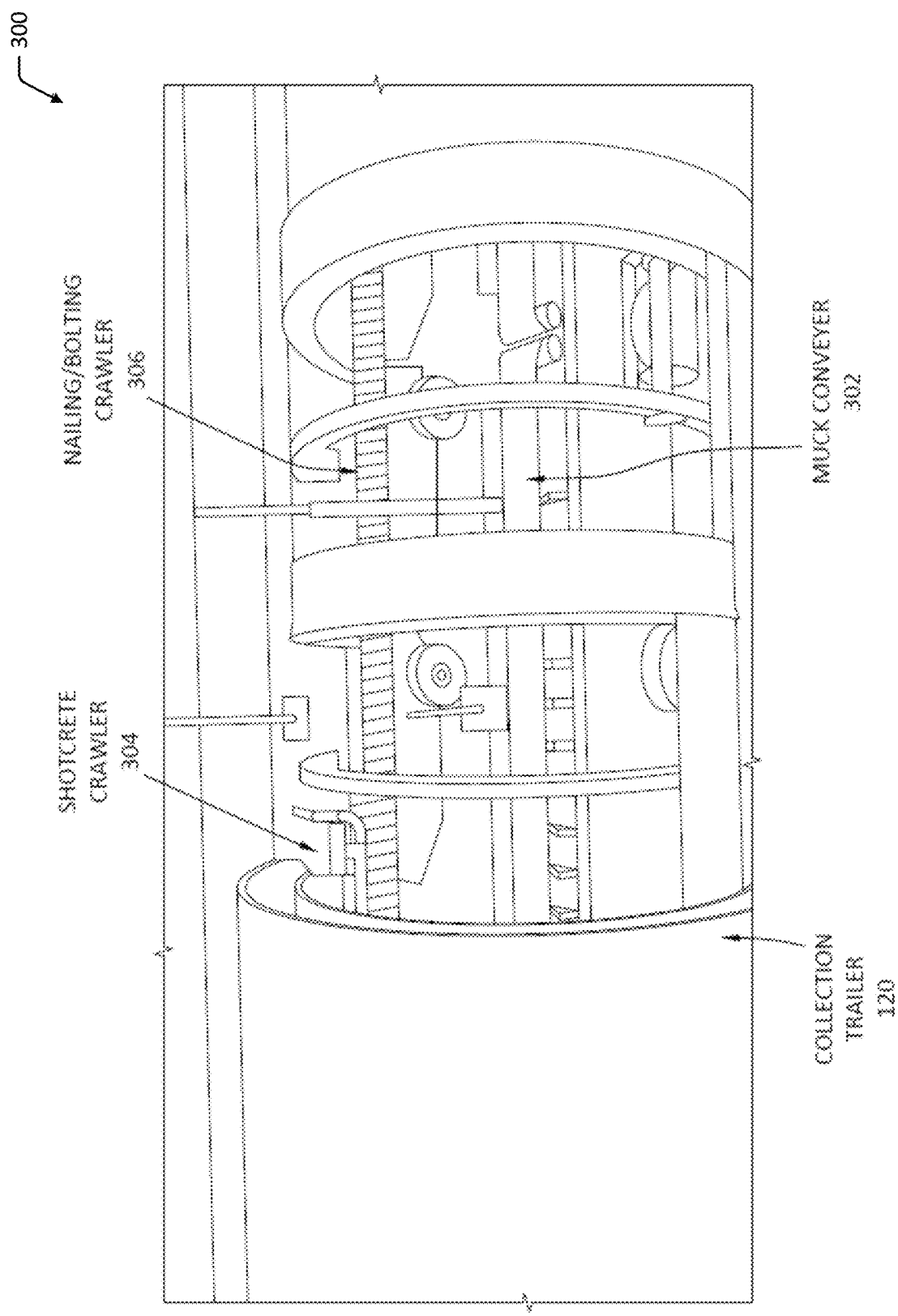
FIG. 3 depicts a top view of an implementation of a system that includes additional assemblies for conveying debris and stabilizing a tunnel or shaft.
Figure 4:
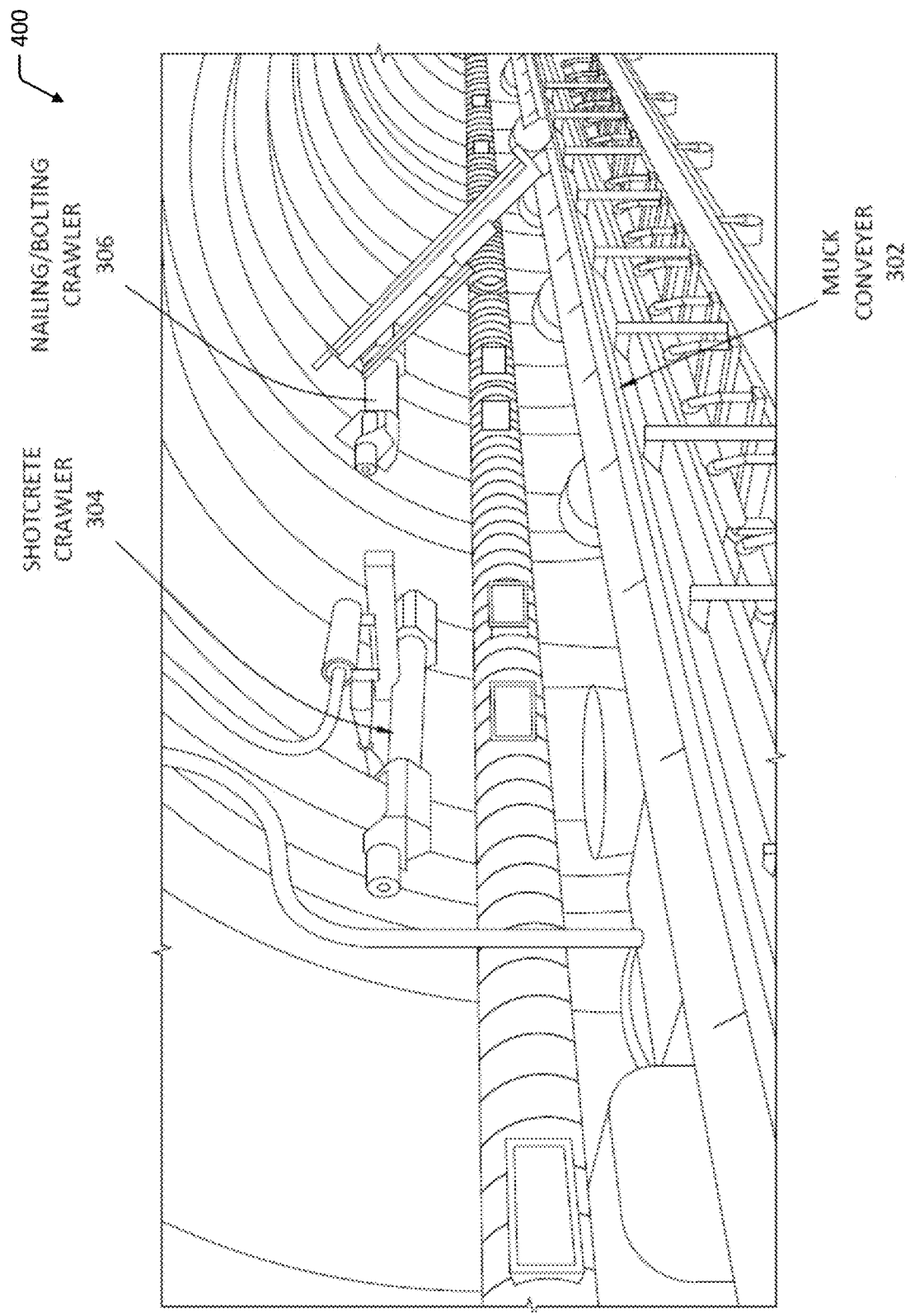
FIG. 4 depicts a perspective view of an implementation of a system that includes additional assemblies for conveying debris and stabilizing a tunnel or shaft.

For example, FIG. 3 and FIG. 4 depict example systems 300, 400, in which the collection trailer 102 includes a muck conveyor 302 used to move debris away from a workface, and a shotcrete crawler 304 and nailing/bolting crawler 306 engaged with guided structures above the muck conveyor 302. The muck conveyor 302 may include a chute, ramp, or other structure for guiding debris away from a workface. In some implementations, the muck conveyor 302 may include a conveyor belt or other system for providing motive force to debris. The shotcrete crawler 304 and nailing/bolting crawler 306 may perform stabilizing operations within a tunnel or shaft as the collection trailer 120 is advanced within the tunnel or shaft. Specifically, the nailing/bolting crawler 306 may be used for bolting operations, while the shotcrete crawler 304 may be used to provide mortar or other stabilizing materials within the tunnel. While FIG. 3 and FIG. 4 depict the shotcrete crawler 304 and nailing/bolting crawler 306 being associated with an assembly for removal of debris from a workface, in other implementations, the shotcrete crawler 304, nailing/bolting crawler 306, or other tools or assemblies may be associated with the ram accelerator assembly 102, the assembly that includes the reaming tool 108, or separate assemblies or vehicles. In some cases, debris or other materials created by a projectile impact and removed from a shaft or tunnel may be used to form materials for use by the shotcrete crawler 304 to add structural integrity to the raft or tunnel. For example, pulverized debris may be used in combination with a binder, such as cement, or one or more additional materials, such as fiberglass, steel, or other structural materials, to provide structural integrity to a section of shaft or tunnel.

Figure 5:
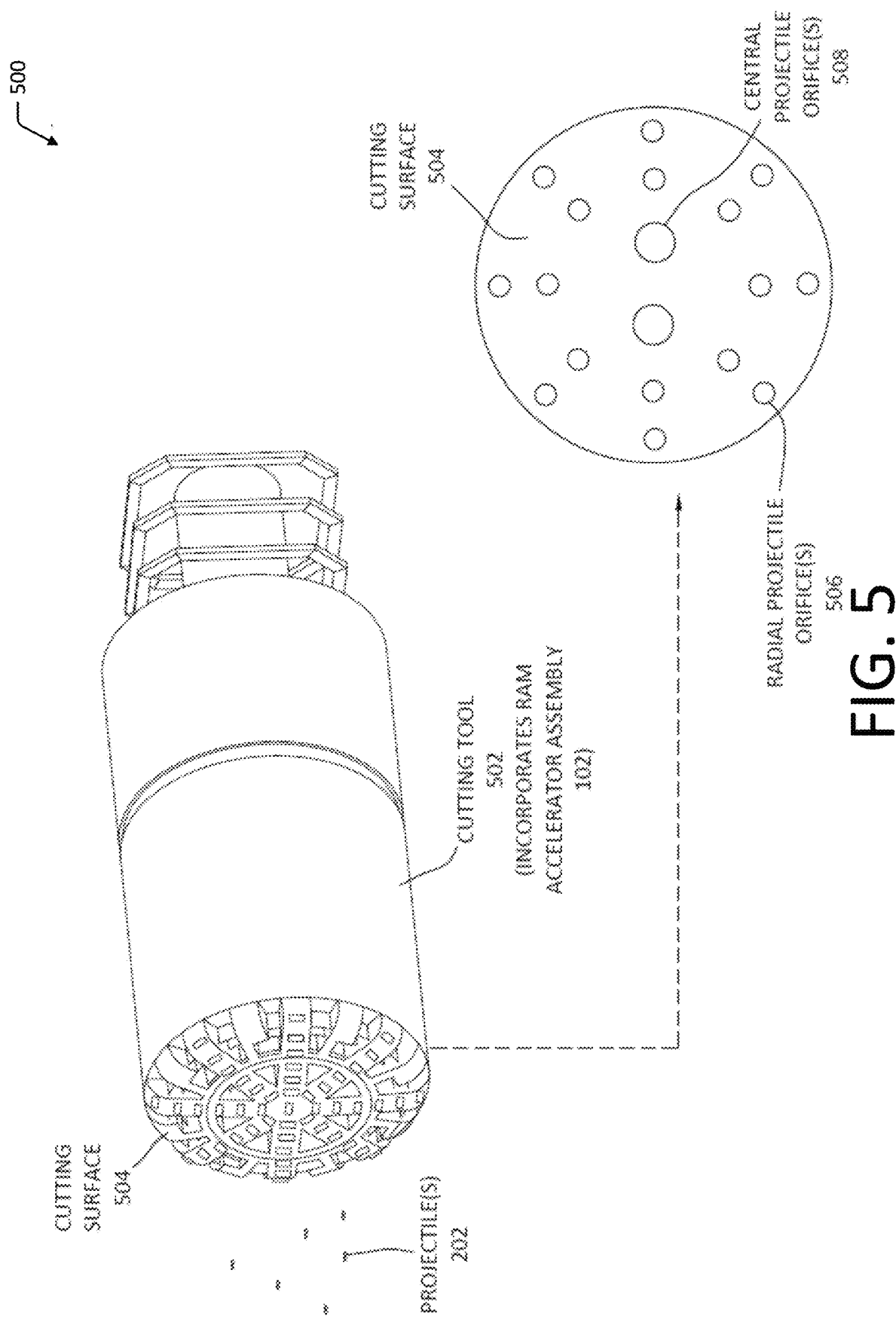
FIG. 5 is a series of diagrams depicting an implementation of a cutting tool that may be used in conjunction with a ram accelerator assembly to extend a shaft or tunnel using a combination of projectile impacts and boring operations.

FIG. 5 is a series of diagrams 500 depicting an implementation of a cutting tool 502 that may be used in conjunction with a ram accelerator assembly 102 to extend a shaft or tunnel using a combination of projectile impacts and boring operations. In some implementations, the cutting tool 502 may include a drill bit, such as a rock bit, coring bit, or other type of drill bit having one or more cutting elements that are brought into contact with rock or other material, and that cut or displace the material through rotation of the drill bit. For example, the cutting tool 502 is shown having a generally cylindrical body with a cutting surface 504 at an end thereof. The cutting surface 504 may include one or more cutting elements that cut, ream, or otherwise displace rock or other material adjacent to the cutting surface 504 as the cutting surface 504 is rotated. The cutting surface 504 may also include one or more orifices through which projectiles 202 may be accelerated into contact with a workface adjacent to the cutting surface 504. For example, one or more ram accelerator assemblies 102 may be incorporated within the body of the cutting tool 502. The placement of the orifices and ram accelerator assemblies 102 may be used to pre-condition a workface to enable more efficient penetration by the cutting surface 504 and control the shape of the resulting tunnel or shaft. For example, the orifices and ram accelerator assemblies 102 may be positioned to cause a central hole to be formed in a first region of geologic material prior to contact with the cutting surface 504. The cutting surface 504 may contact the first region of geologic material after the projectile impact, or in some cases, the cutting surface 504 may contact a second region that encloses the first region. Compressive forces associated with the cutting surface 504 may interact with a void created by the projectile impact to form tension forces, improving the rate of penetration of the cutting surface 504 through the geologic material, while controlling the breakage of the geologic material. In other implementations, a cluster or pattern of holes around a central region of the workface where the cutting surface 504 will extend a tunnel or shaft may be formed in addition to or in place of a central hole. In still other implementations, other placements of holes may be used. Independent of the location of the holes, each hole may provide one or more free faces that may reflect, redirect, or otherwise interact with shockwaves caused by subsequent projectile impacts or tunneling operations, which may improve the rate at which operations may penetrate through material of a workface and control the shape of a resulting tunnel or shaft.

FIG. 5 depicts a diagrammatic front view of the cutting surface 504 in which a series of orifices through which accelerated projectiles 202 may pass through the cutting surface 504. In some implementations, each orifice may be associated with a ram accelerator assembly 102. In other implementations, a single ram accelerator assembly 102 may be configured to accelerate projectiles 202 through multiple orifices. For example, a ram accelerator assembly 102 or the cutting surface 504 may be movable to align different orifices with the ram accelerator assembly 102.

In the example implementations shown in FIG. 5, a series of radial projectile orifices 506 are generally evenly spaced about a circumference of the cutting surface 504. The cutting surface 504 is shown including an outer ring of eight radial projectile orifices 506 and an inner ring of eight radial projectile orifices 506 positioned inward relative to the outer ring. The cutting surface 508 is also shown including two central projectile orifices 508, which in some implementations may have a larger diameter than those of the radial projectile orifices 506. For example, projectiles 202 accelerated through the central projectile orifice(s) 508 may have one or more dimensions greater than projectiles 202 accelerated through the radial projectile orifice(s) 506.

In some implementations, the particular orifices through which projectiles 202 are accelerated may be selected based on the characteristics of the material through which the cutting tool 502 is penetrating, the direction in which a tunnel or shaft is extended, the rate at which it is desired to extend a tunnel, and so forth.

Figure 6:
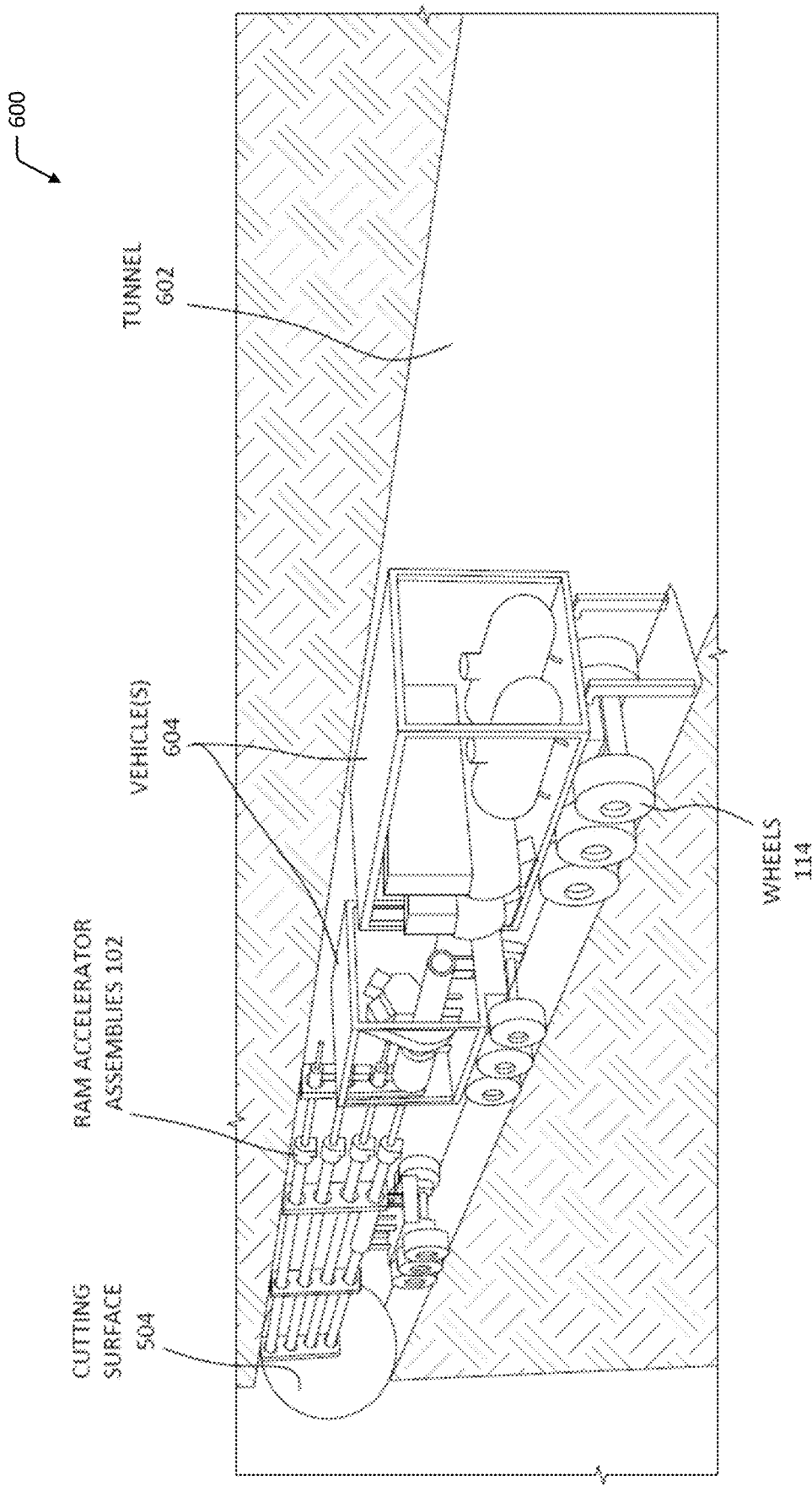
FIG. 6 is a diagram depicting a system for extending a tunnel using multiple ram accelerator assemblies in combination with the cutting surface of a cutting tool.

For example, FIG. 6 is a diagram 600 depicting a system for extending a tunnel 602 using multiple ram accelerator assemblies 102 in combination with the cutting surface 504 of a cutting tool 502. In FIG. 6, the body of the cutting tool 502 is not shown to enable visualization of the position of the cutting surface 504 and ram accelerator assemblies 102. FIG. 6 depicts four ram accelerator assemblies 102 arranged in a row. In some implementations, the cutting surface 504 may rotate relative to the ram accelerator assemblies 102, and when orifices in the cutting surface 504 are aligned with the ram accelerator assemblies 102, at least a portion of the ram accelerator assemblies 102 may be actuated to accelerate one or more projectiles 202 through the orifices.

FIG. 6 depicts one or more additional vehicles 604 associated with the cutting tool 502 and ram accelerator assemblies 102. For example, the ram accelerator assembly 102 may be advanced through the tunnel 602 using wheels 114, tracks, rails, and so forth, and the vehicles 604 may similarly include wheels 114 or another mechanism for advancement through the tunnel 602. In some cases, the vehicles 604 may be associated with assemblies that support use of the cutting tool 502 or ram accelerator assemblies 102, such as assemblies that provide projectiles 202 and propellant materials into the ram accelerator assemblies 102. Additionally, in some cases, the vehicles 604 may be associated with assemblies for collecting and removing debris created by interactions between the cutting surface 504 or the projectiles 202 and a workface.

In some implementations, the specific ram accelerator assemblies 102 that are actuated may be selected based on a desired direction in which to extend the tunnel 602. For example, repeatedly accelerating projectiles 202 toward one side of the cutting surface 504 may cause the tunnel 602 to be extended in an opposing direction due to the force exerted by the acceleration of the projectiles 202 and the interaction between the projectiles 202 and one side of the tunnel 602. In other implementations, the specific ram accelerator assemblies 102 that are actuated may be selected based on the characteristics of the material through which the cutting surface 504 is penetrating, a desired rate of penetration, and so forth. For example, a smaller number of ram accelerator assemblies 102, and in some cases zero ram accelerator assemblies 102, may be actuated at times when a sufficient rate of penetration may be achieved using the cutting tool 502.

Figure 7:
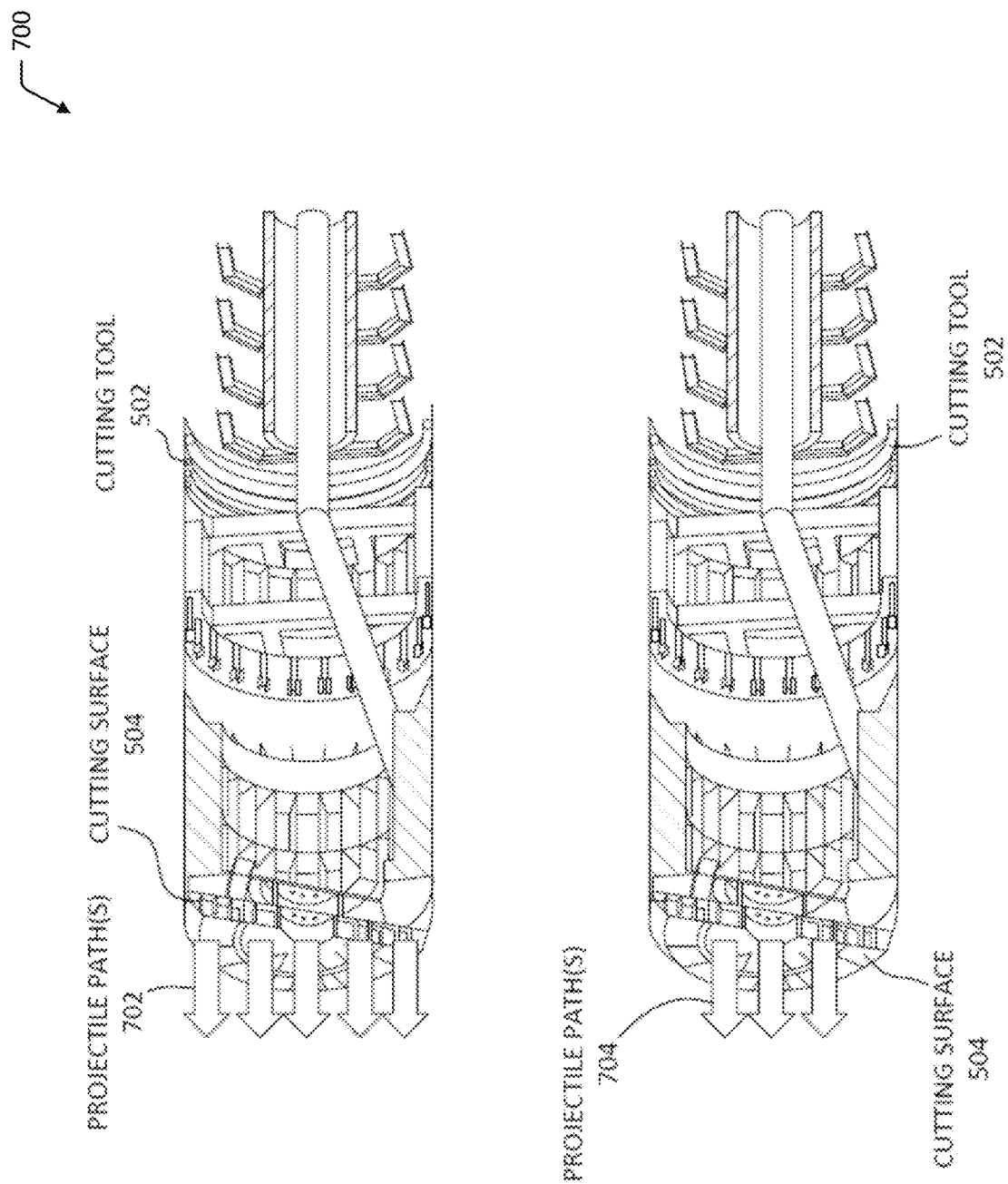
FIG. 7 is a series of diagrams depicting example implementations in which different numbers or configurations of ram accelerator assemblies may be used based on the characteristics of a workface, a desired rate of penetration, or a desired shape of penetration.

FIG. 7 is a series of diagrams 700 depicting example implementations in which different numbers or configurations of ram accelerator assemblies 102 may be used based on the characteristics of a workface, a desired rate of penetration, or a desired shape of a resulting shaft, tunnel, or other type of borehole. In a first diagram, a large portion of a workface in front of the cutting surface 504 may be affected by projectile impacts by actuating a large number of ram accelerator assemblies 102 associated with the cutting tool 502, as illustrated by a first set of projectile paths 702. In such a case, a large portion of a rock face or other type of workface may be impacted by multiple projectiles 202, which may substantially weaken a large portion of the workface. In a second diagram, a selected subset of ram accelerator assemblies 102 may be actuated, as illustrated by a second set of projectile paths 704, which may weaken a selected portion of a workface, such as a first portion of geological material that is generally centrally located or enclosed by a second portion of geologic material. Weakening of a selected portion of a workface using projectile impacts may be used to control the rate of penetration through a material, the shape of a tunnel 602 formed in the material, the direction in which a tunnel 602 is extended, and so forth. For example, interaction between a cutting surface 504 and a first portion of a workface that has not been weakened by a projectile impact may cause the path of the cutting tool 502 to be diverted way from the first portion of the workface, and toward a second portion of the workface that has been weakened by a projectile impact.

For example, a portion of a workface, such as the percentage of an area of a hole, that is to be weakened by projectiles 202 may be selected, while the remainder of the workface may remain to be removed using drilling or boring operations using a cutting surface 504. The portion of the workface that is weakened by projectiles 202 may be selected based on the rate at which a tunnel 602 or shaft may be extended using a cutting tool 502 and the rate at which debris may be removed from a workface. For example, if a tunnel 602 is extended at a rate that enables debris to accumulate more rapidly than the debris may be removed, use of projectiles 202 to weaken the workface may be limited to conserve materials and slow the rate of penetration through a workface, preventing undesired accumulation of debris.

For example, projectiles 202 may be accelerated using radial projectile orifices 506 associated with a cutting surface 504, creating a disc-shaped region of a workface that is affected by projectile impacts, while leaving a central portion of the workface unaffected by projectile impacts. In other implementations, projectiles 202 may be accelerated using central projectile orifices 508 to selectively form a void in a first region of geologic material that is enclosed by a second region, which may improve the rate of penetration through a workface while enabling debris to fall into a void created in the first region.

Figure 8A:
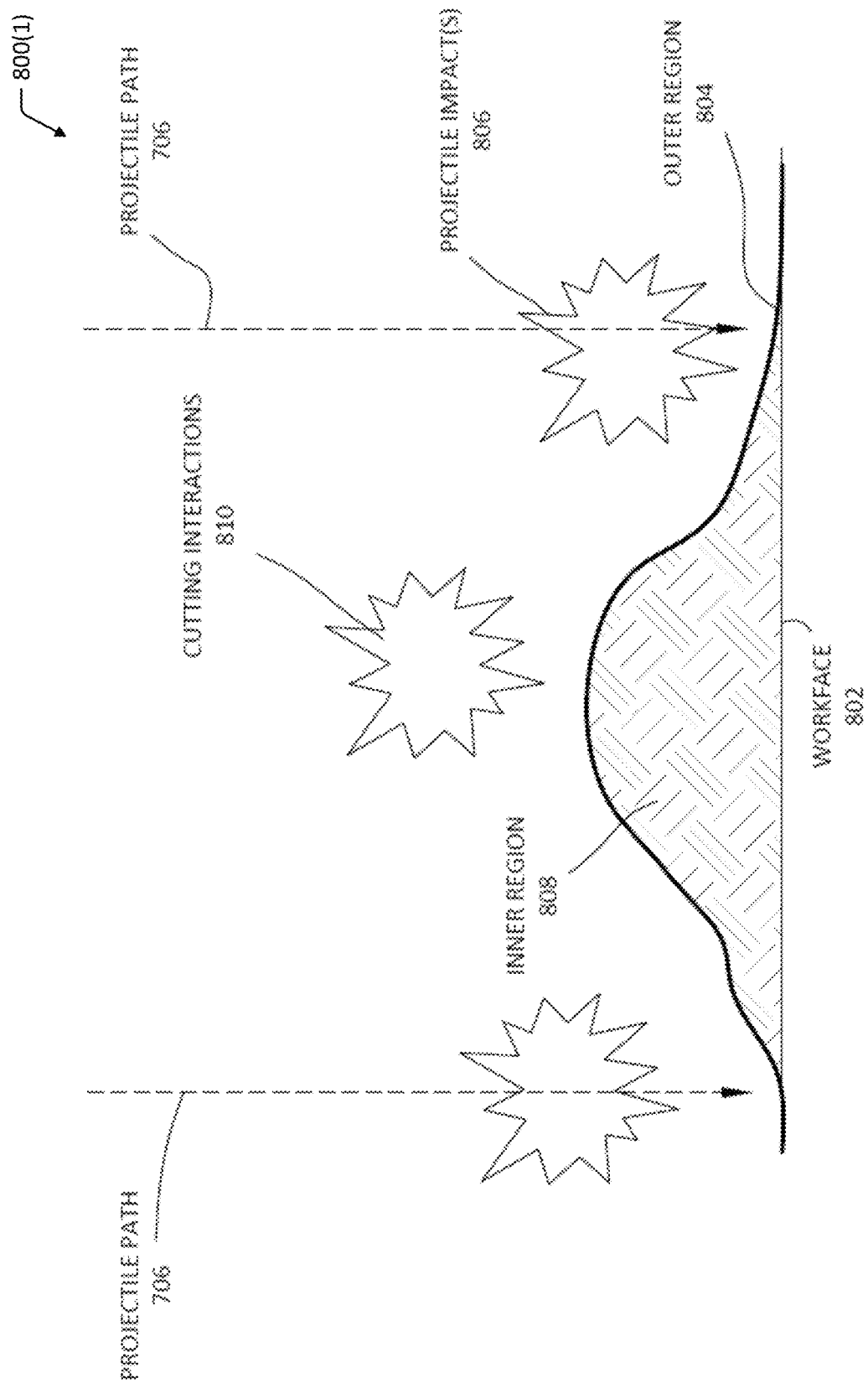
FIG. 8A is a diagram depicting a workface in which an outer region has been affected by one or more projectile impacts, as illustrated by projectile paths, while an inner region is not affected by projectile impacts.

FIG. 8A is a diagram 800(1) depicting a workface 802 in which an outer region 804 has been affected by one or more projectile impacts 806, as illustrated by projectile paths 706, while an inner region 808 is not affected by projectile impacts 806. As a result, the inner region 808 may primarily be impacted by the cutting surface 504 of a cutting tool 502, as illustrated by the region of FIG. 8A labeled "cutting interactions" 810. In some implementations, a disc-shaped cutting surface 504 having a diameter perpendicular to the workface 802 may be used to remove material from the workface 802. In such a case, projectiles 202 accelerated as illustrated by the projectile paths 706 may break or condition material on both sides of the area where the disc-shaped cutting surface 504 may contact the workfare 802, which may reduce stress on both sides of the disc-shaped cutting surface 504. For example, the projectile impacts 806 may form voids that define a perimeter of a region of geologic material. Interaction between compressive forces caused by the cutting interactions 810, or in some cases compressive forces caused by subsequent projectile impacts 806, may interact with the voids at the outer region 804 formed by the initial projectile impacts 806. In such a case, the voids at the outer region 804 may limit breakage or degradation of geologic material outside of the defined perimeter, while also enabling an increased rate of penetration. For example, compressive forces that interact with the voids at the outer region 804 may cause tension forces that pull and break rock or other geologic material into the created voids. Interactions between the projectiles 202 and rock or other material may break the material into a desired cross-sectional shape defined in part by the perimeter.

In other implementations, water jet cutters, drills, mechanical cutters, or other types of tools may be used to pre-condition a surface, such as by forming voids within the outer region 804, in addition to or in place of the projectile impacts 806. Subsequently, projectiles 202 may be accelerated toward the inner region 808 or other cutting tools may be used to perform additional operations. In some implementations, water jet cutters, ram accelerator assemblies 102, or other pre-conditioning tools may be controlled remotely, and in some cases may be articulated or aimed in a variety of positions. For example, as described previously, a projectile impact 806 may be used to break or degrade a central region of geologic material in addition to or in place of pre-conditioning a perimeter region of the geologic material.

Figure 8B:
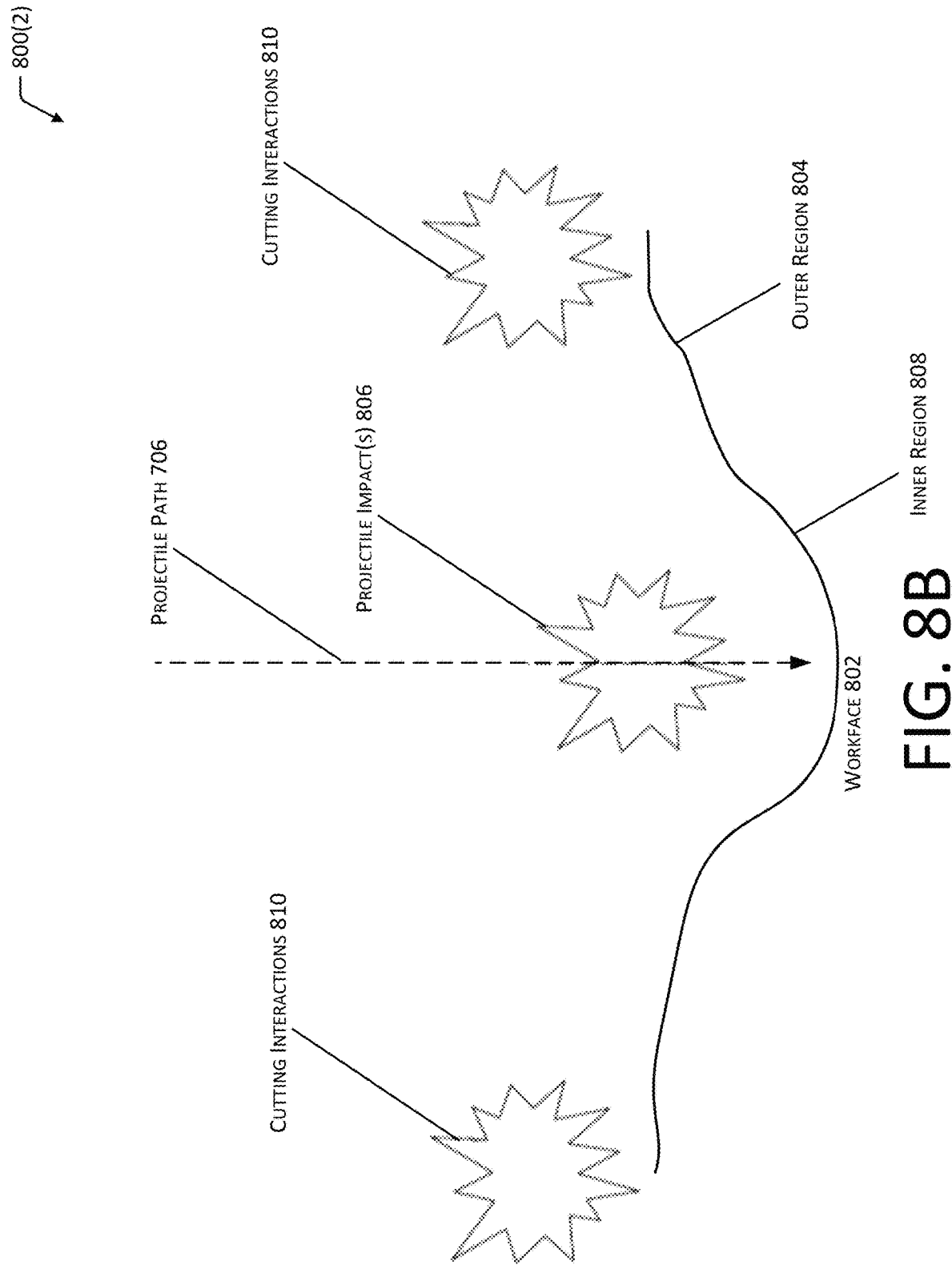
FIG. 8B is a diagram depicting a workface in which an inner region has been affected by one or more projectile impacts, as illustrated by projectile paths, while an outer region is not affected by projectile impacts.

FIG. 8B is a diagram 800(2) depicting a workface 802 in which an inner region 808 has been affected by one or more projectile impacts 806, as illustrated by projectile paths 706, while an outer region 804 is not affected by projectile impacts 806. In other implementations, the inner region 808 may be affected by one or more first projectile impacts 806, and the outer region 804 may be affected by subsequent projectile impacts 806 at a later time. As described previously, in some implementations, projectiles 202 may be directed toward an inner region 808 of geologic material that is enclosed by an outer region 804 to form a central hole in the workface 802 prior to contact between the workface 802 and one or more cutting surfaces 504 or additional projectile impacts 806. The central hole created by the initial projectile impact(s) 806 may create a free face that allows shockwaves (e.g., compressive forces) from subsequent operations to be reflected in a manner that enables more effective penetration through geologic material, such as by forming tension forces. Additionally, debris associated with subsequent tunneling operations may fall into a void created by the initial projectile impact(s) 806. In other implementations, other patterns of pre-conditioned holes may create free faces for reflection, redirection, or other interactions with compressive forces resulting from projectile impacts 806 or subsequent tunneling operations.

In some implementations, one or more of the systems described with regard to FIGS. 1-8 may be used in conjunction with a mobile (e.g., self-driven or autonomously-controlled) tunneling unit. Traditional tunnel boring machines (TBMs) include round cutterheads and use rotary torque to carve through rock or other material. An excavation process that uses TBMs typically creates a concentric hole, limiting applications into a single cross-section type and ultimately producing a profile with a low utilization ratio of tunneled sections. In cases where a project requires a finished tunnel cross-section that is not circular (such as rectangular or other shapes), a secondary excavation operation is typically used to provide the desired cross-section. The additional equipment, labor, and time associated with a secondary excavation operation can exponentially increase the time, cost, and other resources associated with forming a tunnel. Implementations described herein may enable tunnels to be formed and conditioned, such as through trenchless excavation operations, and may provide tunnels with cross-sectional shapes that are circular or non-circular, with a significantly higher utilization ratio for tunnel sections than conventional excavation operations. In some implementations, the techniques described herein may be used to form a tunnel having varying geometry (e.g., a tunnel that changes in diameter or cross-sectional shape as a function of length). Additionally, use of techniques described herein may enable tunnels to be formed and conditioned with significantly less time and cost when compared to conventional excavation operations.

FIG. 9 is a series of diagrams 900 illustrating an implementation of a tunneling unit 902 that may be used to condition a surface and displace material from the surface using a combination of water jets 904 or other types of pre-conditioning tools, and ram accelerator assemblies 102. The tunneling unit 902 may include a structural frame 906 that is movable forward and backward (e.g., to advance further into and out from a tunnel 602) using tracks 908. In other implementations, wheels, skids, rollers, or other methods for enabling movement of the tunneling unit 902 may be used. In some implementations, movement of the tunneling unit 902 may be controlled remotely. In some implementations, the tunneling unit 902 may be configured for automatic movement, such as automatic advancement deeper into a tunnel 602 after use of the tunneling unit 902 to form a segment of the tunnel 602.

Multiple water jets 904 or other pre-conditioning tools may be mounted on the structural frame 906. In some implementations, the water jets 904 may include articulating water jet heads (e.g., water jet cutters). In other implementations, other types of cutting, reaming, or boring tools may be used to pre-condition a surface in addition to or in place of the water jets 904. For example, one or more ram accelerator assemblies 102 may be used in place of or in addition to the water jets 904 to pre-condition a workface 802, such as by forming a central hole in a region of the workface 802 where a tunnel 602 is to be extended. In other implementations, other patterns of holes may be formed, such as the formation of voids that define a perimeter of a region of geologic material. Independent of the placement of the holes, the holes may provide free faces that interact with shockwaves from subsequent projectile impacts 806 or tunneling operations, which may improve the rate at which a tunnel 602 is extended and control the shape of the tunnel 602 that is formed.

As shown in FIG. 9, one or more ram accelerator assemblies 102 may also be mounted to the structural frame 906. FIG. 9 depicts the structural frame 906 having an outer frame with a generally rectangular shape, upon which the water jets 904 are mounted, and an inner frame having a generally semicircular shape, upon which the ram accelerator assemblies 102 are mounted. However, in other implementations, frames having any shape may be used. For example, water jets 904 may be positioned along an outer frame having a semicircular shape, or another desired shape. As another example, both water jets 904 and ram accelerator assemblies 102 may be positioned along a single frame having a rectangular shape, a semicircular shape, or another shape, and use of separate inner frames and outer frames may be omitted.

In some implementations, as shown in FIG. 9, the water jets 904 (or other types of cutting or pre-conditioning tools) may be mounted at a leading (e.g., front) edge of the tunneling unit 902, while the ram accelerator assemblies 102 are mounted behind the water jets 904, such as at or near a trailing (e.g., rear) edge of the structural frame 906. In some implementations, a rack system may allow each water jet 904 to move independently, articulate, and achieve multiple different positions or orientations to project water toward a surface. For example, a water jet 904 or other type of pre-conditioning tool, which may include a ram accelerator assembly 102 in some implementations, may be oriented to selectively form a void in selected regions of geologic material, such as a first region enclosed by a second region. Continuing the example, each water jet 904 may include an actuator, and in some implementations, may be programed to move automatically, independent of other water jets 904. For example, a particular water jet 904 may be programmed to run a set task that includes articulating to one or more positions, use of one or more travel rates, feed or flow rates, and other operational parameters. Continuing the example, a tunneling unit 902 having multiple water jets 904 may be programmed to use the water jets 904, in conjunction with one another, to pre-condition rock or other material for formation of a section of a tunnel 602.

In some implementations, the tunneling unit 902 may include one or more additional water jets 904, or other pre-conditioning tools, located toward the bottom of the tunneling unit 904 that may be attached to movable arms. In some implementations, such a water jet 904 or other pre-conditioning tool may be mounted on a six-axis robotic arm, which may allow the water jet 904 to be positioned and oriented in a nearly-infinite number of ways to provide water toward rock or other material. In other implementations, other types of arms or movable members, including arms with greater or fewer than six axes, may be used. As the tunneling unit 902 is advanced into a tunnel 602, these water jets 904 or other pre-conditioning tools may precut a lower portion of a tunnel profile, then be moved out of position as needed for other operations.

In some implementations, the water jets 904 or other pre-conditioning tools may be used to cut an initial outer profile for a tunnel section. In other implementations, the water jets 904 or other pre-conditioning tools may be used to cut other patterns to pre-condition or weaken a rock face or other material. For example, water jets 904, drills, mechanical cutters, projectile impacts 806, or other mechanisms may be used to pre-condition a workface 802 by forming a central hole at a location where a tunnel 602 is to be extended. In other implementations, holes or pre-conditioned regions having other shapes (e.g., grooves, depressions, slots, and so forth) may be formed at other locations, where shockwaves from subsequent projectile impacts 806 or tunneling operations may interact with free faces defined by the holes or other shapes. For example, after cutting an initial outer profile using water jets 904 or other pre-conditioning tools, and forming a void in a central region of geologic material using a projectile impact 806, the ram accelerator assemblies 102, which in some cases may be articulated, aimed, and so forth, may be used to accelerate projectiles 202 into the geologic material, within the outer profile, to pulverize the material. In some implementations, each ram accelerator assembly 102 may be associated with a track 908 or other mechanism to enable movement thereof, and may be moved, pivoted, and articulated to provide projectiles 202 to selected positions in the rock or other material. As the rock or other material is broken by projectile impacts 806, mucking operations, such as those described with regard to FIG. 1, may be used to transport the material out from the newly-formed tunnel section. The tunneling unit 902 may then be moved forward into the newly-formed tunnel section, and the process may be repeated to extend the tunnel 602. In some implementations, the tunneling unit 902 may be continuously advanced as sections of a tunnel 602 are formed. Extension of the tunnel 602 by repeating this process may be used to provide a subsequent tunnel section having the same cross-sectional shape and diameter, or a different (or variable) cross-sectional shape or diameter. In other implementations, after formation of one or more voids using one or more projectile impacts 806, or otherwise pre-conditioning at least a portion of a workface 802 such as by using other pre-conditioning tools, other types of tunneling operations, such as use of cutting tools 502, may be used in place of or in addition to subsequent acceleration of projectiles 202.

Figure 10:
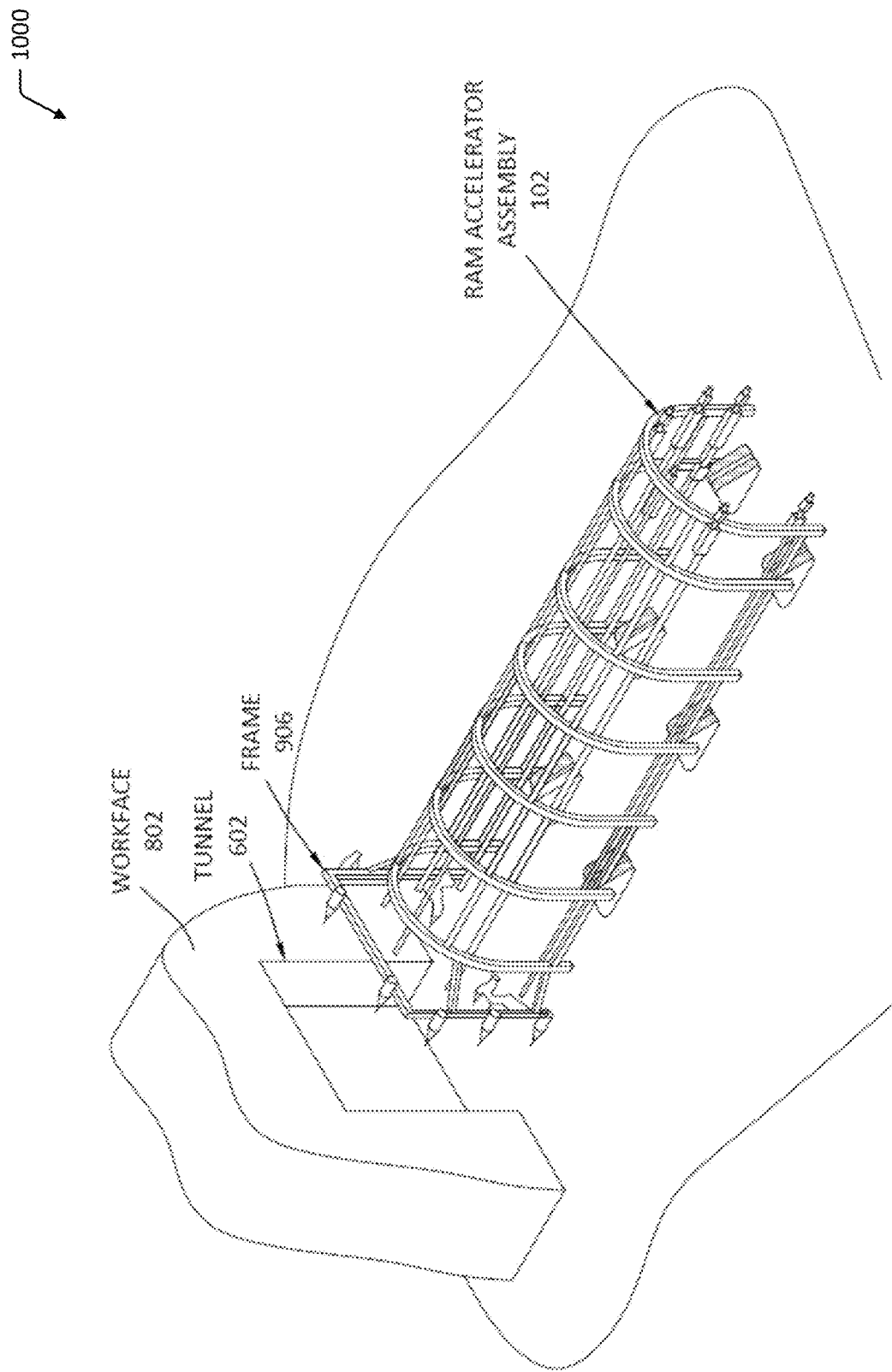
FIG. 10 is a diagram illustrating a perspective view of the tunneling unit of FIG. 9 positioned to interact with and form a tunnel within a workface, such as a rock face or other type of material or surface.

FIG. 10 is a diagram 1000 illustrating a perspective view of the tunneling unit 902 of FIG. 9 positioned to interact with and form a tunnel 602 within a workface 802, such as a rock face or other type of material or surface. As described previously, the tunneling unit 902 may include one or more water jets 904 or other pre-conditioning tools at the leading (e.g., front) end thereof, and ram accelerator assemblies 102 at or near a trailing (e.g., rear) end thereof. The water jets 904 may be positioned on an outer portion of a structural frame 906 of the tunneling unit 902, which may have a generally rectangular shape, while the ram accelerator assemblies 102 are positioned on an inner portion of the structural frame 906 having a generally semicircular shape. The tunneling until 902 may be positioned on tracks 908 or a similar component to enable movement of the tunneling unit 902 into or out from a tunnel 602.

Figure 11A:
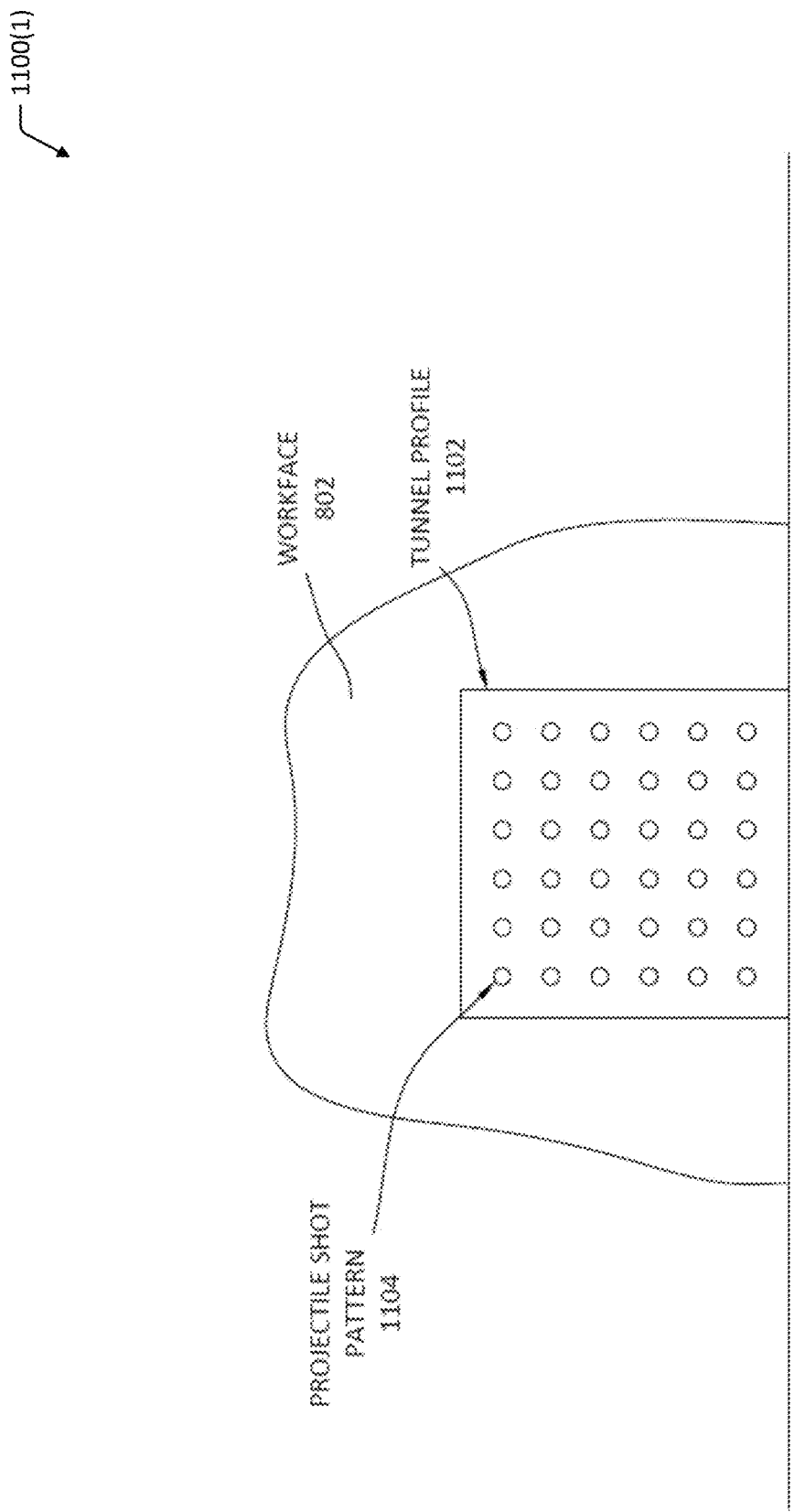
FIG. 11A depicts a diagram in which a tunnel profile for a tunnel may be formed using pre-conditioning devices, while a projectile shot pattern may be used to displace material to form a section of a tunnel based on the tunnel profile.

In some implementations, the water jets 904, or other tools, may be used to pre-condition a portion of a rock face or other material having a non-circular profile, such as a square or rectangular cross-sectional shape. For example, FIG. 11A depicts a diagram 1100(1) in which a tunnel profile 1102 for a tunnel 602 may be formed using pre-conditioning devices, while a projectile shot pattern 1104 may be used to displace material to form a section of a tunnel 602 based on the tunnel profile 1102.

Continuing the example, after pre-conditioning a portion of a rock face, such as by using water jets 904, one or more ram accelerator assemblies 102, or other preconditioning tools, ram accelerator assemblies 102 may then be used to fire projectiles 202 into the workface 802 at locations within the pre-conditioned profile. Interactions between the projectiles 202 and the workface 802 or other material may break, pulverize, or otherwise degrade the material, forming a tunnel section having the shape of the pre-conditioned profile. In other cases, interactions between the projectiles 202 and the workface 802 may weaken the material, and subsequent projectile impacts 806, cutting tools 502, and so forth may be used to displace the weakened material. Mucking operations may then be used to remove debris from the tunnel 602 to enable advancing of the tunneling unit 902. Due to the generally open interior of the tunneling unit 902, mucking operations, as well as other operations, may be performed without requiring removal of the tunneling unit 902, such as by passing personnel or equipment beneath the structural frame 906 of the tunneling unit 902. While FIG. 11A depicts an example in which a tunnel profile 1102 is pre-conditioned using water jets 904, in other implementations, a workface 802 may be pre-conditioned through other types of interactions. For example, ram accelerator assemblies 102 may accelerate projectiles 202 at selected locations on a workface 802, such as to form one or more voids that define a perimeter, that create a central hole, or another pattern of one or more holes. The void(s) formed by projectile impacts 806 may define free faces that may interact with shockwaves caused by subsequent projectile impacts 806 or tunneling operations, which may improve the efficiency at which the material of the workface may be displaced and may control the shape of the resulting section of tunnel 602.

Figure 11B:
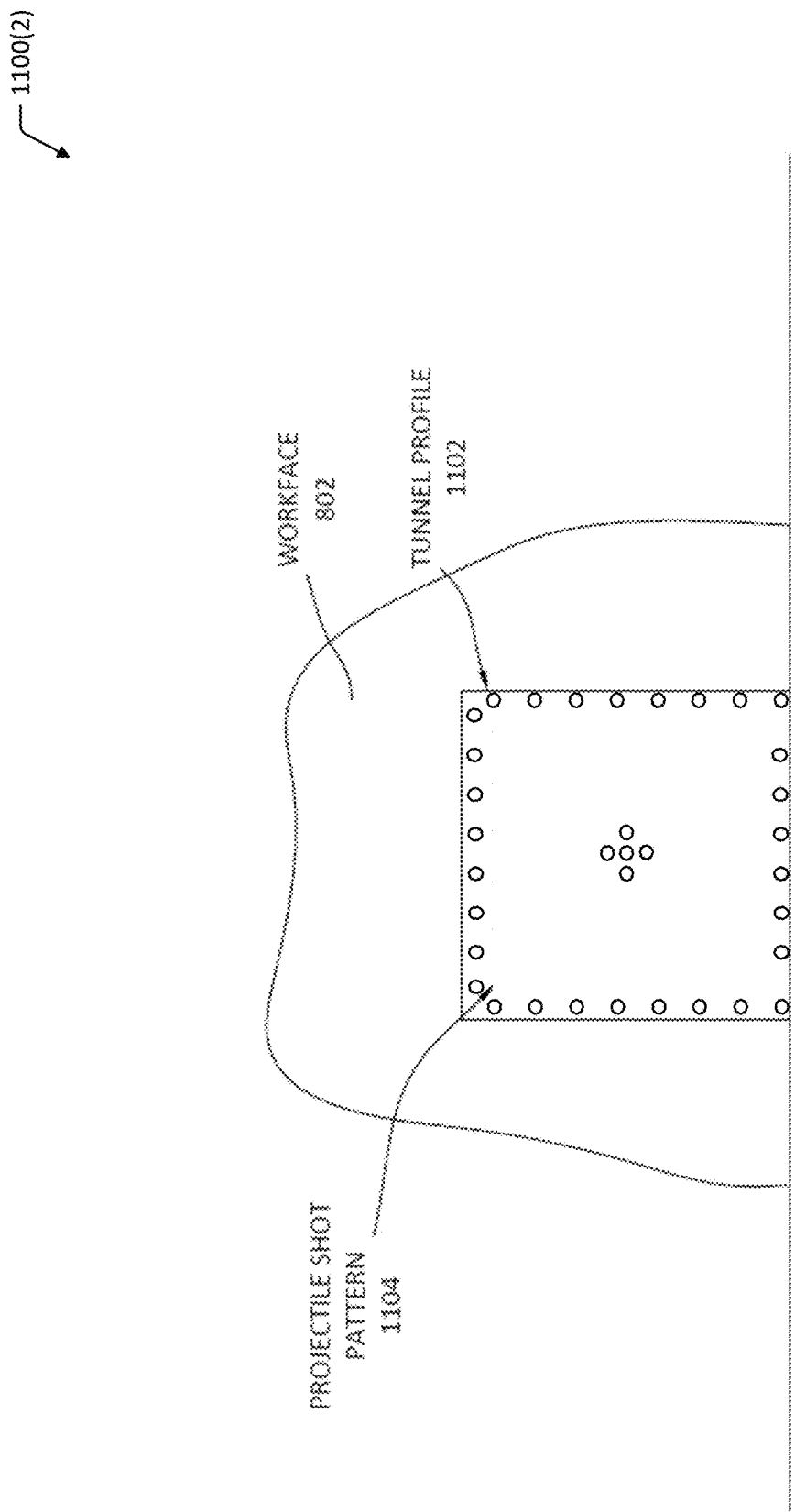
FIG. 11B depicts a diagram in which a tunnel profile for a tunnel may be formed using projectile impacts, while a projectile shot pattern may be used to form one or more voids within an enclosed region within the tunnel profile to improve a rate of penetration of tunneling operations.

For example, FIG. 11B depicts a diagram 1100(2) in which a tunnel profile 1102 for a tunnel 602 may be formed using projectile impacts 806, while a projectile shot pattern 1104 may be used to form one or more voids within an enclosed region within the tunnel profile 1102 to improve a rate of penetration of tunneling operations. In other implementations, the tunnel profile 1102 may be formed using water jets 904 or other types of pre-conditioning tools. In some implementations, one or more projectile impacts 806 may be used to form one or more first voids in a first region of geologic material that is enclosed by a second region. For example, FIG. 11B depicts a projectile shot pattern 1104 that includes a group of voids in the approximate center of the tunnel profile 1102, which may be formed by a series of projectile impacts 806. While FIG. 11B depicts the group of voids including five holes of generally equal size, in other implementations, any number of voids may be formed, including a single void or a large number of voids. Additionally, the void(s) that are formed may have any size. Further, in some implementations, the size of the void(s) that are formed within the enclosed region of the tunnel profile 1102 may have a different size than the voids from the projectile impacts 806 used to define the tunnel profile 1102. For example, projectiles 202 used to define the tunnel profile 1102 may be smaller than projectiles 202 used to form voids within the enclosed region. As another example, projectiles 202 used to define the tunnel profile 1102 may be accelerated with a different velocity to affect the energy associated with the resulting projectile impacts 806. The projectile shot patten 1104 shown in FIG. 11B also includes a series of voids that define a perimeter of the tunnel profile 1102. For example, one or more projectile impacts 806 may be used to weaken, degrade, displace, or otherwise form voids at the approximate outer edge of a desired tunnel shape. However, as described previously, in other implementations, the tunnel profile 1102 may be defined by a groove, slot, void, or series of voids that may be formed using water jets 904 or other types of pre-conditioning tools in addition to or in place of projectile impacts 806.

When subsequent tunneling operations are performed, which may include use of cutting tools or additional projectile impacts 806, the central voids may improve the rate of penetration of the tunneling operations. For example, compressive forces associated with the tunneling operations may interact with the voids to cause tension forces that pull rock or other geologic material, breaking and displacing the geologic material more effectively than use of compressive forces alone. Additionally, at least a portion of the debris associated with the tunneling operations may fall into the first voids, which may control the direction that the debris is directed. Compressive forces associated with the tunneling operations may also interact with the voids that define the perimeter of the tunnel profile 1102, causing tension forces that more efficiently break or displace geologic material when compared to use of compressive forces alone. Additionally, the voids that define the perimeter may limit the effect of the compressive forces on regions of geologic material outside of the perimeter, enabling the resulting tunnel 602 to be provided with a shape based on the tunnel profile 1102.

In other implementations, other methods for pre-conditioning or cutting a rock face or other material may be used. For example, rock saw blades, rotating cutters, disc cutters, road headers, water jets with added abrasives, thermal spallation, thermal conditioning (e.g., heating and breaking rock), plasma jet cutters, pre-drilling, and so forth may be used in addition to or in place of water jets 904 or projectile impacts 806 to cut or pre-condition a desired profile. Pre-conditioning geologic material to define a perimeter of a tunnel 602 may facilitate formation of tunnels 602 having an irregular cross-sectional shape, such as a square or rectangular perimeter shape, or another desired shape. For example, breakage caused by projectile impacts 806 may be limited to a pre-cut or pre-conditioned region of rock, thereby controlling the shape of the material that is removed from a workface 802. In some implementations, the gain and near-bore rock damage may be controlled by use of pre-conditioning tools to create a gap, or a region of weakened rock or rock having a different density. In some cases, such a gap or region may be located at a central region of a workface 802 rather than at a perimeter of a tunnel section. The region of the rock affected by the pre-conditioning tools may simulate a free face reflection zone so that a shock wave caused by a projectile impact 806 changes from a compression wave to a tension wave, which pulls and breaks the pre-conditioned rock along the perimeter or other pattern of pre-conditioned region(s). For example, creation of a cut or pre-conditioned region of rock may provide a boundary zone where, when metallic, ceramic, erodible, or explosive-tipped projectiles 202, or other types of projectiles 202, are fired, the projectiles 202 impact rock within the pre-conditioned region, creating a compression wave that is affected by the cut or weakened region of rock as described above. In other implementations, shock waves may be created using other mechanisms in addition to or in place of projectile impacts 806, such as through use of dynamite or other explosives. Use of the implementations described herein may more efficiently pre-condition a rock face for breakage compared to conventional methods, and more efficiently break the rock face using projectile impacts 806, which may be timed and spaced in a manner that controls the shockwaves of the impacts and creates a region for broken rock or other material to fall.

Figure 12:
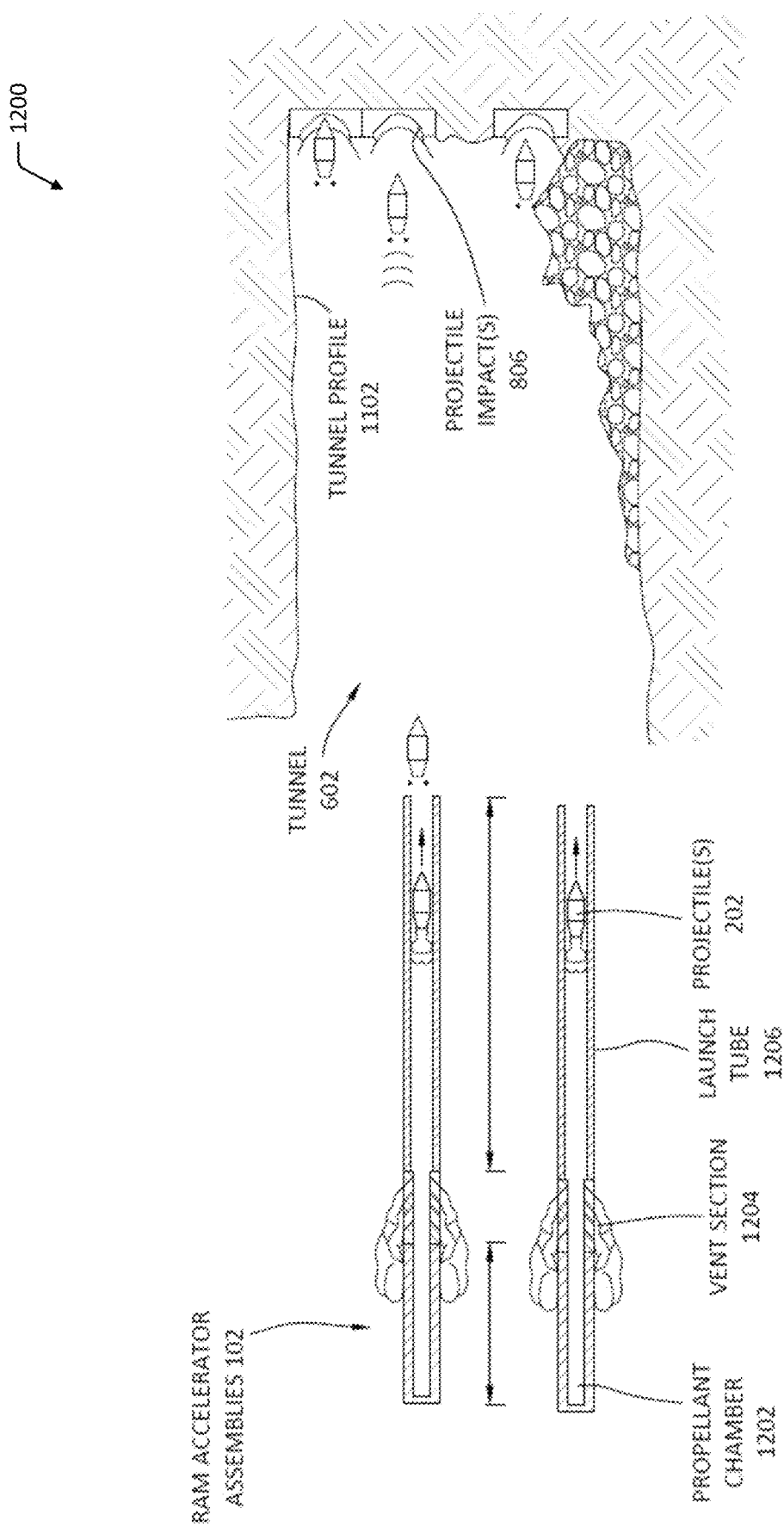
FIG. 12 is a diagram illustrating an implementation of interactions between projectiles accelerated using ram accelerator assemblies and a preconditioned portion of a tunnel.

For example, FIG. 12 is a diagram 1200 illustrating an implementation of interactions between projectiles 202 accelerated using ram accelerator assemblies 102 and a pre-conditioned portion of a tunnel 602. A ram accelerator assembly 102 may include a propellant chamber 1202 for providing propellant material to one or more other portions of the ram accelerator assembly 102 to impart a force to a projectile 202. In some implementations, the propellant chamber 1202 may include a gas gun or other source of motive force. A vent section 1204 may include one or more blast ports or other openings to enable gas created by pressurization, combustion, a chemical reaction, or other interactions with a propellant material to exit the ram accelerator assembly 102. Interactions between the propellant material and the projectile 202 may accelerate the projectile 202 through a launch tube 1206 of the ram accelerator assembly 102 into contact with rock or another material, causing a projectile impact 806 to break or weaken the material. In some implementations, interactions between the interior of the launch tube 1206 and exterior features of the projectile 202 may impart a ram effect to the projectile 202 to increase the speed thereof. For example, the interior of the launch tube 1206 may include baffles, rails, variations in the interior diameter of the launch tube 1206, or other features that interact with the body of the projectile 202 to increase the speed of the projectile 202.

In some implementations, multiple projectiles 202 or other tunneling operations may be applied to different parts of a pre-conditioned region of a rock face or other geologic material to break the material, as described above, forming debris that may be removed from the resulting tunnel section using mucking operations or other methods of transport or removal. For example, a tunnel profile 1102 of the tunnel section may be formed using water jets 904, projectile impacts 806, or other pre-conditioning devices. The tunnel section may be extended by breaking the pre-conditioned region within the tunnel profile 1102 using projectile impacts 806 or other tunneling operations, such as use of cutting tools 502. The resulting tunnel section may have a cross-sectional shape determined based on the pre-conditioning of the rock or other geologic material. In some implementations, a single ram accelerator assembly 102 may be used to accelerate multiple projectiles 202 into a rock face or other material, at the same location or at multiple different locations. For example, a single ram accelerator assembly 102 may be used in succession to provide projectiles 202 to various regions of a rock face. In other cases, multiple ram accelerator assemblies 102 may be used, sequentially or simultaneously, to impact the same or different regions of a rock face or other material with projectiles 202. For example, the projectile shot patterns 1104 shown in FIGS. 11A and 11B may be applied to a rock face using multiple different ram accelerator assemblies 102 to accelerate projectiles 202 simultaneously or close-in-time.

Providing a rock face or other workface 802 with a pre-cut region, such as a region having a square shape, may cause plastic strain from a projectile impact 806 to extend into the pre-cut portion of the rock face. For example, providing the bottom of a hole or the end of a tunnel 602 with a square-shaped pre-cut region prior to impacting a workface 802 with one or more projectiles 202 may facilitate changing the cross-sectional shape of subsequent portions of the hole or tunnel 602. Formation of a pre-conditioned or pre-cut region, using water jets 904, rock saws, impacts from projectiles 202, or other methods described above, may be performed as discrete processes, or a continuous process. For example, mechanisms for pre-conditioning a workface 802 may be used continuously or in rapid succession between impacts from projectiles 202. While implementations described herein include use of ram accelerator assemblies 102, other mechanisms for accelerating projectiles 202 may be used. For example, supersonic or hypersonic mass drivers, electric rail guns, or other devices may be used to accelerate projectiles 202 toward a workface 802. While FIG. 12 depicts an example in which a perimeter region that defines a tunnel profile 1102 is pre-conditioned prior to impacting a workface 802 with projectiles 202, in other implementations, a pre-conditioned portion of a tunnel 602 may include one or more holes positioned in a central region spaced from a perimeter of the tunnel profile 1102. Independent of the location of the holes or other pre-conditioned regions, one or more free faces may be defined that may interact with shockwaves caused by subsequent projectile impacts 806 or tunneling operations, which may control the shape of the resulting tunnel section and improve a rate of penetration of the tunneling operations.

Implementations described herein may be used for formation of tunnels 602 that are horizontal, vertical, angled, or have other orientations. A tunnel 602 may also include a mine shaft, a vertical tunnel such as a borehole, or other types of holes or tunnels. Additionally, some implementations may include formation of tunnels 602 under water, or in other pressurized environments. Computing devices and sensors may be used to determine times and orientations for actuating water jets 904 or other pre-conditioning devices, and for actuating ram accelerator assemblies 102 or other methods for accelerating projectiles 202.

In some implementations, a rock face or other material may be broken first, such as by one or more projectile impacts 806, prior to forming a pre-conditioned region using water jets 904, projectile impacts 806, or other devices, then impacting the rock again to break the rock in a desired shape. In some implementations, if portions of a pre-conditioned region of a rock face or other material are not fully removed by projectile impacts 806, such as corner regions of a square-shaped pre-conditioned area, a scaling bar, jack hammer, drill bit, cutter, or other mechanical implement may be used to remove the remaining material from the pre-conditioned region. In some cases, a water jet 904 may be used to remove the remaining material, such as by cutting the material in a radial direction. In some cases, additional projectile impacts 806 may be used to remove material not removed by the initial projectile impacts 806. For example, a smaller projectile impact 806 (e.g., using a smaller projectile 202, less force, or a projectile 202 having different characteristics) may be used to remove the remaining material not fully removed by a previous projectile impact 806. In some implementations, water jets 904 may be articulated to project water in directions that are not parallel with the centerline of the tunnel face, such as to provide better control of the location of the edge of a pre-conditioned region during firing of the water jets 904.

While implementations described above with regard to FIGS. 9-12 depict a single unit that includes water jets 904, ram accelerator assemblies 102, and so forth, in other implementations, a system that includes a projectile accelerating device, pumps, power, robotics, pre-conditioning devices, and so forth may include multiple separate units that may be controlled and coordinated using one or more computing devices. For example, sensors and other instrumentation may be used to remotely control and coordinate operations of various devices, manually or autonomously, such as to meet certain sets of parameters for rates of production. In some cases, an acoustic barrier, air barrier, gas barrier, or other type of separation may be provided between one or more pieces of equipment, such as to control dust, noise, and so forth.

Figure 13:
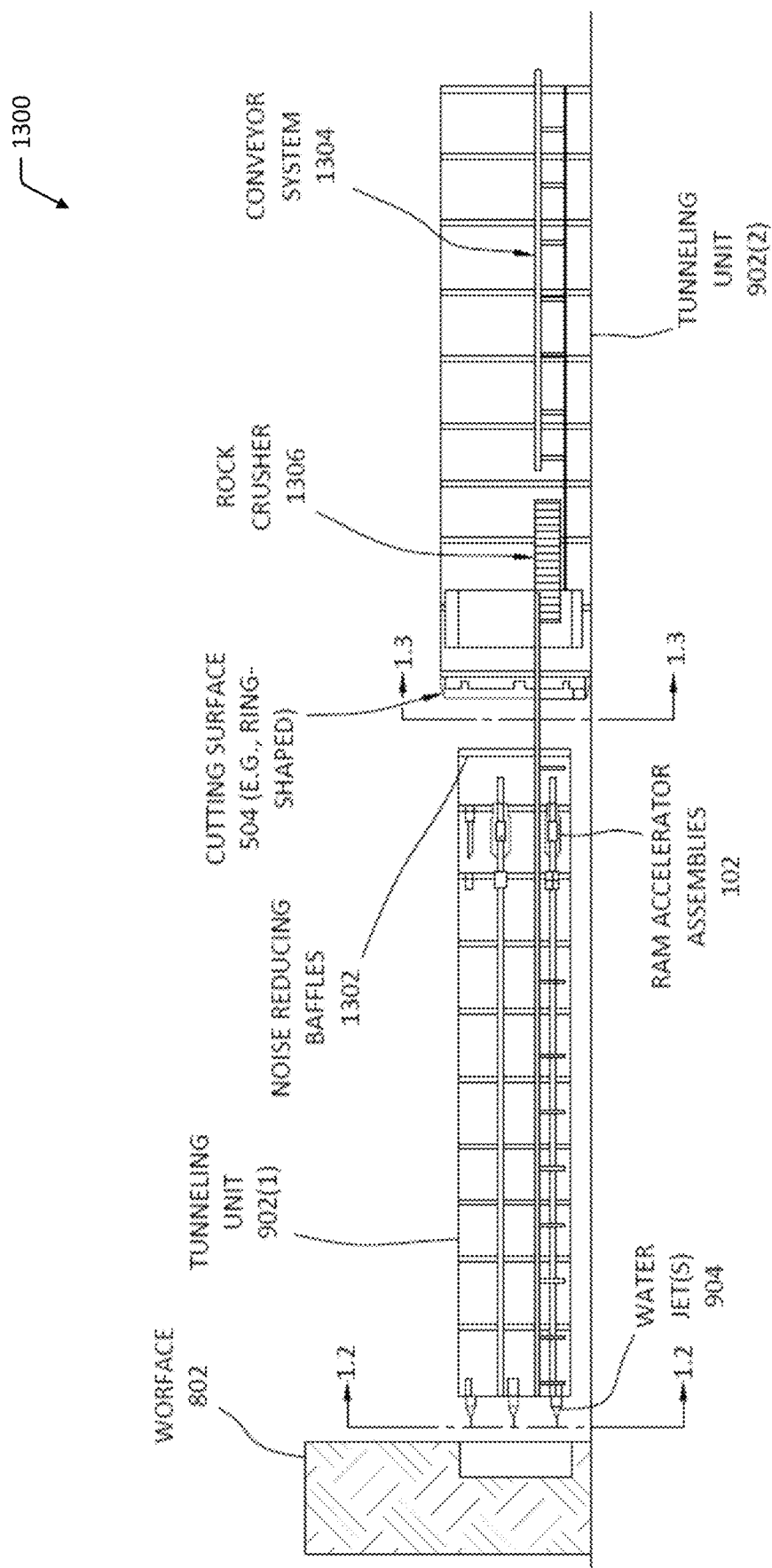
FIG. 13 is a diagram depicting an implementation of a system that includes multiple tunneling units.

In some implementations, multiple tunneling units 902 may be used in succession. For example, FIG. 13 is a diagram 1300 depicting an implementation of a system that includes multiple tunneling units 902. A first tunneling unit 902(1) may include one or more of water jets 904 or ram accelerator assemblies 102, as described with regard to FIGS. 9-12. A second tunneling unit 902(2) may be positioned behind the first tunneling unit 902(1) and may include a cutting surface 504 having a ring-shaped configuration. For example, the second tunneling unit 902(2) may include a tunnel boring machine (TBM) with a ring cutter.

In some implementations, the first tunneling unit 902(1) may be mounted to a generally cylindrical structural frame 906. The second tunneling unit 902(2) may be mounted to a generally cylindrical structural frame 906 having a larger diameter than that of the first tunneling unit 902(1). For example, FIG. 13 depicts the first tunneling unit 902(1) having water jets 904 at a front end, ram accelerator assemblies 102 at a back end, and noise-reducing baffles 1302 behind the ram accelerator assemblies 102. In some implementations, noise-reducing baffles 1302 may be installed in a terminal bulkhead of the first tunneling unit 902(1). Bulkheads and baffles may be used to acoustically isolate the first tunneling unit 902(1), reducing the effect of noise caused by rock breaking and firing of projectiles 202 occurring ahead of the second tunneling unit 902(2). For example, the second tunneling unit 902(2) may include a manned section having one or more human operators, and use of bulkheads, baffles, or both bulkheads and baffles may reduce the exposure of human operators to noise from rock breaking and firing of projectiles 202.

The first tunneling unit 902(1) is shown in front of and spaced apart from the second tunneling unit 902(2), which is shown positioned on a larger cylindrical frame 906. The first tunneling unit 902(1) and second tunneling unit 902(2) may be spaced apart by a selected separation distance, such as for controlling noise, debris, and so forth. While FIG. 13 depicts the cutting surface 504 of the second tunneling unit 902(2) having a ring-shaped configuration, in other implementations, the second tunneling unit 902(2) may include an articulating cutter, such as a long wall miner or road header, disc cutters along a multiple rotation axis machine, and so forth. Because the first tunneling unit 902(1) may be used to break the majority of rock to form a tunnel section, the second tunneling unit 902(2) may have a variety of shapes that differ from those of traditional TBMs. In other implementations, the first tunneling unit 902(1) may be used to pre-condition one or more regions of geologic material, while the second tunneling unit 902(2) is used to displace material to form a tunnel section.

In some implementations, a conveyor system 1304 may be incorporated within one or more of the tunneling units 902. For example, a conveyor belt may be used to transport broken rock, debris, or other materials out from a tunnel 602, and in some cases, to transport other materials into the tunnel 602. In some cases, a rock crusher 1306 or similar device may be positioned on or in front of the conveyor system 1304 to crush, break, or otherwise degrade or process the broken rock or other debris transported using the conveyor system 1304. For example, FIG. 13 shows a rock crusher 1306 positioned in association with a portion of a material handling conveyor system 1304 within the structural frame 906 of the second tunneling unit 902(2). In other implementations, a rock crusher 1306 may be positioned within the structural frame 906 of the first tunneling unit 902(1) in addition to or in place of a rock crusher 1306 associated with the second tunneling unit 902(2). For example, a projectile impact 806 from the first tunneling unit 902(1) may create sizeable pieces of debris that may be crushed or otherwise processed by a rock crusher 1306 before providing the debris to pass through or into the second tunneling unit 902(2). In some cases, both tunneling units 902 may constitute two independently controlled units that share a similar mucking methodology. For example, the tunneling units 902 may be independently controlled, while a single conveyor belt or other material conveying system may be used to move material associated with both tunneling units 902.

During use, the first tunneling unit 902(1) may be used to break a portion of a rock face, as described previously, forming a section of a tunnel 602. The second tunneling unit 902(2), being associated with a ring-shaped frame 906 having a larger diameter than that of the first tunneling unit 902(1), may be used to ream the outer edges of the tunnel section created by the first tunneling unit 902(1). As the tunneling units 902 are advanced into a newly-formed tunnel section, the second tunneling unit 902(2) may ream or expand the outer edges of the tunnel section previously created by the first tunneling unit 902(1).

Figure 14:
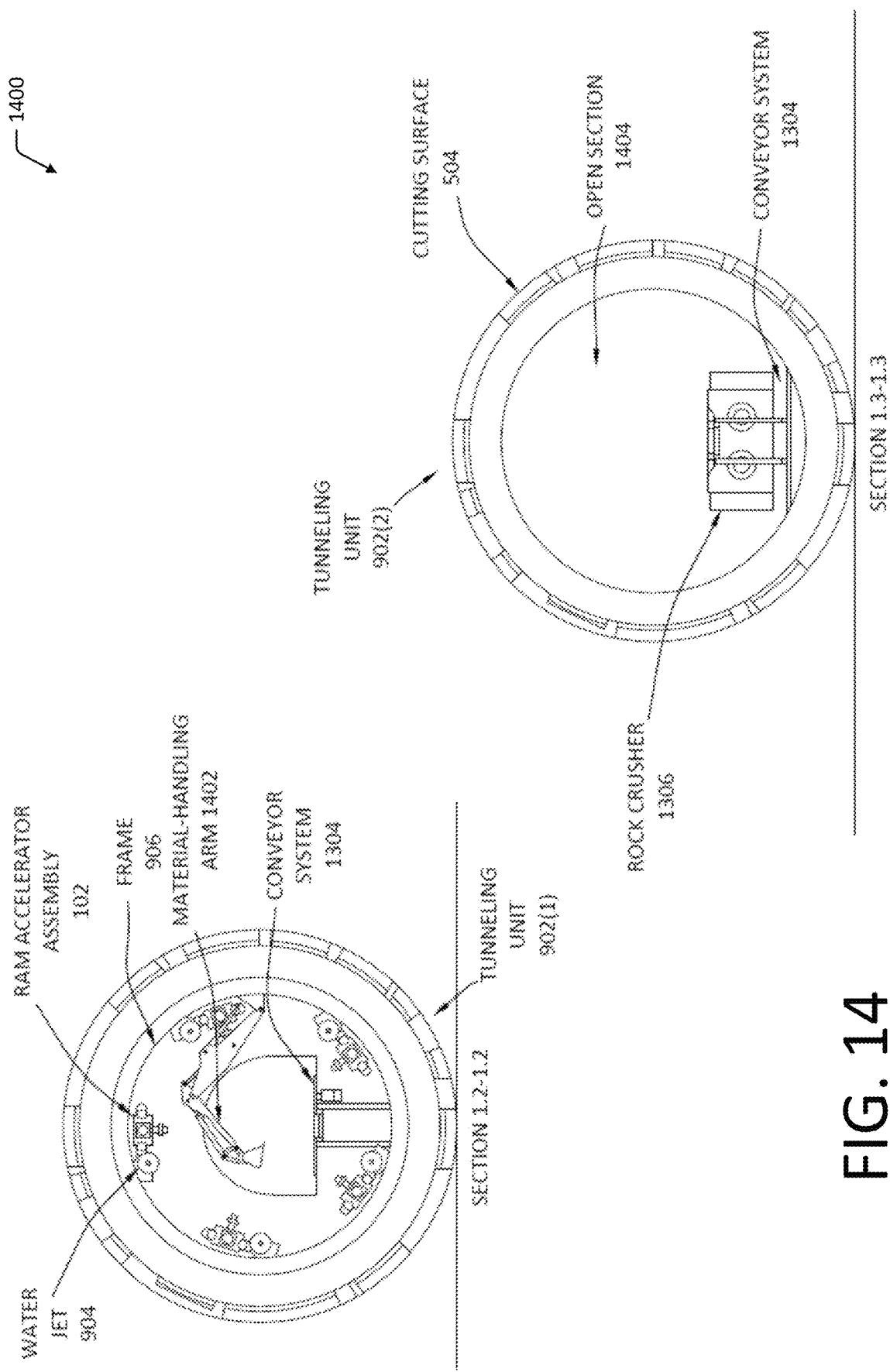
FIG. 14 is a series of diagrams showing front views of an implementation of the first tunneling unit and second tunneling unit of FIG. 13.

FIG. 14 is a series of diagrams 1400 showing front views of an implementation of the first tunneling unit 902(1) and second tunneling unit 902(2) of FIG. 13. The first tunneling unit 902(1) may include water jets 904 or other types of pre-conditioning devices, and ram accelerator assemblies 102 or other types of projectile acceleration devices, mounted to a structural frame 906. In the implementation shown in FIG. 14, the structural frame 906 has a generally cylindrical shape, however in other implementations, other shapes may be used. The water jets 904 or other pre-conditioning tools, which in some cases may include ram accelerator assemblies 102, may be used to pre-cut or pre-condition a rock face, such as by weakening a perimeter of a region of the rock face or forming one or more voids within an enclosed region of the rock face. Then, the ram accelerator assemblies 102 may be used to accelerate one or more projectiles 202 into the rock face. Impact between the projectiles 202 and the rock face may facilitate breakage of the rock. The rate of penetration of the projectile impacts 806 may be improved due to the interaction between compressive forces of the projectile impacts 806 with the voids formed by the pre-conditioning tools, which may cause the shock waves caused by projectile impacts 806 to pull and remove rock from the region of the rock face using tension forces. Additionally, in some cases, the pre-conditioned regions of the geologic material may limit the breakage or displacement of material outside of the perimeter. While FIG. 14 depicts the ram accelerator assemblies 102 positioned along an interior surface of a frame 906, in other implementations, the ram accelerator assemblies 102 may be positioned along an outer surface of the frame 906, or along a front edge of the frame 906. Similarly, the water jets 904 or other pre-conditioning tools may be positioned at other locations on the frame 906. Additionally, in some implementations, ram accelerator assemblies 102 may be used as both pre-conditioning tools and to displace geologic material after pre-conditioning a portion of the geologic material, and use of separate pre-conditioning tools may be omitted.

The first tunneling unit 902(1) may be a self-contained unit that may be used independently of the second tunneling unit 902(2), and may be independently controllable from the second tunneling unit 902(2). In some implementations, when the first tunneling unit 902(1) is positioned close to a rock face, the depicted water jets 904, ram accelerator assemblies 102, or other pre-conditioning tools may be actuated to pre-condition the rock face in a full, 360-degree profile. The ram accelerator assemblies 102, which may be mounted around the circumference of the frame, may be used to break the pre-conditioned rock face by firing multiple projectiles 202 into the rock face in succession. In other implementations, other types of cutting tools may be used in addition to or in place of the ram accelerator assemblies 102. Projectile impacts 806 or other tunneling operations may break the region of the rock face affected by the pre-conditioning, causing sections of rock to fall within the newly-formed tunnel section, such as within voids created by the initial projectile impacts 806. A conveyor system 1304 within the first tunneling unit 902(1) may be used to transport the material to mucking equipment located farther from the rock face.

In some implementations, the first tunneling unit 902(1) may include a material-handling arm 1402, such as an excavator arm and bucket, which may be mounted to the leading edge of the frame 906 of the first tunneling unit 902(1). For example, the material-handling arm 1402 may be remotely, automatically, or manually controllable to facilitate movement of broken rock or other materials away from or toward the rock face. While FIG. 14 depicts an excavator arm and bucket as an example device for conveying debris and other materials, other types of devices for moving material may also be used.

In some implementations, each water jet 904, ram accelerator assembly 102, the depicted material-handling arm 1402, and the conveyor system 1304 shown in the first tunneling unit 902(1) may be independently and automatically operated, such as remotely using controls outside of the tunnel 602 or in a manned portion of the second tunneling unit 902(2) located behind the first tunneling unit 902(1).

Additionally, FIG. 14 depicts a front view of the second tunneling unit 902(2), which in some implementations may include a ring-shaped cutting surface 504 positioned along a generally cylindrical frame. In some implementations, the diameter of the ring cutter may be larger than that of the frame 906 of the first tunneling unit 902(1). For example, the cutting surface 504 of the second tunneling unit 902(2) may further ream, weaken, degrade, smooth, or widen a section of tunnel 602 after a rock face is initially broken using the first tunneling unit 902(1). In other implementations, the second tunneling unit 902(2) may include an articulating cutter, such as a long wall miner or road header, disc cutters along a multiple rotation axis machine, and so forth. Because the first tunneling unit 902(1) is used to break the majority of rock to form a tunnel section, the cutting surface 504 of the second tunneling unit 902(2) may have a variety of shapes that differ from those of traditional TBMs.

Broken rock or other materials broken by the first tunneling unit 902(1), or by the second tunneling unit 902(2), may pass through a central open section 1404 of the second tunneling unit 902(2). For example, the conveyor system 1304 may pass through the open section 1404 and may transport broken rock or other material away from or toward the rock face. As described previously, in some implementations, a rock crusher 1306 or other device for breaking, crushing, or otherwise processing the broken rock or other debris may be associated with the conveyor system 1304.

In some cases, the ring-shaped cutting surface 504 of the second tunneling unit 902(2) may act as a reamer that may clean and smooth the diameter of a tunnel section formed by using the first tunneling unit 902(1) to break and remove rock. Through the center of the ring section, the continuous conveyor system 1304 may be used to transport rock, debris, or other material from either tunneling unit 902 to a rock crusher 1306 located behind the cutting surface 504 of the second tunneling unit 902(2). The rock crusher 1306 may process larger rock removed from the rock face by one or both tunneling units 902. In some implementations, material processed by the rock crusher 1306 may then be fed to an additional conveyor system 1304 located behind the rock crusher 1306 and transported toward a mucking system.

In other implementations, one or more ram accelerator assemblies 102 or water jets 904 may be incorporated within the frame 906 of the second tunneling unit 902(2). For example, ram accelerator assemblies 102 may be used to fire projectiles 202 through a hole or lattice pattern within the ring shape of the second tunneling unit 902(2).

In some implementations, a tunneling unit 902 may be used in combination with a pressurized exhaust system, such as a system that includes one or more pressurized screw augers. For example, a pressurized screw auger or another similar device may be used to transfer broken rock created by projectile impacts 806 through a pressure-acoustic barrier within which the tunneling unit 902 may operate. This may enable the tunneling unit to be operated at different pressures, as well as control the passage of exhaust gasses separately, transmit or direct the flow of exhaust gasses, and so forth.

Some implementations within the present disclosure may include methods for extending a tunnel 602, shaft, or other structure by pre-conditioning a selected region of a workface 802 prior to performing a tunneling operation to remove material from the workface 802 and extend a tunnel 602. In some cases, pre-conditioning a workface 802 may include accelerating one or more projectiles 202 into contact with the workface 802 to form one or more holes at or near a center of a region of the workface 802 where a tunneling operation will be performed to remove material from the workface 802. In other cases, other patterns of holes or other types of pre-conditioned regions (depressions, grooves, slots, etc.) may be formed in a workface 802.

After pre-conditioning the workface 802, a subsequent operation to displace material from the workface 802 and extend a tunnel 602 may include accelerating one or more projectiles 202 into the workface 802, such as to break rock or other materials. In other cases, a subsequent operation to displace material from the workface 802 and extend a tunnel 602 may include use of a drill or boring tool. Pre-conditioning of the workface 802, such as through use of one or more projectile impacts 806, may weaken the material of the workface 802, increasing the rate at which material may be displaced from the workface 802 and a tunnel 602 may be advanced. Additionally, pre-conditioning of the workface 802 may control the resulting shape of a tunnel 602 that is formed. For example, the holes or other pre-conditioned region of a workface 802 may simulate free face reflection zones. Shockwaves caused by subsequent projectile impacts 806 or other tunneling operations may interact with the free faces to increase the compressive pressure applied to rock or other material at the workface 802 and to control the shape of the material that is removed from the workface 802. For example, a shockwave caused by a projectile impact 806 may change from a compression wave to a tension wave when crossing a free face reflection zone, which may cause the shockwave to pull and break a pre-conditioned portion of the workface 802 at the region where the holes or other pre-conditioned pattern were formed.

While example implementations described herein illustrate tunnels 602 and shafts extended in a generally horizontal direction, in other implementations, tunnels 602 and shafts may be extended in a vertical direction. For example, a workface 802 located in an uphole or downhole direction in a shaft may be pre-conditioned by forming one or more holes or other pre-conditioning features in geologic material. Subsequent projectile impacts 806 or use of cutting or boring tools on the workface 802 may then more efficiently penetrate through the geologic material, while the pre-conditioned features of the workface 802 may control the cross-sectional shape of the extended section of the shaft. In cases where ram accelerator assemblies 102 or other equipment are oriented to face upward, such as when extending a shaft or tunnel 602 in an upward vertical direction, barriers, containers, rock crushers, or other mechanisms may be positioned between the ram accelerator assemblies 102 and the workface 802 to catch ejecta or other debris that may fall toward the ram accelerator assemblies 102 or other equipment. In some cases, the ram accelerator assemblies 102 or other equipment may be engaged with these mechanisms or other structures, which may maintain the ram accelerator assemblies 102 in a selected position relative to the workface 802.

In some implementations, pre-conditioning of a workface 802 may also be used to control the direction in which ejecta or other debris is generated. For example, during conventional tunneling operations, debris may be generated at the workface 802 where tunneling operations are performed, which may cause removal operations to be required before additional tunneling operations may be performed. However, shockwaves caused by projectile impacts 806 may expel debris in selected directions, facilitated by use of holes, slots, or other features that may be formed in a workface 802 prior to a projectile impact 806 or other tunneling operation.

Figure 15:
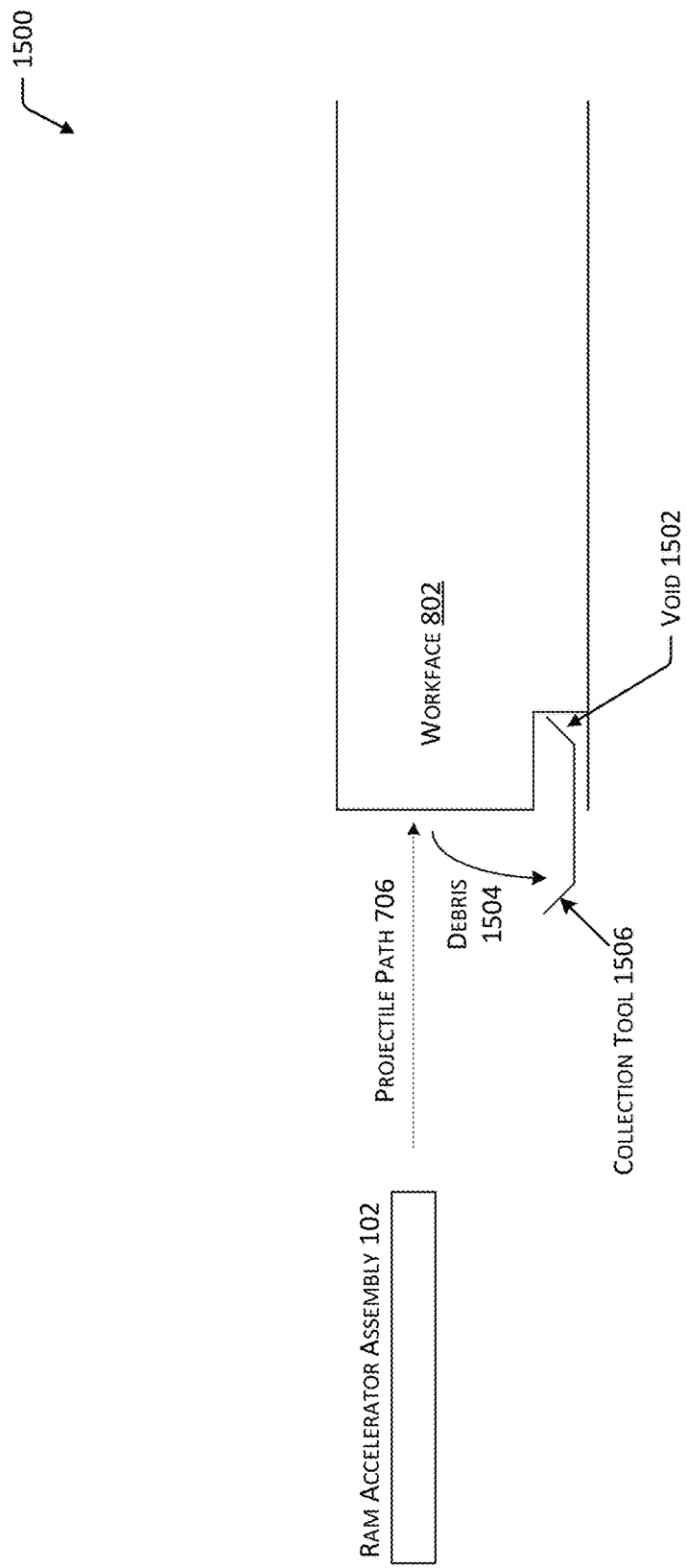
FIG. 15 is a diagram that depicts an example implementation in which a first void, such as a hole, slot, groove, sill, or other type of feature may be formed near the base of a workface.

FIG. 15 is a diagram 1500 that depicts an example implementation in which a first void 1502, such as a hole, slot, groove, sill, or other type of feature may be formed near the base of a workface 802. The first void 1502 may be formed using projectile impacts 806, or in some implementations, one or more preconditioning tools. In some implementations, the first void 1502 may be formed using one or more cutting tools 502, or a combination of cutting tools 502 and projectile impacts 806. For example, a slot, hole, groove, sill, or other type of void 1502 may be formed by weakening a region of geologic material using one or more projectile impacts 806, then removing material from the region using one or more cutting tools 502. Due to the void 1502 formed in the workface 802 causing formation of tension forces when subsequent projectile impacts 806 occur, debris 1504 debris created by a projectile impact 806 may be more likely to move toward the pre-conditioned feature. For example, FIG. 15 depicts a ram accelerator assembly 102 which may accelerate a projectile 202 as indicated by a projectile path 706 to impact a portion of the workface 802. The force of the projectile 202, forces caused by interaction with the void 1502, and gravity may cause debris 1504 to fall toward the void 1502. In some implementations, a portion of a collection tool 1506, such as a tray, trailer, conveyor, or other type of container may be positioned at, near, or at least partially within the void 1502 to catch debris 1504 created by a projectile impact 806, which may facilitate movement of the debris 1504 away from the workface 802.

In some implementations, if rock or other material remains on a wall of a tunnel 602 after formation, such as a protrusion that is not removed by tunneling operations, or a narrower region of a tunnel 602, this material may be removed by subsequent tunneling operations, such as projectile impacts 806. For example, a projectile 202 may be accelerated, such as by using a ram accelerator assembly 102, to impact material on a wall of a tunnel 602 with sufficient energy to remove the material from the wall. Impact between the projectile 202 and the wall may then redirect the projectile 202 to impact a workface 802 at the end of the tunnel 602, such as to further extend the tunnel 602, form a hole in the end of the tunnel 602 to pre-condition the workface 802 for further tunneling operations, and so forth. For example, projectiles 202 may be used to widen or smooth a tunnel 602 by ricocheting the projectiles 202 on a wall of the tunnel 602, which may then cause the projectiles 202 to impact the workface 802 at the end of the tunnel 602, or another wall or surface of the tunnel 602.

In other implementations, projectiles 202 may first impact a workface 802 at the end of a tunnel 602 or shaft, and impact between the workface 802 and the projectile 202 may redirect the projectile 202 toward a wall of the tunnel 602 or shaft. In such a case, a projectile 202 that is redirected away from the workface 802 at an angle, such as toward a wall or floor of a tunnel 802, may move ejecta or other debris 1504 away from the workface 802. For example, a projectile 202 that ricochets from a workface 802 in a downward direction may displace ejecta that has fallen to the floor near the workface 802 during tunneling operations, such as previous projectile impacts 806. In a similar manner, a projectile 202 that ricochets from a workface 802 toward a wall, floor, or ceiling of a tunnel 602 may impact the wall, floor, or ceiling and remove material therefrom, such as when smoothing or widening a portion of a tunnel 602. In some cases, impact between a projectile 202 and the workface 802 at a selected angle may cause ejecta from the impact to be directed toward a wall, floor, or ceiling of the tunnel 602 in a manner that may erode, smooth, or displace material from the wall, floor, or ceiling.

Figure 16:
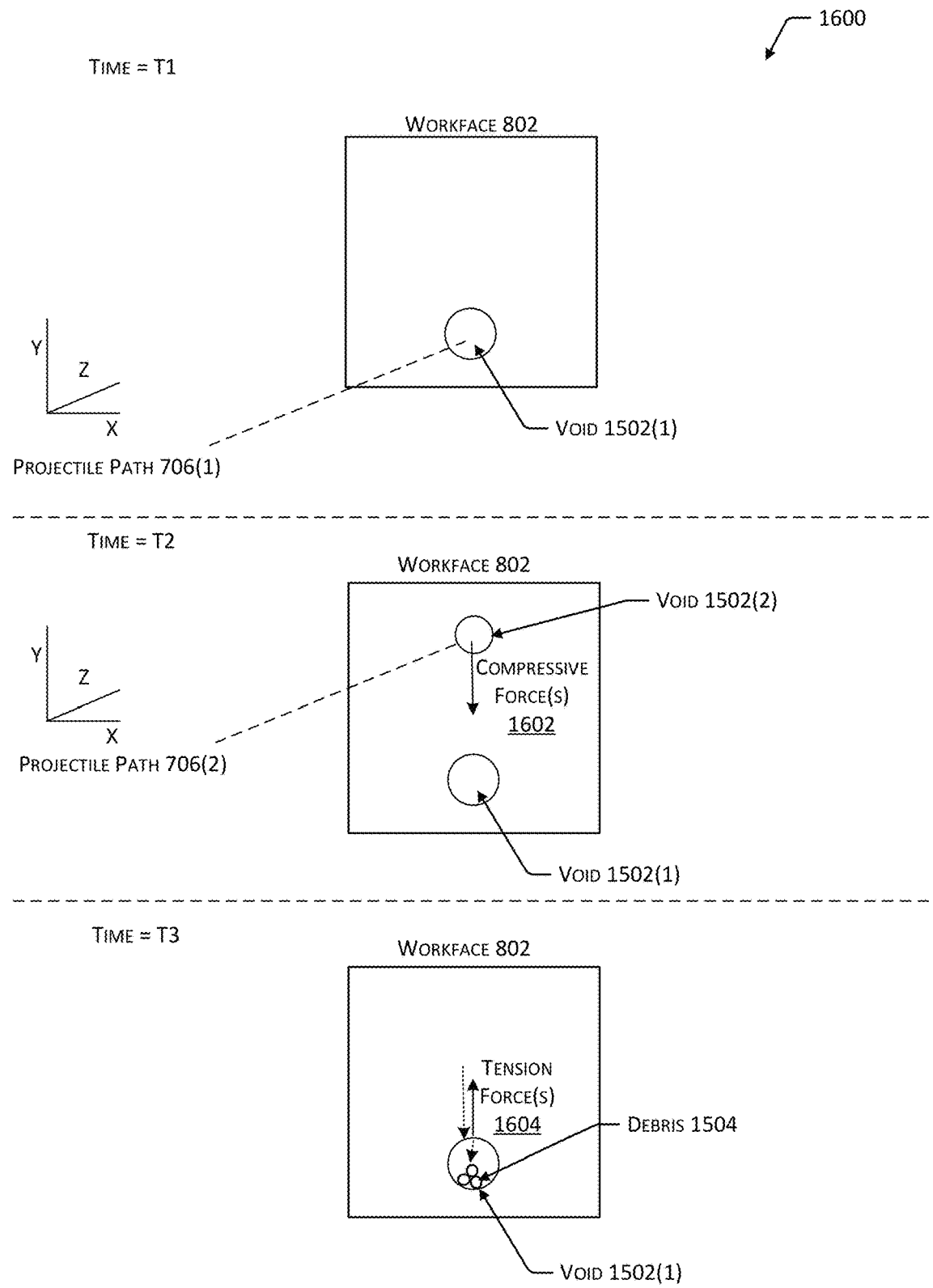
FIG. 16 is a diagram depicting an interaction between forces associated with a projectile impact and one or more voids within a workface.

FIG. 16 is a diagram 1600 depicting an interaction between forces associated with a projectile impact 806 and one or more voids 1502(1) within a workface 802. At a first time T1, one or more first projectiles 202 may be accelerated into contact with a first region of geologic material within a workface 802. The first region may be enclosed by a second region of the geologic material. For example, FIG. 16 depicts a first projectile path 706(1) indicating contact between a projectile 202 and an interior region of the workface 802, which may be enclosed by an exterior region. Interaction between one or more projectiles 202 and the first region of geologic material may form one or more first voids 1502(1).

At a second time T2, a second projectile 202 may be accelerated into contact with the workface 802. The second projectile 202 may impact the first region of the geologic material or the second region of the geologic material. For example, FIG. 16 depicts a second projectile path 706(2) indicating contact between a projectile 202 and a different region of the workface 802 that is spaced apart from the first void 1502(1). Interaction between the second projectile 202 and the workface 802 may form one or more second voids 1502(2) in the geologic material. Interaction between the second projectile 202 and the workface 802 may also apply one or more compressive forces 1602 to the geologic material. The compressive force(s) 1602 may propagate through the geologic material to interact with the first void 1502(1).

At a third time T3, interaction between the compressive forces 1602 and the first void 1502(1) may cause tension forces 1604, which may pull or break geologic material near the first void 1502(1) more readily than use of compressive forces 1602 alone. The tension forces 1604 may cause debris 1504 displaced by the tension force(s) 1604 to fall within the first void 1502(1) or to fall toward one or more other locations away from the workface 802.

While FIG. 16 depicts a second projectile impact creating compressive forces 1602 that interact with the first void 1502(1), in other implementations, other tunneling operations, such as use of a cutting tool 502, may be used in place of or in addition to the projectile impacts 806 to create compressive forces 1602 that interact with the first void 1502(1).

FIG. 17 is a diagram 1700 depicting use of acoustic signals 1702 generated by a projectile impact 806 to determine characteristics of geologic material, which may be used to control the firing parameters of a ram accelerator assembly 102. At a first time T1, a ram accelerator assembly 102 may be used to accelerate one or more projectiles 202 into contact with a workface 802. The projectile impact(s) 806 may cause one or more acoustic signals 1702 that propagate through the geologic material of the workface 802. An acoustic detector 1704 may receive the acoustic signal(s) 1702 and generate signal data 1706 indicative of characteristics of the acoustic signal(s) 1702. One or more computing devices 1708 may receive the signal data 1706 and determine characteristics of the geologic material based on the signal data 1706. For example, determined characteristics may include a hardness, porosity, the presence or absence of particular materials such as hard rock, porous sandstone, metal or other ores, water, hydrocarbons, and so forth.

At a second time T2, the computing device(s) 1708 may determine firing characteristics 1710 and projectile characteristics 1712 based on the determined characteristics of the geologic material. For example, firing characteristics 1710 may include times associated with subsequent acceleration of projectiles 202, locations within the geologic material to be contacted with the projectiles 202, the speed at which projectiles 202 are to be accelerated which may be determined based in part on the types and quantities of propellant materials used, and so forth. Projectile characteristics 1712 may include a determined shape, material composition, or type of projectile 202. For example, a steel projectile 202 with a tapered body may be used to penetrate through hard rock, while a wider concrete projectile 202 may be used to penetrate through softer or more porous material. In some cases, based on the determined characteristics of geologic material, use of a subsequent projectile impact 806 may be omitted or delayed. For example, if soft or porous geologic material is determined, a cutting tool 502 may be used to displace this material without use of projectile impacts 806 before a subsequent projectile 202 is accelerated toward the workface 802. The firing characteristics 1710 and projectile characteristics 1712 may be provided to a controller 1714 associated with the ram accelerator assembly 102. In some implementations, the computing device(s) 1708 may also determine a structural support characteristic. For example, based on the characteristics of the geologic material, such as hardness, porosity, or the presence or absence of particular materials, a nailing, bolting, or shot-creting operation may be necessary to maintain structural integrity of a section of a shaft or tunnel 602. The computing device(s) 1708 may control operation of a bolting or shot-creting tool, or other structural support tools, based on data associated with the acoustic signal(s) 1702.

At a third time T3, based on the firing characteristics 1710 and projectile characteristics 1712, the ram accelerator assembly 102 may accelerate a subsequent projectile 202 into contact with the workface 802. The location and effects of the resulting projectile impact 806 may be affected at least in part by the firing characteristics 1710 and projectile characteristics 1712. The subsequent projectile impact 806 may generate additional acoustic signals 1702, which may be used to determine characteristics of additional regions of the geologic material. For example, the process described in FIG. 17 may be repeated based on multiple projectile impacts 806 and the resulting acoustic signals 1702.

FIGS. 18A-18E are a series of diagrams 1800 depicting an implementation of a method for sequentially removing regions of geologic material to form a section of a tunnel 602 using a combination of projectile impacts 806 and cutting tools 502. While FIGS. 18A-18E depict one example series of sequential removal of zones of geologic material, in other implementations, zones of geologic material may be removed in any order. Additionally, while FIGS. 18A-18E depict a configuration in which a tunnel 602 is formed by removing generally horizontal zones of geologic material, in other implementations, zones may be oriented vertically or may have other orientations. For example, if a particular region of geologic material includes a vein of ore or other material to be extracted, the particular region of geologic material may be removed separately from other zones of geologic material, such as to enable extracted ore to be processed separately from debris created by removal of rock or other undesired geologic material.

As shown in FIG. 18A, at a first time T1, a first zone 1802 of geologic material may be removed using one or more of projectile impacts 806 or cutting tools 502. For example, a region of geologic material is shown conceptually divided into multiple zones, with a first zone 1802 positioned slightly above a base level, a second zone 1804 above the first zone 1802, a third zone 1806 above the second zone 1804, a fourth zone 1808 below the first zone 1802, and a fifth zone 1810 below the fourth zone 1808. The geologic material may include a combination of materials, such as rock, earth, and so forth. Removal of the first zone 1082 of geologic material may include accelerating one or more projectiles 202 into contact with the first zone 1802 to form one or more voids 1502, then contacting the geologic material at the first zone 1802 or at one or more other regions using additional projectile impacts 806 or cutting tools 502 to cause tension forces 1604 that break or otherwise displace the geologic material of the first zone 1802. A cutting tool 502 may be used to remove any residual material or debris 1504 from the first zone 1802 that is not removed by the initial tunneling operations, such that the first zone 1802 defines a first void 1502(1).

As shown in FIG. 18B, at a second time T2, a debris collection tool 1506 may be positioned in the first void 1502(1) defined by the removal of geologic material from the first zone 1802. As described previously, the collection tool 1506 may include a tray, trough, portion of a conveying system, and so forth that may be used to catch debris 1504 that falls from above the first void 1502(1) during subsequent operations. For example, at a third time T3, a perimeter region of the second zone 1804 may be pre-conditioned. In some implementations, pre-conditioning of the perimeter region of the second zone 1804 may include contacting the second zone 1804 with one or more projectiles 202, which may form a series of voids 1502(2) proximate to the perimeter of the second zone 1804. In other implementations, water jets 904, cutting tools 502, drills, and so forth may be used to form voids 1502(2), grooves, slots, or other regions of removed material proximate to the perimeter of the second zone 1804.

As shown in FIG. 18C, at a fourth time T4, geologic material from the second zone 1804 may be removed using one or more of projectile impacts 806 or cutting tools 502. For example, contact between a cutting tool 502 or one or more projectiles 202 and the second zone 1804 of geologic material may cause compressive forces 1602 that interact with the voids 1502(2) formed at the third time T3. Interaction between the compressive forces 1602 and the voids 1502(2) may cause tension forces 1604 to break the geologic material of the second zone 1804 while limiting the displacement of geologic material beyond the perimeter of the second zone 1804 defined by the voids 1502(2). Debris 1504 formed by operations to remove material from the second zone 1804 may fall toward the collection tool 1506, which may facilitate removal of the debris 1504. In cases where projectile impacts 806 or large-diameter cutting tools 502 are used to remove material from the second zone 1804, some residual geologic material may remain, such as at the locations indicated in FIG. 18C as the third zone 1806.

As shown in FIG. 18D, at a fifth time T5, the third zone 1806 of geologic material may be removed by contouring the second zone 1804 with cutting tools 502. For example, after breaking geologic material with projectile impacts 806 or larger-diameter cutting tools 502, portions of geologic material may remain at an upper portion of the second zone 1804. A road-header tool or other type of cutting tool may be used to displace the geologic material from the third zone 1806, or otherwise contour, smooth, or form the edges of the section of tunnel 602 defined by the perimeter that was pre-conditioned at the third time T3.

At a sixth time T6, debris 1504 and the collection tool 1506 may be removed from the region of geologic material, and a perimeter region of the fourth zone 1808 may be pre-conditioned. For example, one or more projectile impacts 806, water jets 904, drills, cutting tools 502, or other pre-conditioning tools may be used to form one or more voids 1502(3), grooves, slots, or other regions of removed or displaced geologic material proximate to the perimeter of the fourth zone 1808.

As shown in FIG. 18E, at a seventh time T7, the fourth zone 1808 of geologic material may be removed using one or more of projectile impacts 806 or cutting tools 502. The operations performed to remove the material from the fourth zone 1808 may cause compressive forces 1602 that interact with the voids 1502(3) to cause tension forces 1604 that break geologic material from the fourth zone 1808 more readily than use of compressive forces 1602 alone. Some residual geologic material may remain at the edges of the fourth zone 1808, as shown in the fifth zone 1810 of FIG. 18E. At an eighth time T8, the fifth zone 1810 of geologic material may be removed by contouring the fourth zone 1808 using cutting tools 502.

Figure 19:
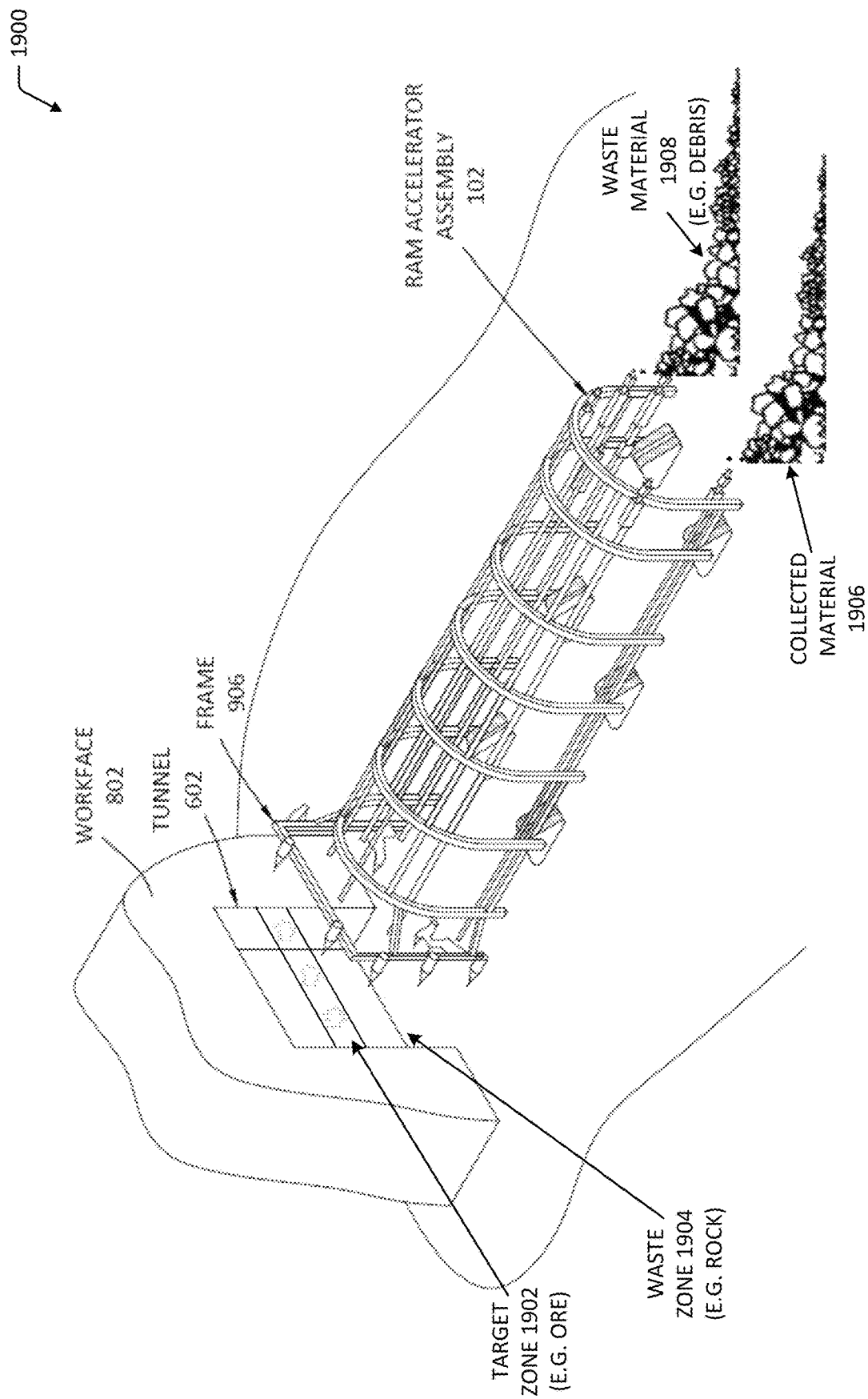
FIG. 19 is a diagram depicting an implementation of a system for selectively removing regions of geologic material based on the characteristics of the geologic material, such as to extract ore or another desired material separately from waste or debris.

In addition to forming a tunnel 602 in an efficient and advantageous manner, selective removal of zones of geologic material may be used to facilitate extraction of desired materials from rock or other geologic material. For example, FIG. 19 is a diagram 1900 depicting an implementation of a system for selectively removing regions of geologic material based on the characteristics of the geologic material, such as to extract ore or another desired material separately from waste or debris. As described previously, one or more ram accelerator assemblies 102, and in some cases, cutting tools 502, reaming tools 108, impact tools, or other tools for displacing geologic material, may be used to form a shaft or tunnel 602 within geologic material. For example, one or more projectiles 202 may be accelerated into contact with a workface 802, and an interaction between the projectiles 202 and the geologic material may weaken the geologic material and form one or more voids. A subsequent projectile impact 806 or use of a cutting tool 502 to contact the region of geologic material may apply a compressive force 1602 to the geologic material, which may interact with a void to form a tension force 1604 that more readily breaks rock or other geologic material than use of compressive forces 1602 alone.

In some cases, a particular region of geologic material, such as a target zone 1902 may include a desired material, such as a vein of ore. In such a case, removal of the target zone 1902 of geologic material separate from other zones of geologic material, which may constitute waste zones 1904 that contain rock, earth, or other undesired materials, may enable the desired material to be collected separately from the undesired materials. For example, using methods described with regard to FIGS. 18A-18E, the target zone 1902 of the geologic material may be pre-conditioned, such as by defining a perimeter region thereof using projectile impacts 806, or other pre-conditioning tools. Then, one or more projectile impacts 806 may be used to weaken the geologic material in the target zone 1902. Subsequent projectile impacts 806 or use of cutting tools 502 may then be used to remove the desired material from the target zone 1902. Conveying systems may transport the collected material 1906 to a selected location for processing. Because the target zone 1902 of geologic material is removed separately from the waste zone(s) 1904, the collected material 1906 does not include large amounts of waste material 1908 (e.g., rock or other debris). After the target zone 1902 has been removed, one or more waste zones 1904 may be removed using projectile impacts 806 or cutting tools 502, as described previously, and the waste material 1908 may be transported away from the workface 802. In other implementations, one or more waste zones 1904 may be removed prior to removal of the target zone 1902 of geologic material. In some cases, based on known characteristics of a region of geologic material, which in some implementations may be determined using acoustic signals 1702 as described with regard to FIG. 17, the presence or absence of a desired material may be determined. In other implementations, the characteristics of a region of geologic material may be determined using other sensor modalities. For example, spectroscopy, radar, neutron scattering, neutron diffraction, x-ray analysis, and so forth. Separate conveying systems or methods, or directions of conveying the resulting debris, may be used based on the known characteristics of the region of geologic material that is impacted by a projectile 202 or cutting tool 502 to cause a desired material such as ore to be transported away from a workface 802 separately from waste material 1908. In some implementations, waste material 1908 such as rock may be replaced in a tunnel 602 or shaft, such as to back-fill a mining shaft after removal of a desired vein of ore.

Although certain steps have been described as being performed by certain devices, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

The material included in the following Appendices is included in this disclosure in its entirety.

What is claimed is:

1. A method comprising:
accelerating one or more first projectiles into contact with a first region of geologic material, wherein:
the geologic material includes a second region that encloses the first region; and
a first interaction between the one or more first projectiles and the first region weakens geologic material at the first region and forms a first void by displacing geologic material;
determining data indicative of propagation of an acoustic signal associated with the first interaction through at least a first portion of the geologic material;
based on the data indicative of the propagation of the acoustic signal, determining a characteristic of one or more of the first region or the second region of the geologic material;
determining that the characteristic of the one or more of the first region or the second region of the geologic material corresponds to one or more criteria for contacting the one or more of the first region or the second region with a cutting tool to displace geologic material from the one or more of the first region or the second region before accelerating a second projectile into contact with the one or more of the first region or the second region; and
accelerating the second projectile into contact with the one or more of the first region or the second region, wherein:
a second interaction between the second projectile and the one or more of the first region or the second region applies a compressive force to the geologic material;
the compressive force interacts with the first void to form a first tension force; and
the first tension force displaces at least a second portion of the geologic material of the first region into the first void.

2. The method of claim 1, further comprising:
accelerating one or more third projectiles into contact with the second region, wherein:
a third interaction between the one or more third projectiles and the second region forms one or more second voids that define a perimeter;
the compressive force interacts with the one or more second voids to form a second tension force;
the one or more second voids reduce interaction between the compressive force and geologic material outside of the perimeter; and
the second tension force displaces geologic material within the perimeter.

3. The method of claim 1, further comprising:
positioning a portion of a conveying system within the first void, wherein debris from the second interaction falls into contact with the portion of the conveying system; and
transporting at least a portion of the debris away from the first region.

4. The method of claim 1, further comprising:
determining that the characteristic further corresponds to one or more criteria for accelerating the second projectile toward the one or more of the first region or the second region.

5. The method of claim 1, further comprising:
   determining one or more of a projectile characteristic, a firing characteristic, a structural support characteristic, or a location of the geologic material that corresponds to the characteristic of the geologic material;
   wherein the second projectile one or more of:
   comprises the projectile characteristic,
   is accelerated using the firing characteristic, or
   is accelerated toward the location.

6. The method of claim 1, further comprising:
   displacing, using the cutting tool, a portion of the geologic material weakened by one or more of the first interaction or the second interaction to one or more of: form a tunnel through the geological material or extend the tunnel through the geologic material.

7. A system comprising:
   a launch tube having an end oriented toward a first region of geologic material, wherein the geologic material includes a second region that encloses the first region;
   a first projectile within the launch tube;
   a propellant material within the launch tube, wherein the propellant material applies a force to the first projectile to accelerate the first projectile into contact with the first region of the geologic material, wherein a first interaction between the first projectile and the first region weakens geologic material at the first region and forms a first void by displacing geologic material, and wherein the first interaction between the first projectile and the first region of the geologic material generates an acoustic signal;
   an acoustic detector that determines data indicative of the acoustic signal;
   a cutting tool having at least one cutting surface that is movable to contact one or more of the first region or the second region to displace at least a portion of the geologic material into the first void; and
   one or more computing devices in communication with the acoustic detector, wherein the one or more computing devices execute computer-executable instructions to:
     based on the data indicative of the acoustic signal, determine a characteristic of the one or more of the first region or the second region of the geologic material;
     determine one or more of a projectile characteristic, a firing characteristic, or a location of the geologic material based on the characteristic of the one or more of the first region or the second region of the geologic material; and
     cause one or more of:
       movement of the cutting tool to contact the location,
       acceleration of a projectile toward the location using the firing characteristic, or
       use of a projectile comprising the projectile characteristic.

8. The system of claim 7, wherein:
   the cutting tool is moved to contact the second region of geologic material;
   a second interaction between the cutting tool and the second region applies a compressive force to the geologic material;
   the compressive force interacts with the first void to form a first tension force; and
   the first tension force displaces the at least a portion of the geologic material into the first void.

9. The system of claim 7, further comprising:
   a second projectile;
   wherein:
     after accelerating the first projectile into contact with the first region of the geologic material, the second projectile is accelerated into contact with the second region of the geologic material;
     a second interaction between the second projectile and the second region applies a compressive force to the geologic material;
     the compressive force interacts with the first void to form a first tension force; and
     the first tension force displaces geologic material into the first void.

10. The system of claim 7, further comprising:
    a conveying system at least partially positioned within the first void, wherein debris displaced using the cutting tool contacts the conveying system and the conveying system transports at least a portion of the debris away from the one or more of the first region or the second region.

11. The system of claim 7, further comprising:
    a preconditioning tool oriented toward the second region of the geologic material;
    wherein:
      material from the preconditioning tool is accelerated into contact with the second region of the geologic material;
      a second interaction between the material and the second region forms one or more second voids that define a perimeter;
      one or more of the first interaction or a third interaction between the cutting tool and the geologic material applies a compressive force to the geologic material;
      the compressive force interacts with the one or more second voids to form a tension force;
      the one or more second voids reduce interaction between the compressive force and geologic material outside of the perimeter; and
      the tension force displaces geologic material within the perimeter.

12. A method comprising:
    contacting one or more of a first region or a second region of geologic material with a cutting tool to displace geologic material from the one or more of the first region or the second region;
    determining, using one or more sensors, a first characteristic of the one or more of the first region or the second region of the geologic material based on displacement of the geologic material using the cutting tool;
    determining that the first characteristic corresponds to one or more criteria for accelerating one or more first projectiles into contact with the first region;
    after contacting the one or more of the first region or the second region with the cutting tool, accelerating the one or more first projectiles into contact with the first region of geologic material wherein the first region is enclosed by the second region of geologic material, wherein a first interaction between the one or more first projectiles and the first region forms a first void by displacing geologic material;
    determining data indicative of propagation of an acoustic signal associated with the first interaction through the geologic material;
    based on the data indicative of the propagation of the acoustic signal, determining a second characteristic of the second region of the geologic material; and
    contacting the second region of the geologic material with one or more of a second projectile or the cutting tool, wherein a second interaction associated with the one or more of the second projectile or the cutting tool applies a compressive force to the geologic material, the compressive force interacts with the first void to form a first tension force, and the first tension force displaces at least a first portion of the geologic material into the first void.

13. The method of claim 12, further comprising:
before contacting the second region with the one or more of the second projectile or the cutting tool, contacting the second region with one or more of: at least one third projectile or a material associated with a preconditioning device;
wherein a third interaction between the at least one third projectile and the second region forms one or more second voids that define a perimeter, the compressive force interacts with the one or more second voids to form a second tension force, and the one or more second voids reduce interaction between the compressive force and geologic material outside of the perimeter.

14. The method of claim 12, further comprising:
positioning at least a portion of a conveying system within the first void, wherein debris from the second interaction falls toward the at least a portion of the conveying system; and
using the conveying system to transport at least a portion of the debris away from the first region.

15. The method of claim 12, wherein the second characteristic indicates one or more of: a porosity greater than a first threshold value or a hardness less than a second threshold value, and the cutting tool is used to contact the second region in response to the one or more of:
the porosity being greater than the first threshold value, or the hardness being less than the second threshold value.

16. The method of claim 12, further comprising:
based on the data indicative of the propagation of the acoustic signal, determining a first material at the first region and a second material at the second region;
transporting debris associated with the first interaction to a first location using a first conveying system; and
transporting debris associated with the second interaction to a second location using one or more of the first conveying system or a second conveying system.

17. The method of claim 12,
wherein the second characteristic indicates one or more of: a porosity less than a first threshold value or a hardness greater than a second threshold value, and the second projectile is accelerated into contact with the second region in response to the one or more of: the porosity being less than the first threshold value or the hardness being greater than the second threshold value.

18. A method comprising:
accelerating one or more first projectiles into contact with a first region of geologic material that is enclosed by a second region of geologic material, wherein a first interaction between the one or more first projectiles and the first region forms a first void by displacing geologic material;
determining data indicative of propagation, through the geologic material, of an acoustic signal associated with the first interaction;
based on the data indicative of the propagation of the acoustic signal, determining a characteristic of the second region of the geologic material, wherein the characteristic indicates one or more of: a porosity greater than a first threshold value or hardness less than a second threshold value; and
in response to the characteristic, contacting the second region of the geologic material with a cutting tool, wherein a second interaction associated with the cutting tool applies a compressive force to the geologic material, the compressive force interacts with the first void to form a first tension force, and the first tension force displaces at least a first portion of the geologic material into the first void.

19. A method comprising:
accelerating one or more first projectiles into contact with a first region of geologic material that is enclosed by a second region of geologic material, wherein a first interaction between the one or more first projectiles and the first region forms a first void by displacing geologic material;
determining data indicative of propagation, through the geologic material, of an acoustic signal associated with the first interaction;
based on the data indicative of the propagation of the acoustic signal, determining a characteristic of the second region of the geologic material;
contacting the second region of the geologic material with one or more of a second projectile or a cutting tool, wherein a second interaction associated with the one or more of the second projectile or the cutting tool applies a compressive force to the geologic material, the compressive force interacts with the first void to form a first tension force, and the first tension force displaces at least a first portion of the geologic material into the first void;
based on the data indicative of the propagation of the acoustic signal, determining a first material at the first region and a second material at the second region;
transporting debris associated with the first interaction to a first location using a first conveying system; and
transporting debris associated with the second interaction to a second location using one or more of the first conveying system or a second conveying system.

20. The method of claim 19, further comprising:
positioning at least a portion of the second conveying system within the first void, wherein the debris associated with the second interaction falls toward the at least a portion of the second conveying system.

* * * * *